United States Patent
Sweetser et al.

(10) Patent No.: US 7,864,159 B2
(45) Date of Patent: Jan. 4, 2011

(54) HANDHELD VISION BASED ABSOLUTE POINTING SYSTEM

(75) Inventors: John Sweetser, San Jose, CA (US); Anders Grunnet-Jepsen, San Jose, CA (US); Kenneth Salsman, Pleasanton, CA (US)

(73) Assignee: Thinkoptics, Inc., San Jose, CA (US)

( * ) Notice: Subject to any disclaimer, the term of this patent is extended or adjusted under 35 U.S.C. 154(b) by 892 days.

(21) Appl. No.: 11/187,435

(22) Filed: Jul. 21, 2005

(65) Prior Publication Data

US 2006/0152489 A1   Jul. 13, 2006

Related U.S. Application Data

(60) Provisional application No. 60/593,413, filed on Jan. 12, 2005.

(51) Int. Cl.
    G09G 5/08   (2006.01)
(52) U.S. Cl. .................................................. 345/158
(58) Field of Classification Search .......... 345/156–178
    See application file for complete search history.

(56) References Cited

U.S. PATENT DOCUMENTS

| | | | |
|---|---|---|---|
| 4,229,009 A | 10/1980 | Ohta | |
| 4,395,045 A | 7/1983 | Baer | |
| 4,813,682 A | 3/1989 | Okada | |
| 5,009,501 A | 4/1991 | Fenner et al. | |
| 5,045,843 A * | 9/1991 | Hansen | 345/158 |
| 5,115,230 A | 5/1992 | Smoot | |
| 5,181,015 A | 1/1993 | Marshall et al. | |
| 5,317,140 A | 5/1994 | Dunthorn | |
| 5,502,459 A | 3/1996 | Marshall et al. | |
| 5,504,501 A | 4/1996 | Hauck et al. | |
| 5,515,079 A | 5/1996 | Hauck | |

(Continued)

FOREIGN PATENT DOCUMENTS

EP   1 081 635 A2   3/2001

(Continued)

OTHER PUBLICATIONS

Sukthankar, R., et al., "Smarter Presentations: Exploiting Homography in Camera-Projector Systems," Proceedings of International Conference on Computer Vision, 2001, 7 pgs.

(Continued)

*Primary Examiner*—Richard Hjerpe
*Assistant Examiner*—Carolyn R Edwards
(74) *Attorney, Agent, or Firm*—Blakely, Sokoloff, Taylor & Zafman, LLP

(57) ABSTRACT

A method is described that involves identifying one or more images of respective one or more fixed markers. Each marker is positioned on or proximate to a display. The images appear on a pixilated sensor within a handheld device. The method also involves determining a location on, or proximate to, the display where the handheld device was pointed during the identifying. The method also involves sending from the handheld device information derived from the identifying of the one or more images of respective one or more fixed markers. The method also involves triggering action taken by electronic equipment circuitry in response to the handheld device's sending of a signal to indicate the action is desired.

29 Claims, 30 Drawing Sheets

U.S. PATENT DOCUMENTS

| | | | |
|---|---|---|---|
| 5,574,479 A * | 11/1996 | Odell | 345/158 |
| 5,736,975 A | 4/1998 | Lunetta | |
| 5,793,353 A * | 8/1998 | Wu | 345/156 |
| 5,793,361 A | 8/1998 | Kahn et al. | |
| 5,796,387 A | 8/1998 | Curran et al. | |
| 5,926,168 A | 7/1999 | Fan | |
| 5,929,444 A | 7/1999 | Leichner | |
| 6,110,039 A | 8/2000 | Oh | |
| 6,146,278 A * | 11/2000 | Kobayashi | 463/53 |
| 6,184,863 B1 * | 2/2001 | Sibert et al. | 345/156 |
| 6,188,388 B1 * | 2/2001 | Arita et al. | 345/158 |
| 6,252,720 B1 | 6/2001 | Haseltine | |
| 6,331,848 B1 | 12/2001 | Stove et al. | |
| 6,377,242 B1 | 4/2002 | Sweed | |
| 6,404,416 B1 * | 6/2002 | Kahn et al. | 345/158 |
| 6,489,945 B1 | 12/2002 | Gordon | |
| 6,618,076 B1 | 9/2003 | Sukthankar et al. | |
| 6,650,822 B1 | 11/2003 | Zhou | |
| 6,683,628 B1 | 1/2004 | Nakagawa et al. | |
| 6,724,368 B2 | 4/2004 | Strubbe | |
| 6,727,885 B1 * | 4/2004 | Ishino et al. | 345/156 |
| 6,753,849 B1 | 6/2004 | Curran | |
| 6,765,555 B2 | 7/2004 | Wu | |
| 6,900,791 B2 | 5/2005 | Tanaka | |
| 6,924,809 B2 | 8/2005 | Chao et al. | |
| 7,039,218 B2 | 5/2006 | Lin | |
| 7,050,043 B2 | 5/2006 | Huang et al. | |
| 7,053,932 B2 | 5/2006 | Lin et al. | |
| 7,091,949 B2 | 8/2006 | Hansen | |
| 7,102,616 B1 | 9/2006 | Sleator | |
| 7,232,986 B2 * | 6/2007 | Worthington et al. | 250/221 |
| 2002/0078446 A1 | 6/2002 | Dakss et al. | |
| 2003/0199324 A1 | 10/2003 | Wang | |
| 2004/0004276 A1 | 1/2004 | Hsu et al. | |
| 2004/0095317 A1 | 5/2004 | Zhang et al. | |
| 2004/0169639 A1 | 9/2004 | Pate et al. | |
| 2004/0222969 A1 | 11/2004 | Buchenrieder | |
| 2004/0266528 A1 | 12/2004 | Wang | |
| 2004/0268393 A1 | 12/2004 | Hunleth et al. | |
| 2005/0073525 A1 | 4/2005 | Chao et al. | |
| 2005/0104849 A1 | 5/2005 | Hoile | |
| 2005/0168444 A1 | 8/2005 | Lin et al. | |
| 2005/0225536 A1 | 10/2005 | Hsieh et al. | |
| 2005/0237303 A1 | 10/2005 | Yang | |
| 2006/0094286 A1 | 5/2006 | Lee et al. | |
| 2006/0108507 A1 | 5/2006 | Huang | |
| 2006/0125932 A1 | 6/2006 | Lu et al. | |
| 2006/0284841 A1 | 12/2006 | Hong et al. | |

FOREIGN PATENT DOCUMENTS

| | | |
|---|---|---|
| GB | 2 381 686 | 5/2003 |
| JP | 07-121293 A | 5/1995 |
| JP | 2003-044220 | 2/2003 |
| JP | 2004-348459 | 12/2004 |
| WO | WO 95/19031 A1 | 7/1995 |
| WO | WO 00/60534 | 10/2000 |
| WO | WO2004012130 | 2/2004 |
| WO | WO2004/038328 | 5/2004 |
| WO | WO 2005/013115 A1 | 2/2005 |

OTHER PUBLICATIONS

Madritsch, F., "CCD-Camera Based Optical Tracking for Human-Computer Interaction," Proceedings 1st European Conference on Disability, Virtual Reality and Associated Technologies, Maidenhead, 1996, pp. 161-170.

Olsen, Jr, D., et al., "Laser Poitner Interaction," Proceedings of the SIGCHI Conference on Human Factors in Computing Systems, 2001, Seattle, WA, 7 pgs.

Myers, B., et al., "Interacting at a Distance: Measuring the Performance of Laser Pointers and Other Devices," vol. 4: Issue 1, Proceedings of CHI Apr. 2002, Minneapolis, Minnesota. pp. 33-40.

Agilent Technologies, "Agilent ADNB-6031 and ADNB-6032 Low Power Laser Mouse Bundles: Datasheet," http://www.agilent.com/semiconductors. May 27, 2005, pp. 1-45, Agilent Technologies.

Agilent Technologies, "Agilent ADNK-2623 Optical Mouse Designer's Kit: Product Overview," http://www.agilent.com/semiconductors. Jul. 3, 2003, 4 pgs, Agilent Technologies.

3D Connexion, "SpaceMouse Plus: Premium Motion Controller," www.3Dconnexion.com, 2 pgs, 2003.

Gyration, Inc., "MicroGyro MG1101," http://www.gyration.com, pp. 1-18, 2005, DEO1300-001, Data Sheet, MicroGyro MG1101, Rev A.

3RDTECH, Inc., "HiBallTM—3000 Wide-Area Tracker and 3D Digitizer: 6 DOF Position and Orientation with Unparalleled Precision and Performance," 2 pgs, 3rdTech, Inc., Chapel Hill.

Smarthome, "Philips ProntoPro NG Fully Programmable Remote Control #TSU7000," pp. 4, printed Sep. 22, 2006, www.smarthome.com/8196.html.

Owens, R., "Optical Mouse Technology," pp. 15, printed on Sep. 22, 2006, www.mstarmetro.net/~rlowens/OpticalMouse/.

Gyration, "Gyration Home," pp. 2, printed on Sep. 22, 2006, www.gyration.com/en-US.

Gyration, "Gyro Technology," pp. 2, printed on Sep. 22, 2006, www.gyration.com/en-US/GyroTech.html.

Intersense, Inc., "The New Standard in Motion Tracking," pp. 2, printed on Sep. 22, 2006, www.intersense.com.

Prentke Romich Company, "HeadMouse Extreme," pp. 1, printed on Sep. 22, 2006, http://store.prentrom.com/cgi-bin/store/HE-X.html.

Smartnav, "Assistive Technology-NaturalPoint head tracking for people with special needs," pp. 6, printed on Sep. 22, 2006, http://rjcooper.com/smartnav/index.html.

Danish Patent and Trademark Office, Novelty Search, SE 2006 05704, dated Dec. 20, 2006, 11 pages.

Stan Moore, Optimal Pixel Size, 2004, http://www.stanmooreastro.com/pixel_size.htm, © Stan Moore 2004, pp. 1-5.

PCT International Search Report and Written Opinion of the International Searching Authority, mailed Oct. 30, 2006, 14 pages.

PCT International Search Report and Written Opinion of the International Searching Authority, mailed Jul. 17, 2007, 11 pages.

*Office Action from* U.S. Appl. No. 11/187,405, mailed May 13, 2009, 18 pages.

*Office Action from* U.S. Appl. No. 11/187,387, mailed May 13, 2009, 22 pages.

Office Action from Foreign Counterpart China Patent Application No. 200680006415.3, mailed Jul. 22, 2009, 2 pages.

Office Action from U.S. Appl. No. 11/187,387, mailed Feb. 4, 2010, 17 pages.

Office Action for counterpart European Patent Application No. 06718289.9, mailed Jul. Sep. 7, 2009, 5 pages.

Office Action from U.S. Appl. No. 11/777,078, mailed Sep. 29, 2009, 9 pages.

Final Office Action from U.S. Appl. No. 11/187,405, mailed Dec. 17, 2009, 18 pages.

Office Action from foreign counterpart European Application No. 06 718 289.9-1527 mailed Mar. 9, 2008, 7 pages.

Notice of Allowance from U.S. Appl. No. 11/187,405, mailed Apr. 29, 2010, 16 pgs.

Notice of Allowance mailed from U.S. Appl. No. 11/187,387, mailed Apr. 29, 2010, 13 pgs.

Final Office action from U.S. Appl. No. 11/777,073, mailed Apr. 29, 2010, 18 pgs.

Final Office action from U.S. Appl. No. 11/777,078, mailed Jun. 10, 2010, 11 pgs.

Odell, D., FAM 18.5, "An Optical Pointer For Infrared Remote Controllers", IEEE, 1995, pp. 324-325.

Vellgdan, J., "Unique Interactive Projection Display Screen", BNL-64780, U.S. Air Force P.R.A.M. office and by D.A.R.P.A, pp. 9.

Aihara, T., et al., "Wireless Pointing Device", IBM Technical Disclosure Bulletin, vol. 36, No. 06B, Jun. 1993, pp. 345-346.

* cited by examiner

| FACING VIEW | TOP VIEW | SIDE VIEW |
|---|---|---|
| 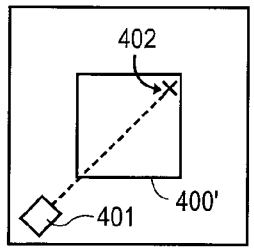 | 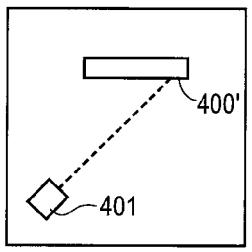 | 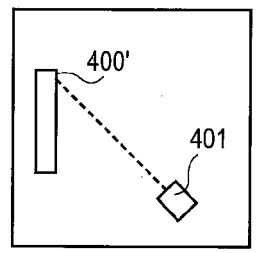 |
| FIG. 4A (i) | FIG. 4A (ii) | FIG. 4A (iii) |
| 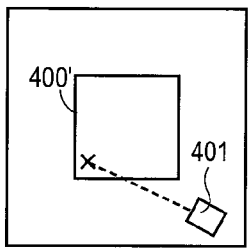 | 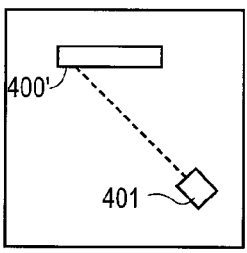 | 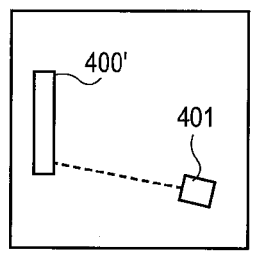 |
| FIG. 4B (i) | FIG. 4B (ii) | FIG. 4B (iii) |
| 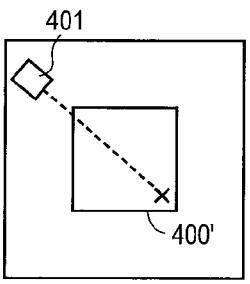 | 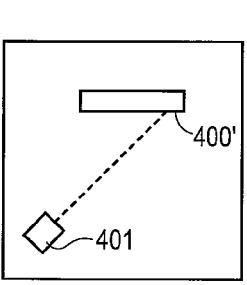 | 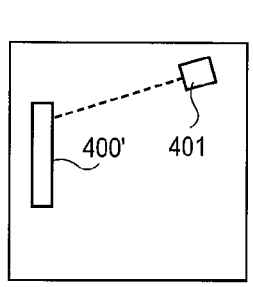 |
| FIG. 4C (i) | FIG. 4C (ii) | FIG. 4C (iii) |
| 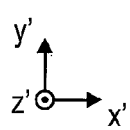 | 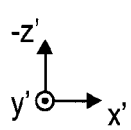 | 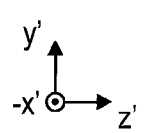 |

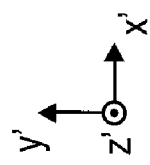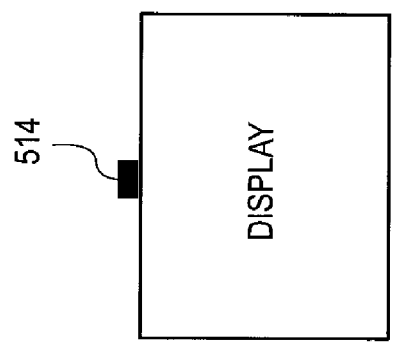
FIG. 5B

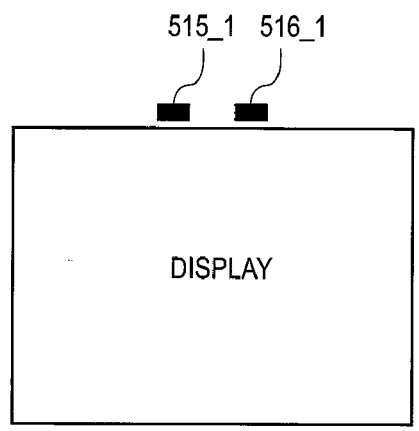
FIG. 5C (i)
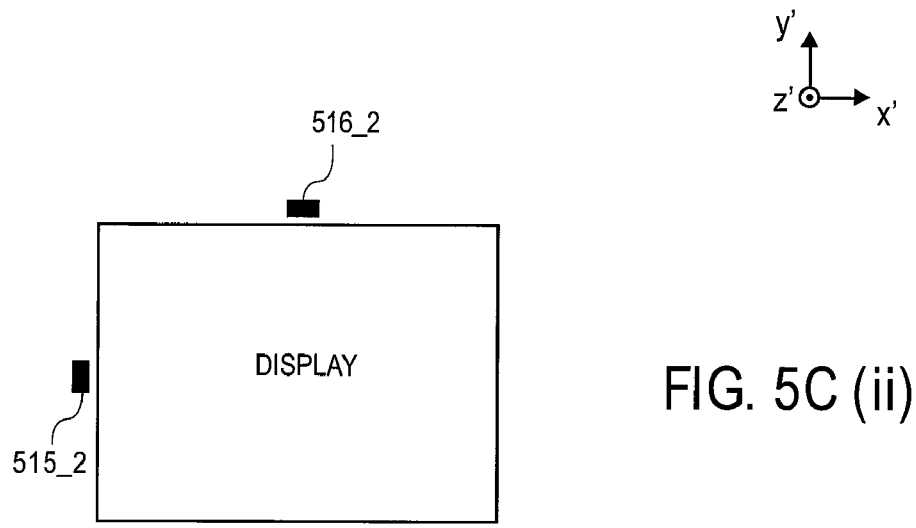
FIG. 5C (ii)

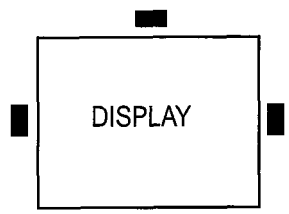
FIG. 5D (i)
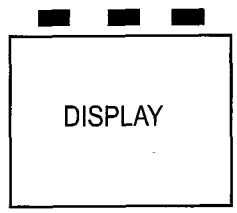
FIG. 5D (ii) 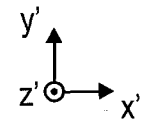
FIG. 5D (iii)
FIG. 5D (iv)

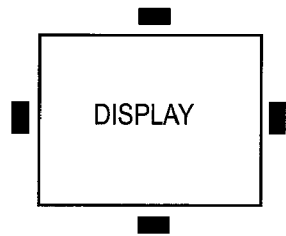
FIG. 5E (i)
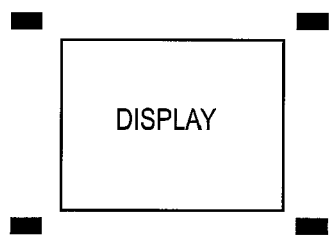
FIG. 5E (ii)
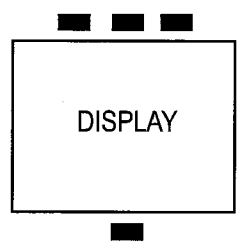
FIG. 5E (iii)

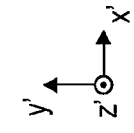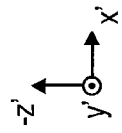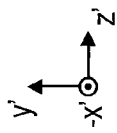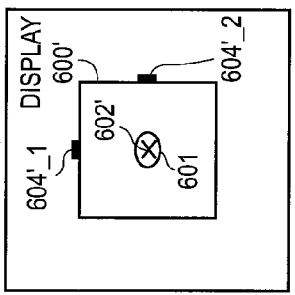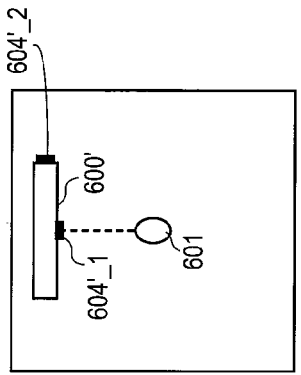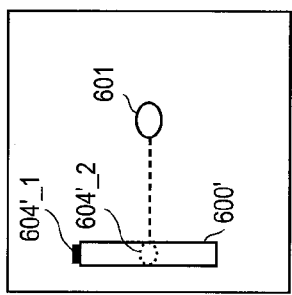
FIG. 6A (ii) FRONT VIEW    FIG. 6A (iii) TOP VIEW    FIG. 6A (iv) SIDE VIEW
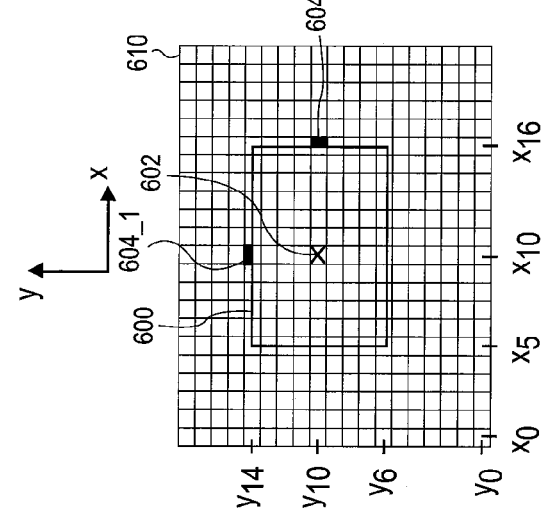
FIG. 6A (i)

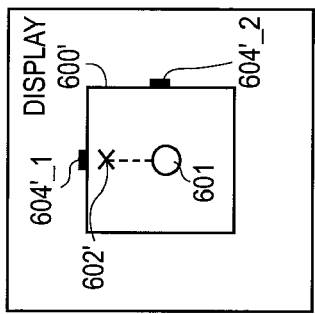
FIG. 6B (ii)
FRONT VIEW
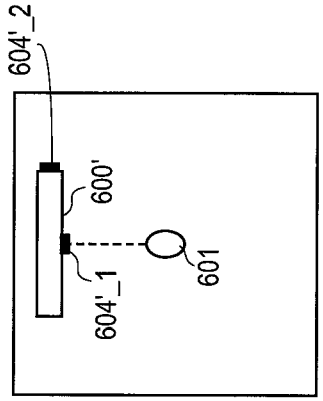
FIG. 6B (iii)
TOP VIEW
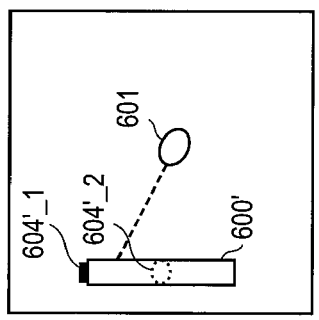
FIG. 6B (iv)
SIDE VIEW
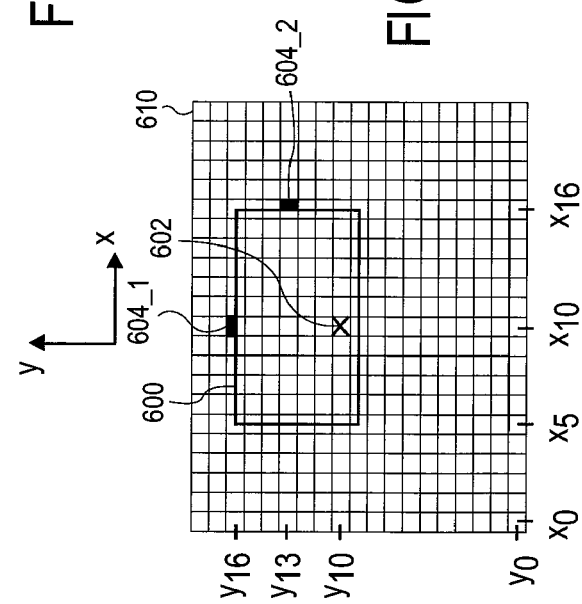
FIG. 6B (i)

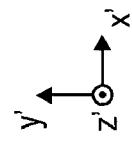
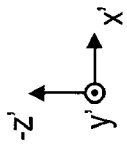
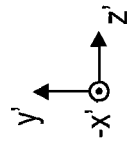
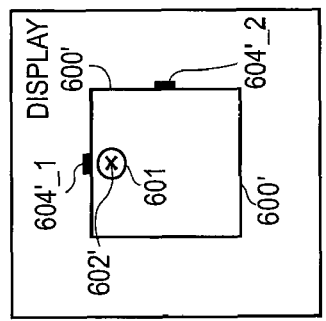
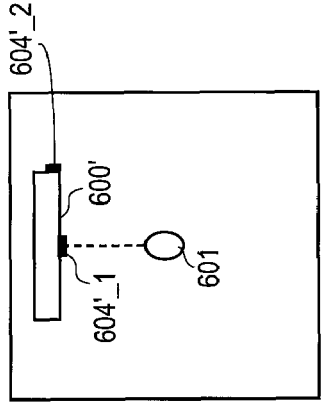
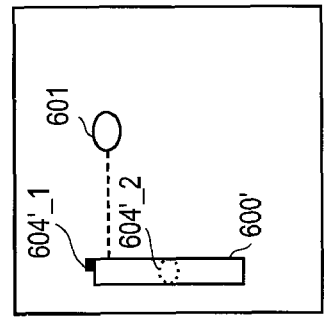
FIG. 6C (ii) FRONT VIEW
FIG. 6C (iii) TOP VIEW
FIG. 6C (iv) SIDE VIEW
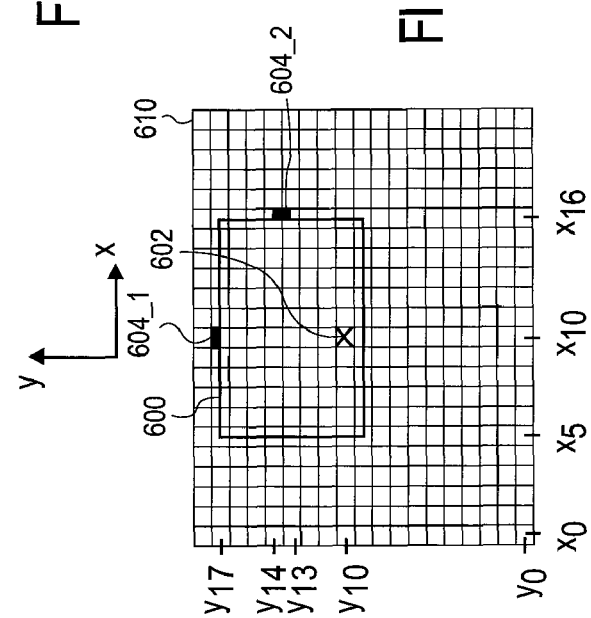
FIG. 6C (i)

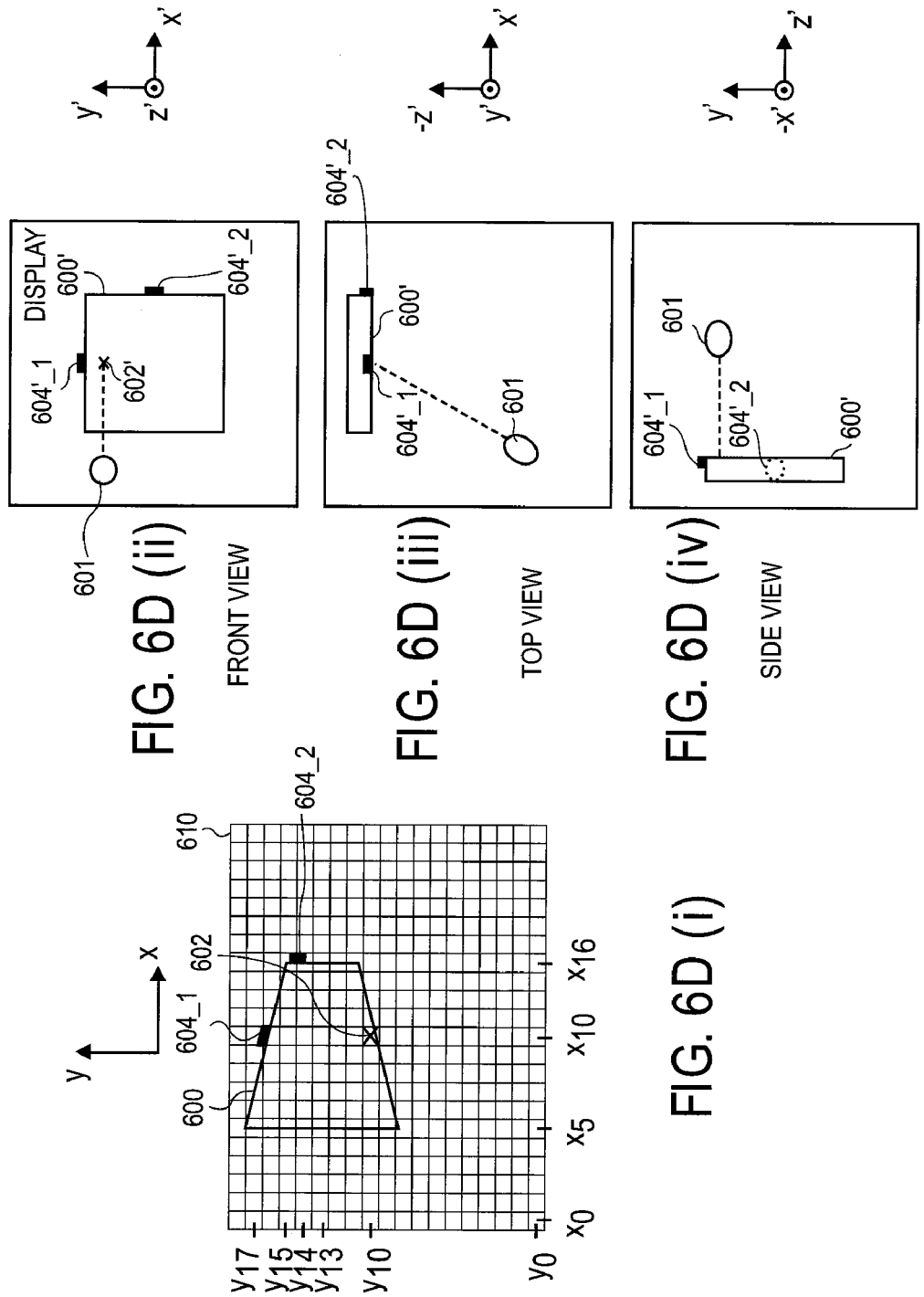

FRONT VIEW
(ROLL)

TOP VIEW
(YAW)

SIDE VIEW
(PITCH)

HANDHELD VISION BASED ABSOLUTE POINTING SYSTEM

RELATED APPLICATIONS

The present invention is related to, and claims the benefit of U.S. Provisional Application No. 60/593,413, entitled, "Electronic Vision Based Remote Control System" filed on Jan. 12, 2005.

FIELD OF INVENTION

The field of the invention relates to the electronic system arts, and, more specifically to a handheld vision based absolute pointing system.

BACKGROUND

FIGS. 1 and 2 show the most pertinent types of handheld devices used for controlling electronic equipment. FIG. 1 shows a mouse 101 that controls the position of a cursor 102 on the display 100 of a computer. The mouse 101 typically has a track-ball mounted on its underside that is used to translate the position of the mouse on the horizontal surface 103 that it "rolls-on" into the position on the computer display 100 that the cursor 102 is displayed at. A typical mouse will transmit (e.g., wirelessly through a radio frequency (RF) transmitter or electronically through a cable) data that describes the rolling activity of the mouse's track ball to the computer. The computer, in turn, translates this information into an appropriate screen position for the cursor 102. The mouse 101 also includes buttons that can trigger certain actions on the computer when the cursor 102 overlaps or points to a "button" or "menu" or other feature that is displayed on the computer screen 200.

FIG. 2 relates to handheld devices used for controlling entertainment related electronic equipment. With respect to televisions, currently, the typical system includes a television that is coupled to an external "box" 203 having circuitry designed to provide a certain type of "signal" to the television. Examples of such circuitry include cable TV receiver circuitry, satellite TV receiver circuitry, Video Cassette Recorder (VCR) circuitry, Digital Video Disk (DVD) player circuitry, gaming device circuitry, a computer's circuitry, music player circuitry (e.g., CD player circuitry, stereo receiver circuitry, etc.). Over the course of the coming years, it is expected that more and more of the circuitry described above will be integrated into the television rather than being located in an external box.

Regardless of the packaging and location of the circuitry that provides a television signal, a remote control 201 is often used to make user selections on a television display 200. The opportunity to make selections is typically presented as some kind of software generated user interface that is superimposed over (or integrated with) a television signal. The user interface often includes bordered regions and/or icons (e.g., regions/icons 204, 205). Typically one of these regions/icons 204, 205 is "highlighted" if the user is deemed to have implicated the particular region/icon. In order to implicate a particular region/icon, the user presses one of a plurality of arrow buttons 202 that "point" in a direction where a next region/icon to be highlighted/implicated is located on the television display 200. The remote control 201 also typically includes a "select" button that, when pressed by the user, triggers some action (typically via transmission of infrared (IR) codes) by the television's circuitry or external box circuitry consistent with what the highlighted region/icon represents.

FIG. 3 shows that digital cameras have also been integrated into handheld devices. Besides standard "digital handheld cameras", digital cameras have also been integrated in equipment having a traditional or primary purpose different than taking pictures. Cell phones, for instance, are now available having an integrated digital camera. FIG. 3 shows a cell phone 301 in the process of taking a digital picture 302.

SUMMARY

A method is described that involves identifying one or more images of respective one or more fixed markers. Each marker is positioned on or proximate to a display. The images appear on a pixilated sensor within a handheld device. The method also involves determining a location on, or proximate to, the display where the handheld device was pointed during the identifying. The method also involves sending from the handheld device information derived from the identifying of the one or more images of respective one or more fixed markers. The method also involves triggering action taken by electronic equipment circuitry in response to the handheld device's sending of a signal to indicate the action is desired.

FIGURES

The present invention is illustrated by way of example and not limitation in the Figures of the accompanying drawings, in which like references indicate similar elements and in which:

FIGS. 4a through 4c show different depictions of absolute pointing;

FIG. 5b through 5e show various layouts of marker(s) used for calculating an absolute pointing position;

FIGS. 6a through 6d show different images captured by the handheld device's camera in relation to the manner in which a handheld device faces an electronic equipment display;

FIGS. 7a through 7c show different processes that can be executed to effect absolute pointing with a handheld device such as the handheld device of FIG. 5a;

Figure 1:
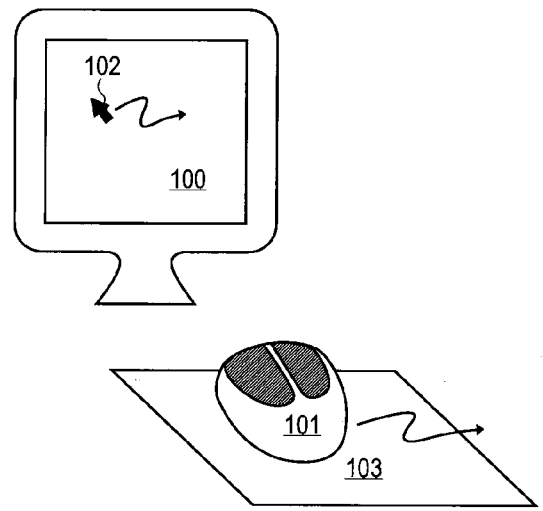
FIG. 1 shows a computer mouse (prior art)
Figure 2:
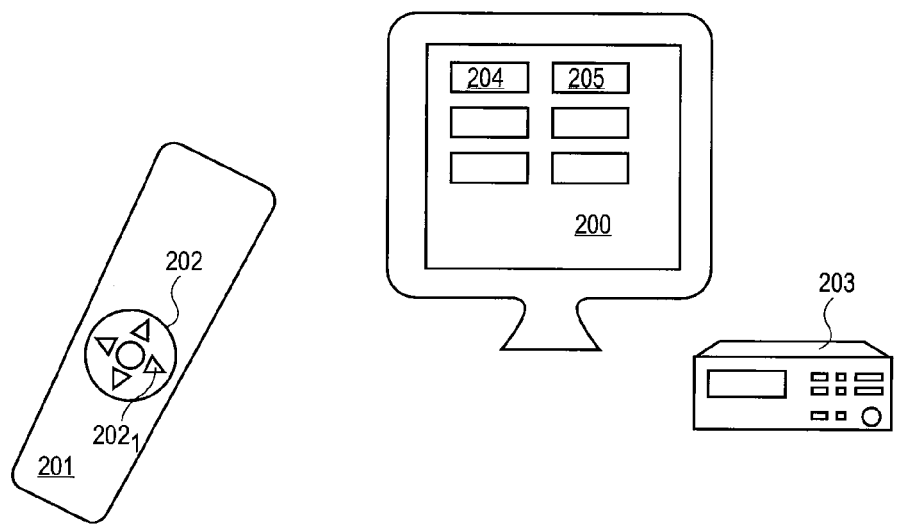
FIG. 2 shows a remote control (prior art)
Figure 3:
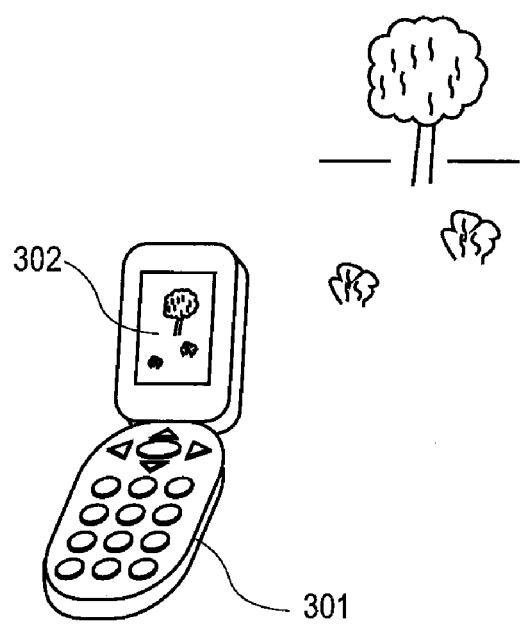
FIG. 3 shows a cell phone with an integrated digital camera (prior art)

DETAILED DESCRIPTION 1.0 Absolute Handheld Device Pointing

Presently, an "absolute pointing" handheld device system for use with electronic equipment is described. Absolute pointing from a handheld device may involve: 1) determining a location on, or proximate to, a display where a handheld device is being pointed; and, 2) rendering some kind of image (e.g., a cursor, icon, highlighted region, menu choice) at that location, and/or, triggering some kind of action from a user interface feature presented at that location. For example, in the case of simple cursor, the handheld is pointed at the display surface and the cursor is displayed at the location on the display where the handheld device is pointing. If the handheld device moves so as to a point to a new location on the display, the cursor is displayed at the new location.

Absolute pointing from a handheld device may also, or by itself, involve: 1) determining a location proximate to a display where the handheld device is being pointed (e.g., the location of specific electronic equipment placed proximate to the display); and, 2) rendering some kind of image (e.g., a cursor, icon, highlighted region, menu choice) on the display, and/or, triggering some kind of action from that location (e.g., causing the specific electronic equipment to render an image or take some specific action as a consequence of its being pointed to). Absolute pointing from a handheld device may also, or by itself, involve: 1) determining that a specific appliance (e.g., a lamp) or other type of electrical equipment is being pointed to; and, 2) triggering some kind of action at that appliance or other type of electrical equipment. For simplicity, the following discussion will largely, although not entirely, refer to the absolute pointing usage case initially described above wherein a handheld device is pointed at a display and causing some activity at or from that location on the display.

In the case of triggering some kind of action, the handheld device may point to a feature that is part of a user interface (e.g., an icon or menu choice) that is displayed on the display. Here, the feature is understood to mean that some kind of action will be taken by electronic equipment controlled through the user interface (e.g., the selection of a television signal, the opening of a file, the startup of a software routine, etc.). If a user holding the handheld device takes some kind of action (e.g., presses a button on the handheld device or "jerks" his/her wrist), a signal is sent from the handheld device that is ultimately interpreted to mean that the action suggested by the feature is desired by the user.

FIGS. 4a through 4c demonstrate examples of absolute pointing between a handheld device 401 and a display 400', where the handheld device 401 is located in a different position and points to a different display location ("X") across each of FIGS. 4a through 4c. Each of FIGS. 4a through 4c show a facing view (i), a top view (ii), and a side view (iii) for their respective handheld device 401 and display 400' orientation. The facing views 4a(i), 4b(i), 4c(i) show their respective handheld device 401 and display 400' orientation from a perspective that is directly in front of and facing the display 400'.

The top views 4a(ii), 4b(ii), 4c(ii) show their respective handheld device 401 and display 400' orientation from a perspective that is above the display 400' looking directly down to the top of the display 400' and the handheld device 401. The side views 4a(iii), 4b(iii), 4c(iii) show their respective handheld device 401 and display 400' orientation from a perspective that is off the display's "left" hand side looking directly at the display's side and the handheld device's side 401. Here, the term "left" is taken from the perspective of viewer standing in front of and facing the display 400'.

Note that these depictions indicate that the +y' direction is a direction that moves vertically relative to a viewer of the display 400' surface, the +x' direction is a direction that moves horizontally to the right 400' relative to a viewer of the display surface, and, the +z' direction is a direction that moves directly away from the front of the display 400' surface.

FIG. 4a shows a first set of perspectives when the handheld device 401 is beneath the display's left hand side and points to a location near the display's upper right hand corner. FIG. 4b shows a second set of perspectives when the handheld device 401 is beneath the display's right hand side and points to a location near the display's lower left hand corner. FIG. 4c shows a third set of perspectives when the handheld device 401 is above the display's left hand side and points to a location near the display's lower right hand corner. Importantly, in the case of simple cursor operation, a cursor would be made to appear at each "X" location observed in FIGS. 4a(i), 4b(i) and 4c(i). In the case of triggering some kind of activity, some kind of user interface or icon may be presented at each "X" location observed in FIGS. 4a(i), 4b(i) and 4c(i).

Figure 5A:
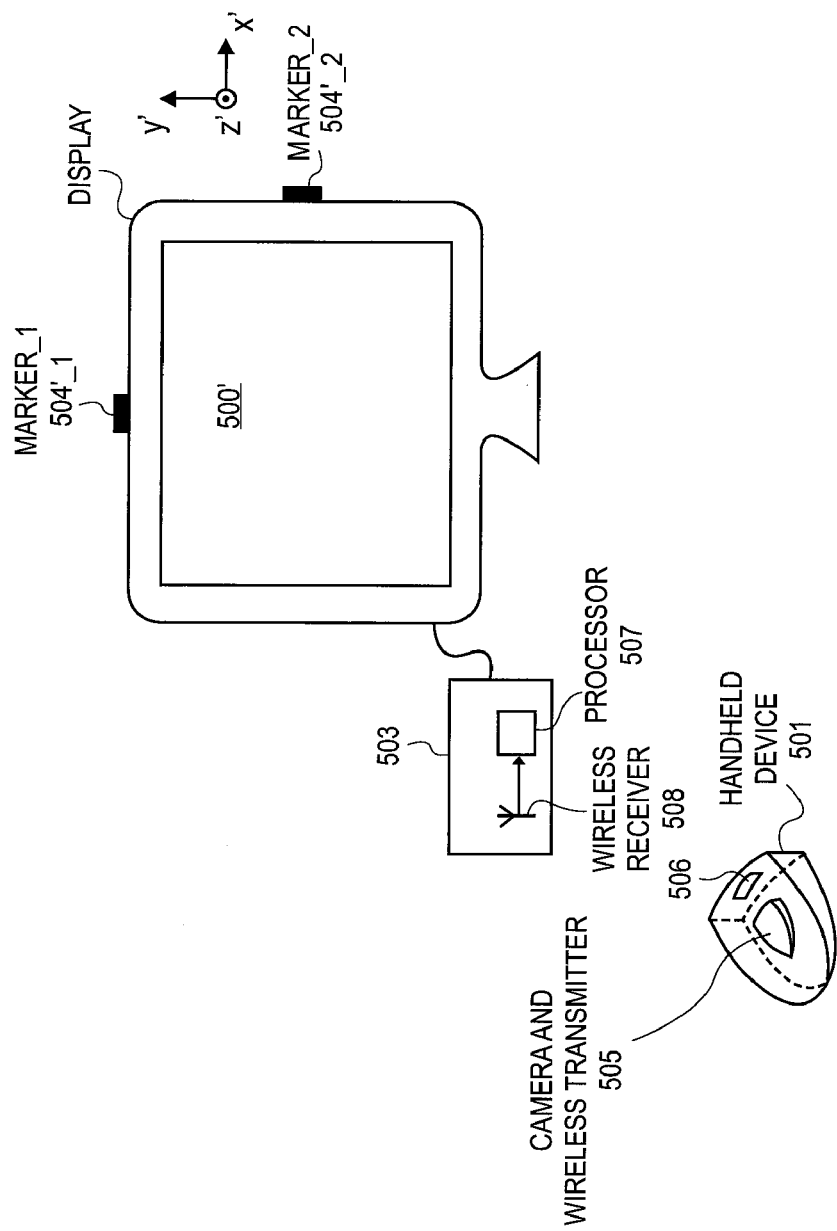
FIG. 5a show an embodiment of a handheld device having an integrated camera for purposes of effecting absolute pointing of the handheld device relative to an electronic equipment display.

FIG. 5a shows a more detailed embodiment of a handheld device 501, display 500' and electronic equipment 503 capable of effecting absolute pointing as described just above with respect to FIGS. 4a through 4c. The handheld device 501 includes a camera and wireless transmitter 505. Information taken or processed from an image captured by the handheld device's camera is transmitted by the handheld device's wireless transmitter to a wireless receiver 508. Alternatively, the communication between the handheld device and the electronic equipment 503 may be achieved using a wired connection, such as Universal Serial Bus (USB) or RS-232 serial cabling. Electronic circuitry (such as a processor 507, or a controller, or circuitry that does not execute program code) that is responsible for controlling the presentation of a cursor on display 500 and/or presenting a user interface on the display 500', receives the information sent by the handheld device 501. The electronic circuitry may be integrated in various types of electronic equipment. For instance, electronic equipment 503 may be any of: a) a television; b) a satellite TV receiver; c) a cable TV receiver; d) a VCR; e) a DVD player; f) a computer; g) a CD player; h) a music receiver and/or player; i) a video game box or some other type of equipment containing gaming circuitry; j) an IPTV receiver and/or television; k) a "receiver" that receives signals from one or more items of electronic equipment such as those listed in a) through j) above; l) home and/or office automation equipment (e.g., equipment including circuitry for turning household switches "on" and "off").

According to some basic possible operations, in response to the receipt of this information, the electronic circuitry causes a cursor (or other image) to be presented at the display location where the handheld device 501 is pointing and/or causes a user interface feature that is at the display location where the handheld device 501 is pointing to be highlighted in some fashion. Here, note that fixed markers 504'_1 and 504'_2, which are detectable by a sensor, are positioned proximate to the display 500'. As will be described immediately below with respect to FIGS. 6a through 6d: 1) the positions of these fixed markers 504'_1 through 504'_2 are observed by the handheld device's camera; and, 2) typically, from the perspective of the face 506 of the handheld device 501, at least one or more of these positions "change" as a function of the location and pointing direction of the handheld device.

By capturing the positions of these fixed markers 504'_1 through 504'_2 with the handheld device's camera, and, through the automated execution of mathematical relationships (at the handheld device, with the aforementioned electronic circuitry, a combination of both, etc.) that relate the observed marker positions to the pointed to location on the display surface, a cursor can be made to appear at the pointed to display location, and/or, some kind of action can be triggered from a user interface feature presented at the pointed to display location. The fixed markers in FIG. 5a are one possible two-marker arrangement. Other arrangements that comprise one, two, three, four, or more markers placed in other locations relative to both each other as well as the display 500' are possible.

As discussed above, various arrangements of various numbers of markers may be used to enable absolute pointing. Essentially, if the handheld device "moves" along a certain axis, the positioning of the marker(s) will "move" from the perspective of the handheld device's sensor along the same axis. For example, if the handheld device moves along the x axis, the pixel location(s) of the marker(s) along the x axis of the handheld device's sensor will change. As such, the specific placement of the marker(s) can be varied from embodiment to embodiment. Moreover, increasing the number of markers enables the ability to more precisely calculate the handheld device's pointing position. Nevertheless, as described in more detail further below in Section 4.0, sufficient accuracy for at least some applications is conceivable where only a single marker is used.

FIGS. 5b through 5e explore some possible marker layout arrangements for single marker (FIG. 5b), two marker (FIG. 5c), three marker (FIG. 5d) and four marker (FIG. 5e) embodiments. For each of the embodiments observed in FIGS. 5b through 5e, the distance between the marker and display may vary (of course, the distance should not be such that the marker can not be seen by the handheld device). Moreover, it is possible to position a marker on the display itself as well.

FIG. 5b shows an embodiment where a single marker 514 is placed along the side of the display. In alternate approaches the marker may be placed in or about the corner of the display. FIG. 5c(i) shows a two marker embodiment where both markers 515_1, 516_1 are positioned along the same side of the display. FIG. 5c(ii) shows another embodiment where each of the pair of markers 515_2, 516_2 are positioned along different display sides. In other embodiments, one or both markers of a two marker embodiment may be positioned in or about one or more corners of the display (e.g., by placing the pair of markers around the same corner, or putting a first marker at a first display corner and the second marker at another display corner). In two marker systems the pair of markers may be placed at the same or in different z' positions.

FIGS. 5d(i) through 5d(iv) show various three marker embodiments. FIG. 5d(i) shows each one of three markers positioned along a different display side. FIG. 5d(ii) shows each one of three markers positioned along a same display side. FIG. 5d(iii) shows three markers along a same display side where two of the markers have a same y' axis location. FIG. 5d(iv) shows three markers along a same display side where one marker has a different z' location than the other two markers. Various other arrangements are also possible. Generally, as long as the three markers can be seen by the handheld device and they each possess a unique x',y',z' location a workable system can be implemented.

FIGS. 5e(i) through 5e(iii) show various four marker embodiments. According to the approach of FIG. 5e(i) each one of the markers is positioned along a different side of the display. According to the approach of FIG. 5e(ii) each of the markers is positioned in a different corner of the display. According to the approach of FIG. 5e(iii) more than one marker is positioned along a same side of the display. Like the two and three marker systems, as long as the three markers can be seen by the handheld device and they each possess a unique x',y',z' location a workable system can be implemented.

FIGS. 6a through 6d show images of markers for a two marker system, as observed through the handheld device's camera, for different handheld device positions and pointing orientations relative to the display surface (similar to FIGS. 4a through 4c). Each of FIGS. 6a through 6d include four sub-figures (i) through (iv). Each of FIGS. 6a(i), 6b(i), 6c(i) and 6d(i) include exemplary images 604_1, 604_2 of the display markers 604'_1 and 604'_2 as observed on a pixilated sensor 610 that corresponds to the "image capture" portion of the handheld device's camera. Each of FIGS. 6b(ii), 6c(ii) and 6d(ii) show a front view of the respective handheld device position and pointing direction, each of FIGS. 6b(iii), 6c(iii) and 6d(iii) show a top view of the respective handheld device position and pointing direction; and, each of FIGS. 6b(iv), 6c(iv) and 6d(iv) show a side view of the respective handheld device position and pointing direction.

The (x',y',z') coordinate system described above with respective FIGS. 4a through 4c is preserved for the (ii), (iii) and (iv) sub-figures of FIGS. 6a through 6d. For the (i) sub-figure, a new co-ordinate axis (x,y) is introduced to represent the pixilated sensor's specific pixel locations. Here, the +y direction corresponds to vertical movement up the surface of the sensor, and, the +x direction corresponds to horizontal movement to the right along the surface of the sensor. Pixilated sensors may be made from various technologies such as CMOS, CCD, or photodiode arrays.

Referring first to FIG. 6a, note that FIGS. 6a(ii) through 6a(iv) indicate that the handheld device 601 is directly facing the center of the display 600'. As such, the location 602' on the display 600' that is pointed to by the handheld device 601 corresponds to the center of the display 600'. In this position, the markers 604'_1 and 604'_2 will appear as images 604_1 and 604_2 on the handheld device's sensor 610. Here, marker image position 604_1 is observed at pixel location x=10, y=14; marker image position 604_2 is observed at pixel location x=16, y=10.

Prior to operation, an initial calibration procedure is needed in order to determine values for variables that appear within mathematical relationship(s) that convert a detected marker position on the sensor 610 into the position on the display 600' where the handheld device is pointing. There are several ways in which the calibration may be performed and any specific procedure may depend on the specific embodiment of the system being used. According to one calibration approach, the user points at one or more defined locations (generally, on or near the screen) and the handheld device records the marker image 604_1, 604_2 positions on the sensor array 610 (a more detailed description of specific calibration procedures is given in section 4.0 below). In embodiments involving fewer markers, the calibration procedure may involve pointing sequentially at visible markers (typically two) displayed temporarily on the screen (e.g., in opposite corners).

After calibration, changes in observed marker image 604_1, 604_2 position on the sensor 610 surface in response to changes in the handheld device's location and pointing direction can be defined in reference to their original calibration positions; which, in turn, can be related to a position on the display 600' where the handheld device 601 is pointing.

FIG. 6b(i) shows observed sensor images when the handheld device 601 remains positioned in front of the display's center (as in FIG. 6a), but, points toward the top center of the display. Because of the change in vertical pointing direction of the handheld device 601 but fixed horizontal position relative to FIG. 6a, the x coordinate values for the marker images 604_1 and 604_2 will remain unchanged as compared to their values in FIG. 6a(i) (i.e., x=10 and 16 for marker images 604_1 and 604_2, respectively); but, each of their y coordinate values will increase relative to their values in FIG. 6a(i). Moreover, the vertical distance between marker images 604_1 and 604_2 of FIG. 6b(i) will be compressed as compared to this distance in FIG. 6a(i) (i.e., 16−13=3 pixels in FIG. 6b(i) vs. 14−10=4 pixels in FIG. 6a(i).

The observed changes in the marker image positions of FIG. 6b(i) can be mathematically related to the handheld device's correct pointing location on the display 600'; which, in turn, can be used to generate a cursor at the pointing location or trigger an action from a user interface feature that appears at the pointing location. A thorough discussion of such mathematical relationships is presented in more detail further below in section 4.0 entitled "Mathematical Relationships For Absolute Handheld Device Pointing".

Generally, the more markers used, the more precisely the pointed to display location can be determined, but, the more processing is required. Mathematical relationships suitable for implementing one, two, three and four marker systems are presented in section 4.0. Although the relationships provided in section 4.0 primarily present relationships for determining a handheld device's absolute pointing direction, location, and orientation on or proximate to a display location through analysis of detected marker image position, it is also theoretically possible to enhance the accuracy of these systems through analysis of marker image size and shape.

FIG. 6c(i) shows observed sensor images when the handheld device 601 "rises" to a location that is directly above its location in FIG. 6b, but, directly faces the display 600 as in FIG. 6(a). Because the handheld device 601 is physically raised with respect to its position in FIGS. 6(a) and 6(b), and, directly faces the display as in FIG. 6(a), the x coordinate values of the marker images 604_1 and 604_2 will again remain unchanged, but, the vertical distance between marker images 604_1 and 604_2 of FIG. 6c(i) will be slightly expanded as compared to this distance in FIG. 6b(i) (i.e., 17−13.5=3.5 in FIG. 6c(i) vs. 16−13=3 in FIG. 6a(i)).

Again, the observed changes in the marker image positions of FIG. 6c(i) can be mathematically related to the handheld device's correct pointing location on the display 600'; which, in turn, can be used to generate a cursor at the pointing location or trigger an action from a user interface feature that appears at the pointing location.

FIG. 6d(i) shows observed sensor images when the handheld device 601 moves directly to its left from its position in FIG. 6c, but, adjusts its pointing direction so as to keep pointing to the same display location 602' that is pointed to in FIG. 6c. Because the handheld device does not make any changes along the y' axis, the y coordinate values of the marker images 604_1 and 604_2 remain unchanged in FIG. 6d(i) when compared against their values in FIG. 6c(i). Moreover, because the face of the handheld device has made substantial changes along both the x' axis and the z' axis, the x coordinate values for the marker images change substantially from their values in FIG. 6c(i). Again, the observed changes in the marker image positions of FIG. 6d(i) can be mathematically related to the handheld device's correct pointing location on the display 600'; which, in turn, can be used to generate a cursor at the pointing location or trigger an action from a user interface feature that appears at the pointing location.

Figures 7A, 7B, 7C:
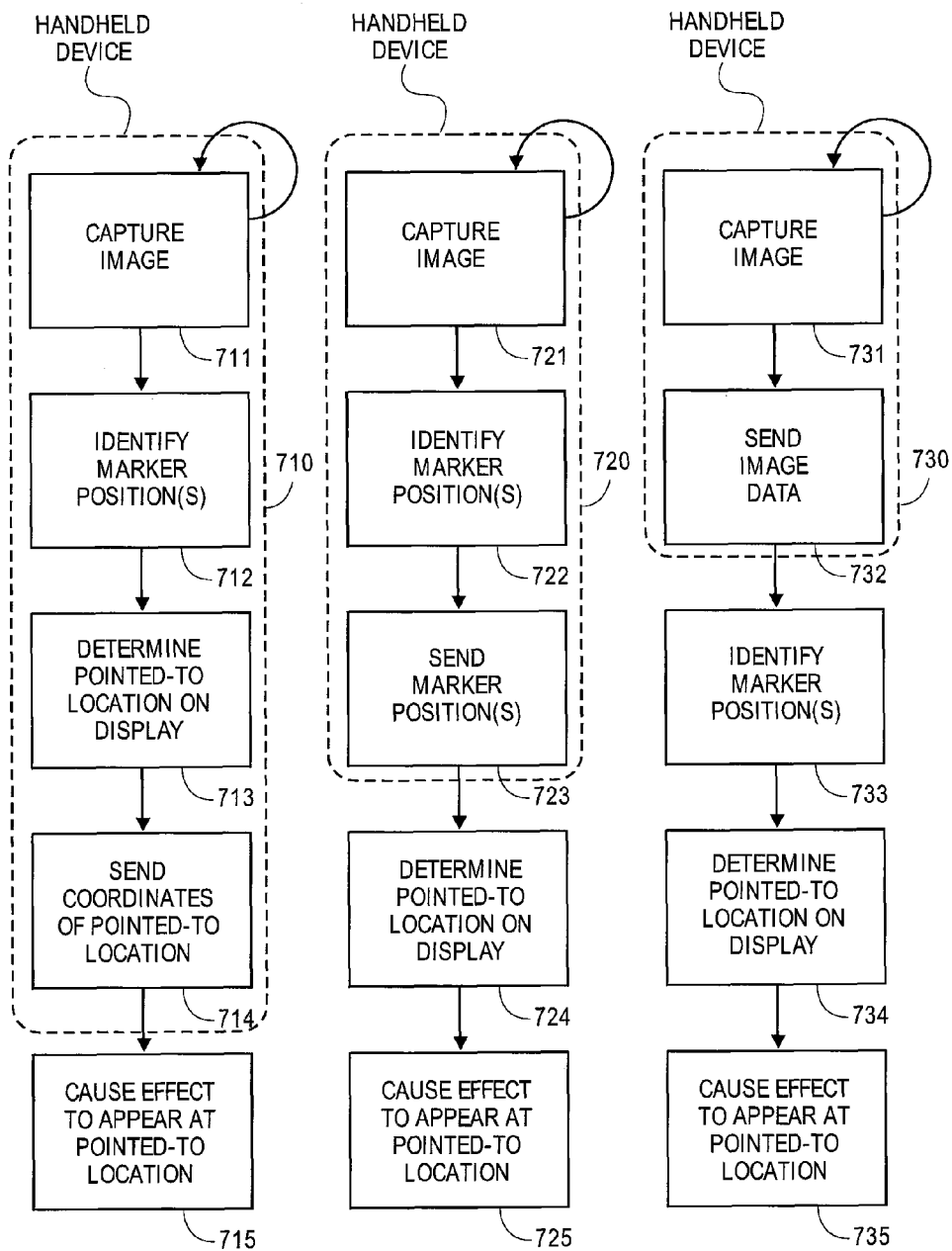

FIGS. 7a through 7c shows methodologies that can be executed by absolute pointing handheld device systems having different system designs. Most notably, the difference between the various designs involves the degree of processing that is performed by the handheld device. Referring to FIG. 5a as well as FIG. 7a, FIG. 7a depicts a method in which the handheld device 501 not only captures the marker image data, but also performs all of the mathematical relationship calculations needed to translate the observed marker image positions into a specific pointed to location on the display 500.

As such, the handheld device 501 transmits 714 the coordinates of the pointed to location on the display to the wireless receiver 508. The overall process includes the handheld device 501: 1) capturing 711 marker image data with its camera; 2) identifying 712 the positions of the respective marker images on the camera's pixilated sensor; 3) determining 713 the handheld device's pointed to location on the display through calculations with mathematical relationships; and 4) sending 714 the pointed to location to a wireless receiver 508. Electronic circuitry responsible for controlling displayed content on the display 500 may then cause some effect to appear at the pointed to location 715 (e.g., a cursor, highlighting a menu feature, etc.).

FIG. 7b depicts a method in which the handheld device 501 does not determine the handheld device's pointed to location on the display through calculations with mathematical relationships, but, besides capturing 721 marker image data with its camera also identifies 722 the positions of the respective marker images on the camera's pixilated sensor. As such, the handheld device 501 transmits 723 the marker positions to the wireless receiver 508. Electronic circuitry responsible for controlling displayed content on the display 500 receives the marker positions and determines 724 the handheld device's pointed to location on the display through calculations with mathematical relationships; and, may then cause some effect to appear at the pointed to location 725 (e.g., a cursor, highlighting a menu feature, etc.).

FIG. 7c depicts a method in which the handheld device 501 does not determine the handheld device's pointed to location on the display nor identify the positions of the respective marker images on the camera's pixilated sensor. Instead, the handheld device 501 simply captures 731 the marker images with its camera and transmits 732 information describing these images to the wireless receiver 508. Electronic circuitry responsible for controlling displayed content on the display 500 receives the marker image data and: 1) identifies 733 the positions of the respective marker images on the camera's pixilated sensor; 2) determines 734 the handheld device's pointed to location on the display through calculations with mathematical relationships; and, 4) may then cause some effect to appear at the pointed to location 735 (e.g., a cursor, highlighting a menu feature, etc.).

In each of FIGS. 7a through 7c note that the image data is repeatedly captured 711, 721, 731 over time so that new pointed to locations on the display can be determined with rapid regularity (e.g., so that a cursor's movement can be at least quasi-fluidly tracked on the display 500). Moreover, note that each of FIGS. 7a through 7c demonstrate a process in which an effect is made to appear on the display at the pointed-to location. Alternatively or in combination, additional information in the form of a "button press" or "roll action" of the handheld device may be sent from the handheld device in order to trigger electronic equipment to take some kind of action. For example, if the pointed to location corresponds to a displayed icon or a menu, and if the information sent from the handheld device for the pointed to location also includes some kind of button press or roll action, circuitry responsible for determining displayed content may interpret the collection of information sent from the handheld device to mean that the user has selected the icon or menu item.

Although detailed mathematical relationships are presented in more detail further below in section 4.0, FIGS. 8a through 8d and 9 provide some higher level details that can be applied, at least in certain embodiments, to useable mathematical relationships that translate observed marker image positions to a specific pointed to location 802' on or proximate to the surface of the display 800'. FIGS. 8a through 8d illustrate various three-dimensional concepts that may be defined and applied in a certain set of applicable mathematical relationships.

Figure 8A:
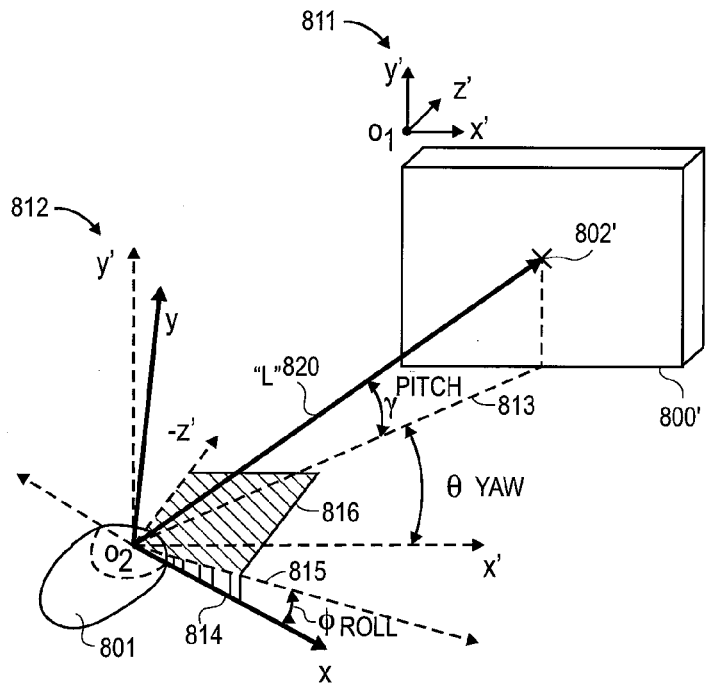
FIG. 8a through 8d shows three dimensional coordinate systems used for determining a handheld device's absolute pointing position on a display.
Figure 9:
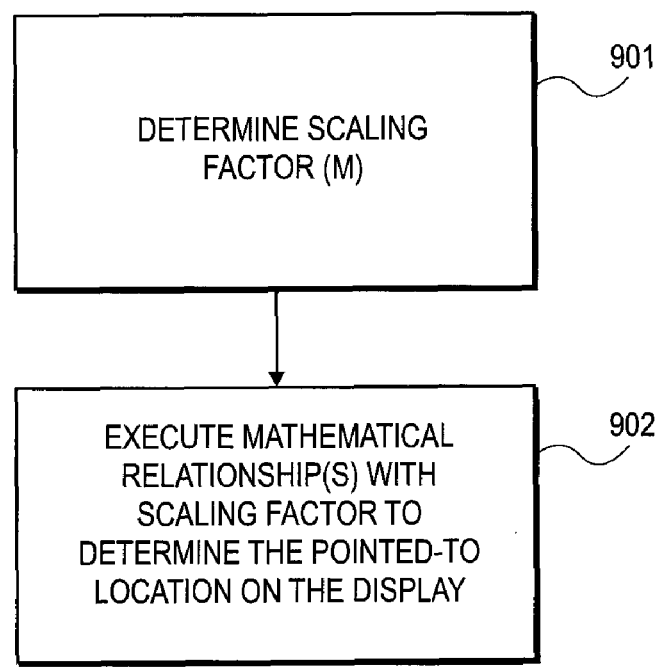
FIG. 9 shows a process for determining a handheld device's absolute pointing position on a display.

According to the depiction of FIG. 8a and the process flow of FIG. 9, determination of the pointed to location 802 on the display 800' involves: 1) determining 901 a scaling factor (M); and, 2) executing 902 mathematical relationship(s) that use the scaling factor M to translate an sensor axis location where a marker is observed to a corresponding axis location on the display where the handheld device is pointing. In an approach, a first scaling factor $M_X$ is calculated for one device/display coordinate axis pair (x, x') and a second scaling factor $M_Y$ is calculated for a second device/display coordinate axis (y, y'). Thus, the process observed in FIG. 9 is essentially executed twice, once for the x,x' axis pair and the other for the y,y' axis pair.

The scaling factor $M_X$ is essentially a ratio between the observed change in position of a marker on the sensor along the x axis, relative to a specific sensor position along the x axis, and the change in position of the pointed to location along the x' axis on the display, relative to a specific position on the display along the x' axis; where, the specific sensor and display positions are determined during calibration. As described in more detail below in section 4.0, the accuracy of the scaling factor can be made to improve if additional details concerning the handheld device are gleaned from the observed marker images. Specifically, the accuracy of the scaling factor can be enhanced if the position of the handheld device relative to the display (e.g., the distance L 820 between the center of the display 802 and the front of the handheld device) and/or the orientation of the handheld device relative to the display (e.g., the viewing angle θ of the handheld device 901) is determined.

According to various embodiments: 1) in calculating handheld device yaw or change in handheld device yaw, left or right movement of marker image positions is tracked; and, 2) in calculating handheld device position, the relative separation of marker image positions is tracked. Generally, the separation between all marker image positions scales inversely with distance from the display and the relative separations of different pairs of marker image positions depends on the handheld device angle with respect to the display surface.

Figure 8B:
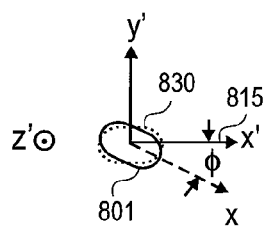
Figure 8C:
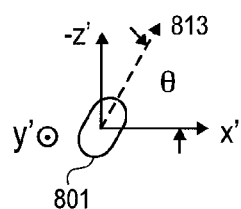
Figure 8D:
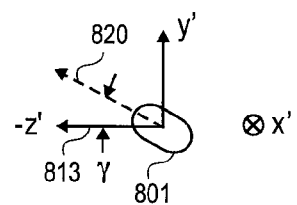

FIGS. 8a and 8b also indicate that another characteristic of the handheld device's orientation, referred to as the handheld device's "roll" φ, can be tracked from the marker image positions. Here, the handheld device's roll corresponds to the handheld device's rotation about the axis of its pointing vector (i.e., the vector protruding from the front of the handheld device whose intercept with the display corresponds to the pointed-to location on the display). In calculating the handheld device's roll φ, the collective rotation of the marker image positions is detected. In an implementation, the pointing vector is assumed originate from the center of the handheld device's sensor array. FIGS. 8a and 8d show the pitch γ of the handheld device. The effective pitch or change in effective pitch of the handheld device can also be determined so as to more accurately define the pointed to position on the display.

Figure 10A:
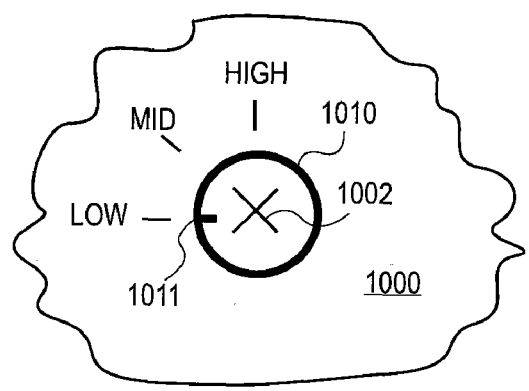
FIGS. 10a and 10b shows a "virtual dial" function capable of being implemented if a handheld device's absolute pointing vector and roll position is known.
Figure 10B:
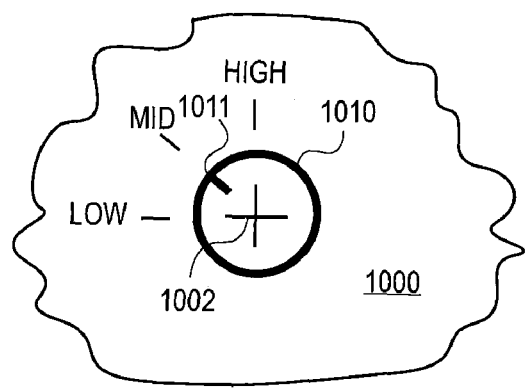

Since the sensor axes rotate with respect to the screen axes during device roll, it is possible that the calculated cursor location will be affected by the act of rolling, thus causing an offset error in the proper cursor placement. However, if the rotation of the sensor array is properly accounted for in the algorithm used for determining cursor location on the display, then the roll of the handheld device has no impact on its pointing vector calculation. In addition, according to one implementation, the handheld device's roll can be used to trigger some kind of action taken by electronic equipment. For instance, a "twist of the wrist" of the user can be interpreted as a "button press" (e.g., the user points the handheld device to an icon or user interface menu item and then twists his/her wrist to "select" that icon or menu item). FIGS. 10a and 10b demonstrate another useful application of tracking a handheld device's roll action. FIGS. 10a and 10 relate to a "virtual dial" function. According to a virtual dial implementation, a depiction of a dial 1010 is displayed on the display. In FIG. 10a the dial is illustrated as being set to a value of LOW 1011.

If the user points the handheld device at the dial and twists his/her wrist, the dial may be displayed so as to rotate in conjunction with the user's wrist rotation(s). Thus as seen in FIG. 10b, the user has pointed the handheld device to the dial and twisted his/her wrist clockwise 1002. In response, the displayed virtual dial 1010 rotated clockwise until the user's wrist rotation was deemed "stopped"; which, according to FIG. 10b, was at a setting of MID 1011. According to a further implementation, the user is expected to press a button on the hand held device during the rotation of the handheld device in order to activate the rotation of the dial 1010 (i.e., the user must press a button in combination with the wrist rotation). As such, the handheld device sends: 1) the pointed to location on the display (or information from which the pointed to location on the display can be determined); 2) the roll position(s) of the handheld device (or information from which the handheld device's roll action can be determined); 3) information that signifies the user is pressing a button.

According to one approach, the markers themselves act as the source of the light that is detected by the handheld device's sensor (e.g., the markers are implemented as LEDs). In other implementations, the handheld device acts as the source of light that is detected by the handheld device's sensor. For example, according to one such approach, the handheld device contains an infrared (IR) "flashlight", which shines IR light into the region of the display and each marker is implemented as a "passive" reflector. Additional image processing may be used to enhance the signal-to-noise ratio.

For example, characteristics of the emitted light that are detectable to the handheld device could be subtracted from the reflected images to essentially improve the signal to noise ratio of the detected marker images. In a further embodiment, the flashlight is "strobed" such that a representation of the emitted light to be subtracted from each detected marker image is taken just prior to the detecting of a marker image. Also, an IR filter may be placed over the camera to aid in the rejection of unwanted light.

Other applications that may benefit from the use of reflective markers include the application of a single handheld device to multiple appliances through the use of, for instance, home and/or office automation circuitry. According to one approach, the reflective reference markers are located on or near the appliance to be controlled, and, for each device, the reflective markers are arranged in a predetermined spatial pattern. The handheld device can then recognize a particular appliance by recognizing its specific pattern. Here, note that one or more of the appliances may not even have a display. Better said, the appliances themselves and/or their remote use may be simplistic (e.g., having only a few states such as "on" and "off") such that the simple act of pointing to the appliance and making one or a few button presses on the handheld device is sufficient to enable use of the device. Example of such appliances include lamps, radios and televisions.

Various formats can be used for the spatial marker patterns that identify a specific device/appliance. Examples include ones similar to those used in bar-codes (i.e., universal product codes), and simple on/off binary codes. The number of required markers per appliance will depend on the number of different appliances that need to be identified and/or the pattern format used. For most household applications it is likely that this number will be small (less than five). When the handheld device is pointed at an appliance (e.g., a lamp) and the appropriate button(s) on the handheld device is pressed (and/or an appropriate gesture is made with the device), the handheld device is programmed to send the appropriate command by wireless transmission (e.g., RF or IR) to the appliance, either directly or through a central command unit (e.g., electronic equipment 503 such as an X10) that actually sends the command to the pointed to appliance directly.

According to one approach the command is sent in a packet that includes the identity of the appliance being pointed to (i.e., the handheld device is programmed with the pattern recognition capability to identify each specific appliance). In an alternate approach the handheld device sends the image pattern and handheld device action (e.g., button press, rolling action, etc.) or command to another device (e.g., the aforementioned central command unit). The other device then: 1) recognizes the pointed to appliance; and 2) sends/forwards a command to the pointed to appliance. A variety of commands may be communicated to an appliance including simple power on/off and increase/decrease of different appliance properties (e.g., light intensity, oven temperature, sound volume, etc.).

In cases where the handheld device directly commands an appliance, or in cases where an intermediate unit (e.g., the aforementioned command unit) wirelessly commands an appliance, the appliance will need to be configured with some sort of command detection and functional effectuation circuitry that may be fairly regarded as home and/or office automation circuitry (e.g., a integrated circuit having a wireless receiver coupled to a processor/controller (with executable code) and/or logic state machine circuitry (no executable code) that is coupled to a switch or other functional effectuation circuitry (such as a "selection" or "setting" circuitry (e.g., channel setting/selection, temperature setting/selection, volume setting/selection, etc.)). Note also that the remote control of simplistic appliances through the use of the handheld device may be implemented separately from, or in combination with, the displaying of a pointed to location on a display.

2.0 Handheld Device Hardware Design Embodiments

Figure 11:
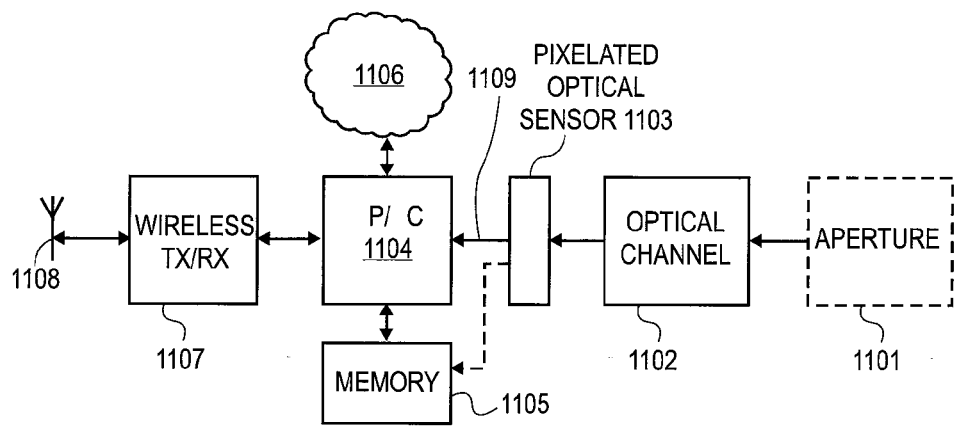
FIG. 11 shows an embodiment of a design for a handheld device capable of effecting absolute pointing control relative to an electronic equipment display.
Figure 12:
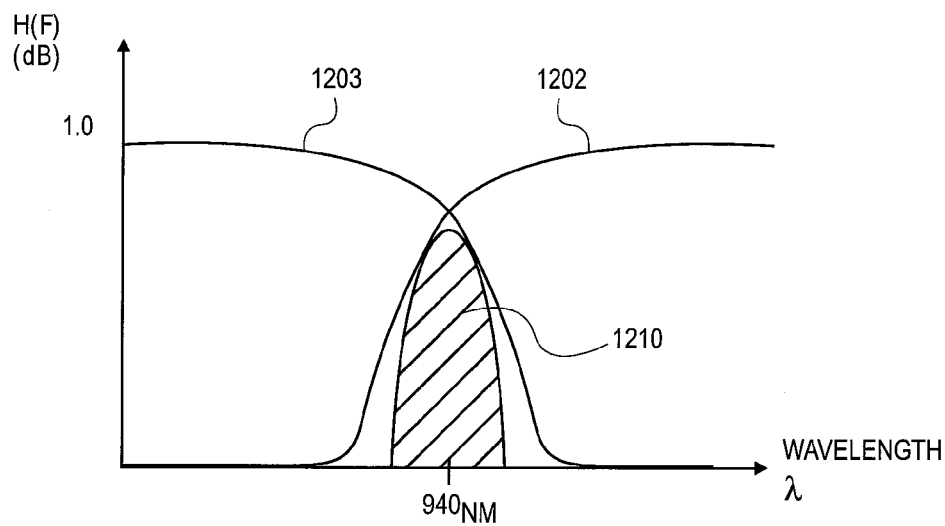
FIG. 12 shows an exemplary optical transfer function that can be implemented with the design presented in FIG. 11.

FIGS. 11 and 12 relate to a handheld device's hardware design. According to FIG. 11, a handheld device may include an aperture 1101 (positioned on the front face of the handheld device), an optical channel 1102 that include various optical component (e.g., lenses, diffusers, filters, etc.), and a pixilated sensor 1103. Together, the aperture 1101, optical channel 1102 and sensor 1103 form a digital camera whose output 1109 is coupled to a processor or controller 1104 (alternatively, the digital camera's output values can be written into a memory 1105 from where they are read and provided to the processor or controller 1104).

Program code 1106 is executed on the processor/controller 1104 so that various functions can be performed (e.g., marker image position detection, mathematical calculations for relating detected marker image positions to a specific pointed to display location, mathematical calculations for relating detected marker image positions to the handheld device's roll position, wired or wireless communication reception and transmission protocols, etc.). Not shown in FIG. 11 is a non-volatile memory device for storing the handheld device's program code, nor, one or more buttons that are coupled to the processor/controller 1104. In an embodiment, memory 1105 is made of Dynamic Random Access Memory (DRAM) cells because of its low cost and low power consumption.

A controller is understood to be a processor having a specially targeted instruction set. A processor is understood to be logic circuitry designed to execute program code 1106 instructions. Different forms of processors and controllers exist such as micro-processors, micro-controllers, embedded processors and embedded controllers. The processor or controller is also coupled to wireless transceiver circuitry 1107; which, in turn, is coupled to an antenna 1108 that sends/receives wireless signals. Conceivably, processor/controller 1104 could be replaced with dedicated logic circuitry designed to perform the applicable mathematical calculations and/or marker image position detection functions.

According to a process flow that is consistent with FIG. 7a, data from the pixilated sensor 1103 is processed by the processor/controller 1104 to detect the marker image positions on the pixilated sensor 1103. The processor/controller 1104 then executes mathematical calculations to relate the marker image positions to a specific pointed-to display location. The processor/controller 1104 then prepares data that identifies the pointed-to location for wireless transmission and causes it to be forwarded to the wireless transceiver circuitry 1107 which in turn causes it to be sent from the wireless device.

Wireless transceiver circuitry includes both transmitting and receiving circuitry. In a simpler embodiment, circuitry 1107 is wireless transmitter circuitry (i.e., the handheld device is not designed to receive and process wireless signals other than the electromagnetic radiation that enters the camera's aperture). Various wireless solutions exist such as the wireless Universal Serial Bus (USB), Z-Wave, IR, IEEE 802.15.1 (BLUETOOTH), IEEE 802.15.4 (ZigBee), or IEEE 802.11 (WiFi) standards, as well as wired solutions such as the USB or RS-232 serial standards. In another possible implementation, the handheld device sends information to the electronic equipment through wiring rather than wirelessly. As such, the wireless transceiver 1107 and antenna 1108 are replaced with driver circuitry 1107 and wiring that is coupled to the applicable electrical equipment.

According to a process flow that is consistent with FIG. 7b, data from the pixilated sensor 1103 is processed by the processor/controller 1104 to detect the marker image positions on the pixilated sensor 1103. The processor/controller 1104 then prepares data that identifies the marker image positions for wireless transmission and causes it to be forwarded to the wireless transceiver circuitry 1107 which in turn causes it to be sent from the wireless device.

According to a process flow that is consistent with FIG. 7c, data from the pixilated sensor 1103 is prepared for wireless transmission by the processor/controller 1104 and causes it to be forwarded to the wireless transceiver circuitry 1107 which in turn causes it to be sent from the wireless device. In an alternate embodiment that is consistent with FIG. 7c, the processor/controller 1104 is replaced with circuitry that merely forwards pixilated sensor data to the wireless transceiver circuitry 1107. Note that the wireless transceiver circuitry 1107 could conceivably be replaced with driver circuitry for driving electrical signals from the handheld device over cabling toward the display.

FIG. 12 shows an exemplary optical channel design for the handheld device's camera. According to the depiction of FIG. 12, a "bandpass filter" is essentially created with the optical transfer function of the pixilated sensor 1103 and the transfer function of an optical filter that is built into the handheld device's optical channel 1102. According to the specific embodiment of FIG. 12, the pixilated sensor 1103 is a silicon-based CMOS device. Other sensor types such as CCD and photodiode arrays may also be used. CMOS devices have an optical transfer function 1203 that essentially corresponds to a low pass filter that rolls off on the high end of its passband above a peak response near 940 nm. The optical channel 1102 is made to include an Infrared (IR) high pass filter 1202 that rolls off on the low end of its passband below 940 nm. Commercially available IR-pass filters such as a Kodak Wratten 87C, Hoya IR-85, or their equivalents are appropriate for this purpose.

The combination of these two filters 1202, 1203 results in a narrow passband 1210 around 940 nm. Here, referring back to FIG. 5, if the markers 504_1 through 504_4 themselves are made to be IR transmitters (e.g., Light Emitting Diodes (LEDs)), ideally, the pixilated sensor 1103 will present a strong detected "signal" at its output 1109 that corresponds mostly to the electromagnetic radiation received from the markers 504_1 through 504_4 with little background from other electromagnetic radiation that is received through the handheld device's aperture 1101.

Other optical approaches are possible, however. For instance, the handheld device 501 may be designed to include its own IR transmitter and the markers 504_1 through 504_4 may be implemented as mere mirrors (or, further, IR reflecting mirrors). The transfer function of the optical channel 1102 itself may be a specific passband (e.g., by including both a high pass filter and a low pass filter). Moreover, conceivably, with a pixilated sensor having a transfer function that corresponds to a high pass filter rather than a low pass filter, the transfer function of the optical channel 1102 may be made to correspond to a low pass filter.

Also, conceivably, the designed-for passband of the camera as a whole (i.e., both optical channel and pixilated sensor 1103) may be just a high pass filter or a low pass filter. In other embodiments, little or no optical filtering may be performed in hardware, rather, filtering (if any) is performed in software by the processor/controller 1104; or, with dedicated logic circuitry. The wavelength of the electromagnetic radiation that is used to form the marker images is a matter of design choice. Besides a spectrum that resides within the IR spectrum (approximately 800-950 nm), other possible wavelength ranges for the marker images may be used. In general, based on commercially available light sources and sensors, use of the visible to near IR (approximately 400-1000 nm) region of the spectrum is preferable. While silicon-based detector arrays (e.g., CMOS and CCD) are best suited for this wavelength range, other materials such as gallium arsenide and germanium may be used to extend further into the IR.

Note that, as described in more detail below with respect to FIG. 13b, the optical channel 1102 may be made to include a diffuser or an "out-of-focus" optical path to deliberately blur a marker image so that it is easier to detect. The larger marker size can permit more accurate determination of the true center position of the marker. This may be achieved using interpolation algorithms that result in sub-pixel resolution.

3.0 Image Marker Detection Processing Methods

Figure 13B:
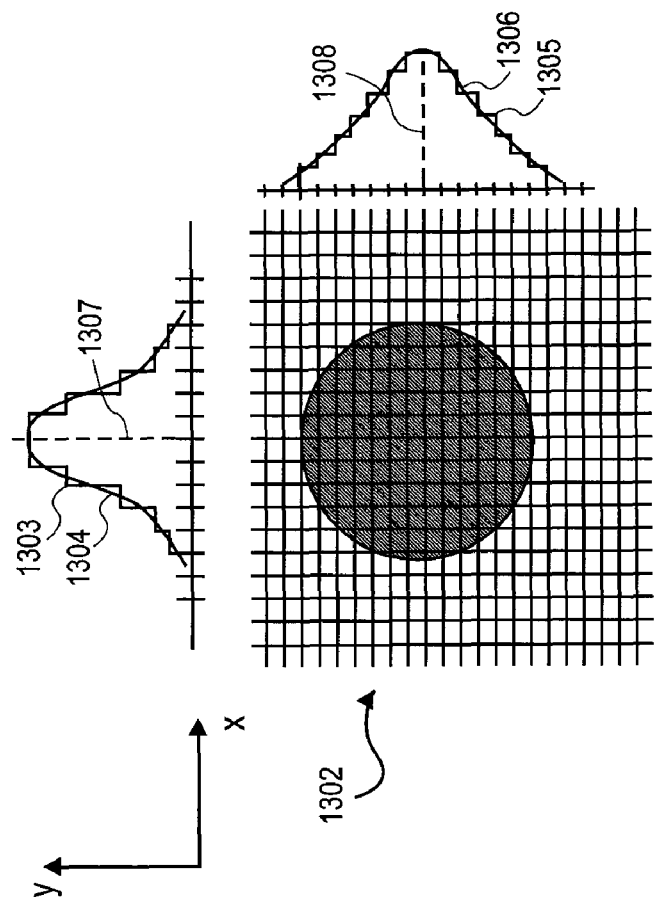
FIGS. 13a and 13b show different marker sizes that can be formed and directed to a handheld device's sensor.
Figure 13A:
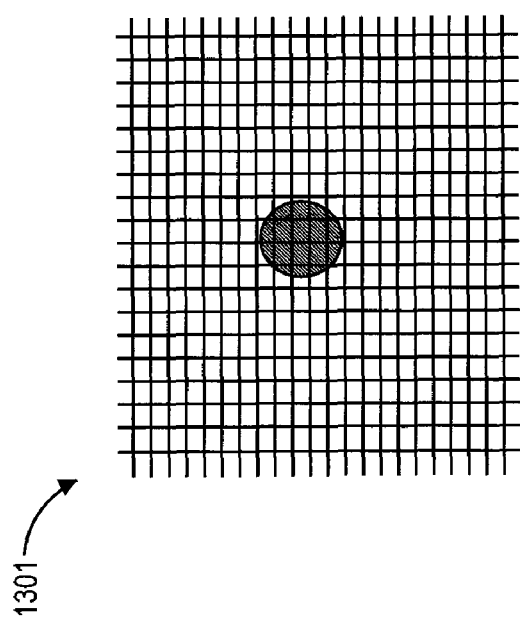

FIGS. 13a,b, 14 and 15 relate to marker image position detection processing methods. According to the system methodology of FIGS. 7a and 7b, marker image position detection is performed by the handheld device. According to the system method of FIG. 7c, marker image position detection is performed by circuitry associated with electronic equipment that is responsible for controlling the displayed content on the display (or at least circuitry that is coupled to such circuitry).

FIG. 13a shows a depiction of a pixilated sensor illuminated by a marker image's radiation. If, for example, the passband of the handheld device's camera corresponds to a bandpass filter (e.g., as described with respect to FIG. 12) such that, ideally, only electromagnetic radiation from a marker is responded to by the pixilated sensor, then, the amount of marker radiation that a pixel receives will determine that pixel's output value. According to one embodiment, each pixel has an 8 bit output allowing for 256 different intensity values.

In the case where, ideally, only marker image radiation impinges upon the pixilated sensor, those pixels that are fully illuminated with radiation from a marker should produce a "high" output value toward 256, those pixels that are only partially illuminated with radiation from a marker should produce a "medium" output value around 128, and those pixels that receive no radiation from a marker should produce a "low" output value around 0. Of course, the stated values may drop the further the handheld device is positioned from the markers. FIG. 13a has depicted as "dark" those pixel regions that are illuminated with radiation from a marker. Notably a darkened circle is observed. Pixels within the circle would therefore ideally have values toward 256, pixels at the periphery of the circle would have values around 128, and, pixels outside the circle would have values around 0. In this case, the collection of these values correlated to the two-dimensional (x,y) coordinates of their corresponding pixels corresponds to the marker's image (or, the pixilated sensor's output signal for this marker image).

FIG. 13b shows a representation 1302 of a marker image that is larger than the marker image of FIG. 13a. Here, as is well understood in the field of optics, light can be focused to small "points" of light. FIG. 13a represents a marker image when the optical processing in the optical channel 1102 is designed to focus a marker image to a small image. By contrast, FIG. 13b shows the same marker image if the optical channel 1102 includes a diffuser or is intentionally designed with the sensor 1103 positioned before or after the optical channel's output focal point so that the marker image is deliberately blurred. By deliberately blurring the marker image, the marker image is easier to detect by marker position detection algorithms.

This counterintuitive result (i.e., that the resolution of detecting marker image position is improved if the marker image is not crisply focused) is due to the presence of more pixels (i.e., data) in the image. By properly processing this image data, it is possible to perform high resolution interpolation which can yield more accurate determination of the true center of the image. This permits better and smoother tracking as the user changes his/her pointing direction or orientation. The tradeoff for achieving this increased resolution is a weaker peak signal on the sensor. Therefore, there is a limit to the amount of marker image expansion that can be tolerated before the signal is too weak to detect. In practice, there is an optimum balance between marker image size and signal strength that depends on several system factors such as the marker image signal strength, the sensor sensitivity, the noise and background signals on the sensor, the marker spacing, and the maximum distance from the markers to the user (the marker images should not be broadened further once they start to impinge on each other on the sensor), etc.

Figure 14:
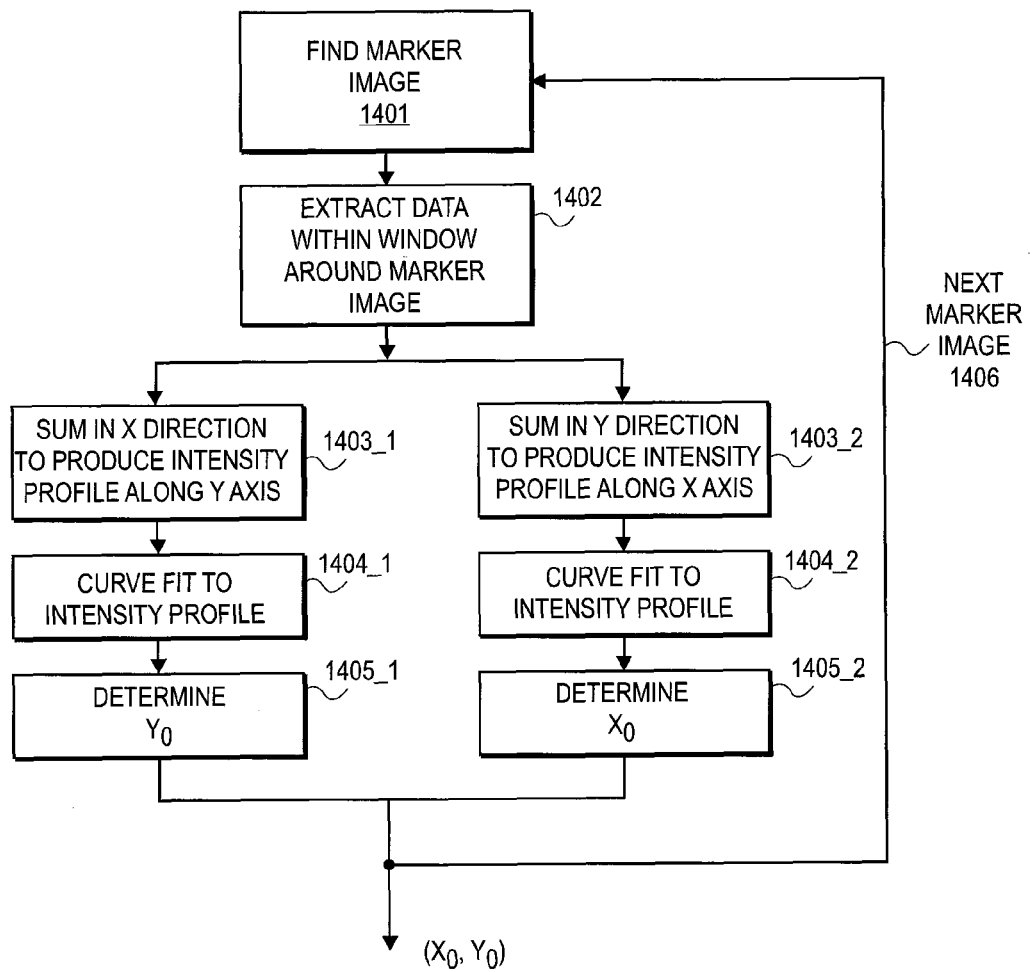
FIG. 14 shows a method for determining marker positions observed through a handheld device's sensor.
Figure 15:
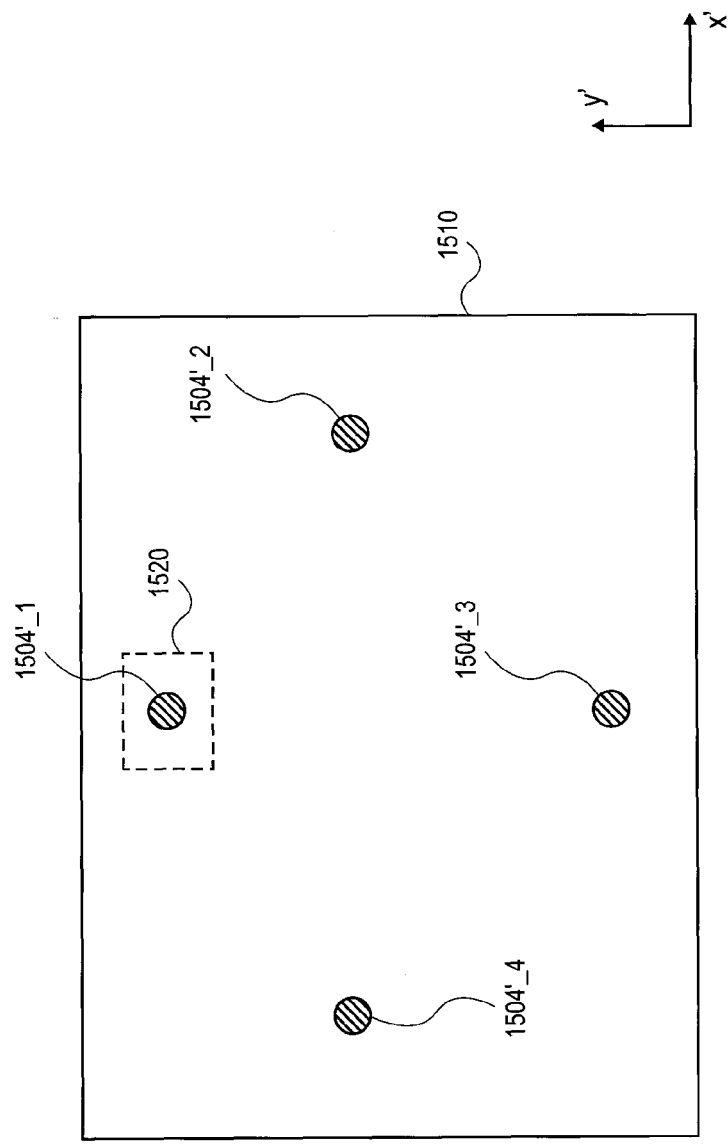
FIG. 15 shows an exemplary collection of marker images observed through a handheld device's sensor.

FIGS. 14 and 15 relate to a marker position detection technique. FIG. 14 shows a process for detecting the position of multiple marker images that are presented by the handheld device's sensor. FIG. 15 provides an exemplary depiction of a sensor's output signal. According to the process of FIG. 14, a marker image (in a simple case a "marker" such as marker 1505'_1 of FIG. 15) is detected 1401 in the sensor's output signal. Here, a marker can be recognized, for instance by identifying a region of the sensor's pixel array having a sufficient number of neighboring pixels that are providing a "high" output value (above a pre-determined threshold).

Once the marker is identified, pixel data within a region 1402, 1520 around the found marker 1504'_1 is further processed to identify the "location" of the marker. The marker image 1302 of FIG. 13b can be viewed as an exemplary illustration of the data that is associated with region 1504'_1. Recalling that each pixel location has an associated intensity value that increases as the amount of radiation from a marker that illuminates the pixel location increases, the marker image 1302 of FIG. 13b can be viewed as an array of intensity values.

As depicted in FIG. 14, the intensity values are summed "horizontally" 1403'_1 along the x axis to produce, for each row of data in the extracted data region 1504'_1, a sum total intensity value for that row. Owing to the shape of the marker image, the distribution of these sum total intensity values across the vertical expanse of the extracted data region 1504'_1 should approximate that of a "bell-curve" 1305 (e.g., Gaussian or Gaussian-like distribution). Similarly, the intensity values are summed "vertically" 1403'_2 along the y axis to produce, for each column of data in the extracted data region 1504'_1, a sum total intensity value for that column.

Again, owing to the shape of the marker image, the distribution of these sum total intensity values across the horizontal expanse of the extracted data region 1504'_1 should approximate that of another "bell-curve" 1303. A curve fitting function 1404_1, 1404_2 is then applied to each of these distributions 1303, 1305 to define a fitted, continuous curve 1304, 1306 for each of them. The maximum value of the horizontal fitted curve 1304 is then taken as the x coordinate value 1307 ($x_o$) of the position of the marker image 1405_1, and, the maximum value of the vertical fitted curve 1306 is then taken as the y coordinate value 1308 ($y_o$) of the position of the marker image 1405_2. The process then repeats 1407 for the next marker until all markers have been found and their positions determined. In addition to simple peak detection, other methods for center determination may be used and may be beneficial, especially in cases where the beam profiles are not smooth or symmetric functions.

One such method essentially determines the width (e.g., full-width half-maximum—FWHM) of the fitted curves and takes the marker center to be the center position between the FWHM points. In this case, the center may not be the same as the peak location. Other variations on this approach may also be used. Using these marker center determination algorithms sub-pixel resolution appears to be possible. The achievable resolution is limited by the noise in the signal and the number of bits of sampling in the digital sensor. For example, a noiseless signal sampled with 8-bit digitization would permit less than 0.005 pixel spatial resolution. Signal averaging may increase this resolution even further. In practice, the existence of system noise and background signals results in reduced resolutions that typically range between 0.01 and 0.1 pixels.

4.0 Mathematical Relationships for Absolute Handheld Device Pointing

A detailed discussion of various mathematical approaches for effecting absolute handheld device pointing and location tracking for 1, 2, 3 and 4 marker systems are presented below.

4.1 1-Marker Embodiment

According to an approach for a 1-marker embodiment, a primary task is to relate the pointing direction of a sensor located in the hand-held device to the desired cursor location on the display. This is generally a two-dimensional problem involving horizontal and vertical coordinates for both the display (x',y') and the sensor (x,y). Since the axes are orthogonal, the relevant equations are separable and the formulas can be derived for each axis independently. Accordingly, calculations for the horizontal axes (x' and x) are first presented. These are then extended to the vertical axes (y' and y).

Figure 16:
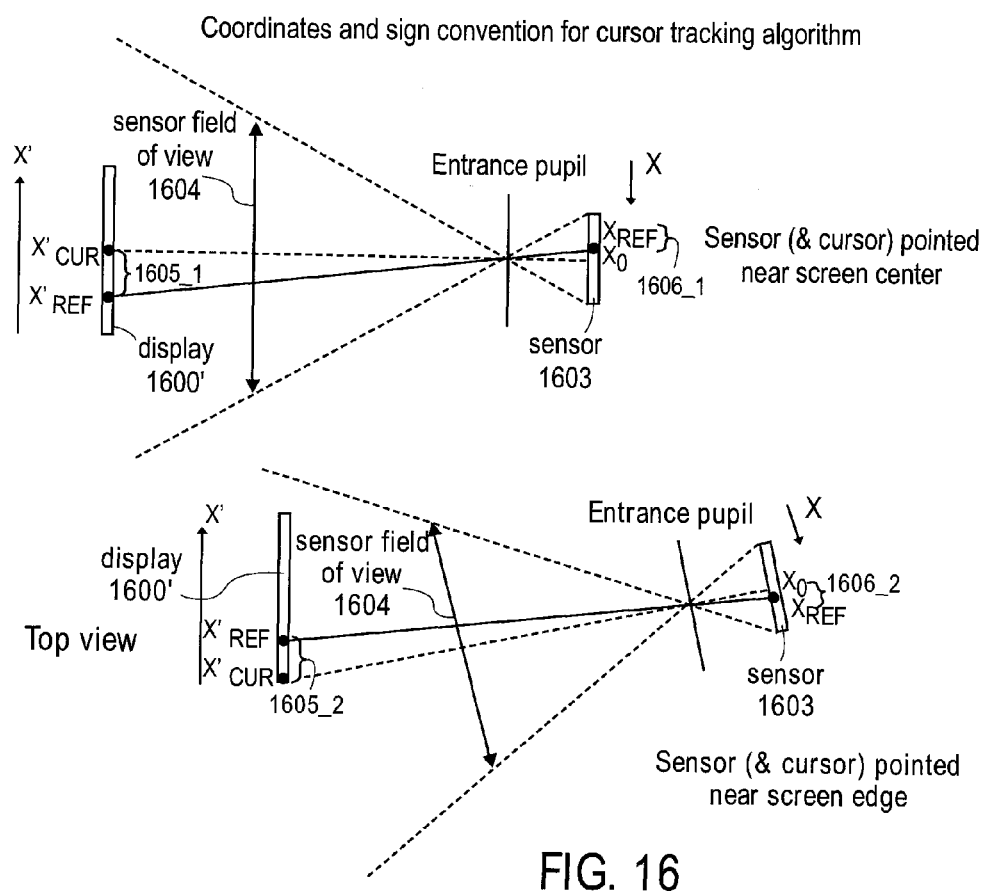
FIG. 16 shows sensor field of view for two different pointing directions.

FIG. 16 shows coordinate systems and sign convention. Two different pointing directions in the horizontal dimension are illustrated, from a "top view" perspective, to show how the variables are related. A similar picture may apply for the vertical dimension. The basic equation that relates the sensor 1603 and display 1600' coordinates is:

$$x'_{CUR} - x'_{REF} = M_x \cdot [x_0 - x_{REF}] \quad (1)$$

where $x_0$ is the coordinate origin of the sensor 1603 or coordinate that corresponds to the desired pointing direction (in a preferred embodiment $x_0$ is near the center pixel on the sensor 1603, or, better said, the sensor's field of view 1604 is centered at the cursor $x'_{CUR}$); $x_{REF}$ is the position on the sensor 1603 of the reference marker image (which moves as the sensor 1603 moves); $x'_{REF}$ is the actual position of the reference marker with respect to the display 1600'; $x'_{CUR}$ is the desired cursor position on the display 1600' (which also moves as the sensor 1603 moves); $M_x$ is the magnification scale factor or proportionality constant that determines the mapping between the sensor 1603 and the display 1600' coordinates. M depends on several systems factors (e.g., sensor position with respect to the display, sensor field of view, display size, and orientation of the sensor with respect to the display), and, in general, x,x' and y,y' coordinates can have different values (magnitude and sign) for M ($M_x$ and $M_y$).

Equation (1) indicates that the reference marker to display cursor distances 1605_1, 1605_2 and the reference marker image to sensor origin distances 1606_1, 1606_2, in their respective local coordinate systems, are linearly related (i.e., proportional), and the proportionality constant, or scale factor, is M.

In order to convert (1) into a practical algorithm for tracking and moving the display cursor, according to one implementation, several of the factors in (1) are determined using an initial calibration routine performed at a specific location with respect to the screen. In practice, the x and y positions will correspond to the pixel number on the sensor 1603 and the x' and y' positions will correspond to the pixel number on the display 1600'. Also note that the pixel numbers are relative to the total number of pixels in the respective coordinate systems, and thus x (y) and x' (y') should be normalized accordingly.

The factors in (1) that are determined during calibration are $M_x$, $x_0$, and $x'_{REF}$ (where, $x_{REF}$ is the measured reference marker pixel number on the sensor 1603 and $x'_{CUR}$ is the output of the algorithm—the pixel number of the display cursor). In general, $x_0$ could be any particular pixel number corresponding to the origin on the sensor 1603, however, the approximate center is the most natural to use. For example, a sensor with an array size of 640×480 would have $x_0$~320 and $y_0$~240. However, for one implementation, these values do not need to be explicitly determined prior to calibration. In effect, $x_0$ and $y_0$ are automatically determined during calibration, as will be shown below.

Therefore, $M_x$ and $x'_{REF}$ are the two factors that are explicitly determined during calibration. One method for determining $x'_{REF}$ could be to physically measure its x' position and corresponding relative pixel number on the display 1600'. Note that it is not necessary for the reference marker to be physically located within the display 1600' itself.

A simpler and more accurate method to determine both $x'_{REF}$ and $M_x$ simultaneously is to use two visible calibration reference points displayed at known positions on the display 1600'. Generally, the calibration reference points will have different x and y coordinates, e.g., located at opposite corners of the screen. By pointing the sensor 1603 sequentially at the two calibration reference points and recording, for each reference point, the corresponding marker image position on the sensor 1603 (such that a pair of reference marker image positions are recorded—one for the first calibration reference point and another for the second calibration reference point), both M, and $x'_{REF}$ can be determined for that user position. In this procedure, $x'_{CALA}$ and $x'_{CALB}$ represent the known calibration reference point positions, and $x_{REFA}$ and $x_{REFB}$ are the corresponding recorded sensor image positions of the reference marker. These quantities replace $x'_{CUR}$ and $x'_{REF}$, respectively, in equation (1):

$$x'_{CALA} - x'_{REF} = M_x \cdot [x_0 - x_{REFA}] \quad (2)$$

$$x'_{CALB} - x'_{REF} = M_x \cdot [x_0 - x_{REFB}] \quad (3)$$

Subtracting these two equations results in the following expression for $M_x$:

$$M_x = -\frac{\Delta x'_{CAL}}{\Delta x_{REF}} \quad (4)$$

where $\Delta x'_{CAL}$ is the separation (in pixels) of the calibration reference points on the display ($x'_{CALA} - x'_{CALB}$), and $\Delta x'_{REF}$ is the measured separation (in pixels) of the corresponding marker image positions on the sensor ($x_{REFA} - x_{REFB}$). Once $M_x$ is determined from equation (4), then $x'_{REF}$ can be determined from equations (2) or (3):

$$x'_{REF} = x'_{CALA} - M_x \cdot [x_0 - x_{REFA}] = x'_{CALB} - M_x \cdot [x_0 - x_{REFB}] \quad (5)$$

Alternatively, both equations (2) and (3) may be used to obtain $x'_{REF}$ by summing them and dividing by 2:

$$x'_{REF} = \frac{1}{2}(x'_{CALA} + x'_{CALB}) - M_x \cdot \left[x_0 - \frac{1}{2}(x_{REFA} + x_{REFB})\right] \quad (6)$$

Substituting equation (6) into equation (1) and rearranging terms yields a formula for the cursor position in terms of measured quantities:

$$x'_{CUR} = M_x \cdot \left[\frac{1}{2}(x_{REFA} + x_{REFB}) - x_{REF}\right] + \frac{1}{2}(x'_{CALA} + x'_{CALB}) \quad (7)$$

with $M_x$ determined from equation (4). The first term on the right hand side of equation (7) represents the average pixel position of the marker images on the sensor (½($X_{REFA}$+ $X_{REFB}$)), during calibration, relative to the actual pixel position of the reference marker image ($X_{REF}$) for a given pointing direction, all scaled by $M_x$. It essentially determines the amount that the cursor on the display 1600' should move as the reference image moves on the sensor 1603. The second term on the right hand side is the average pixel position of the calibration reference points on the screen and it represents any offsets that are applied to the cursor position in order to effect line-of-sight pointing.

Figure 17:
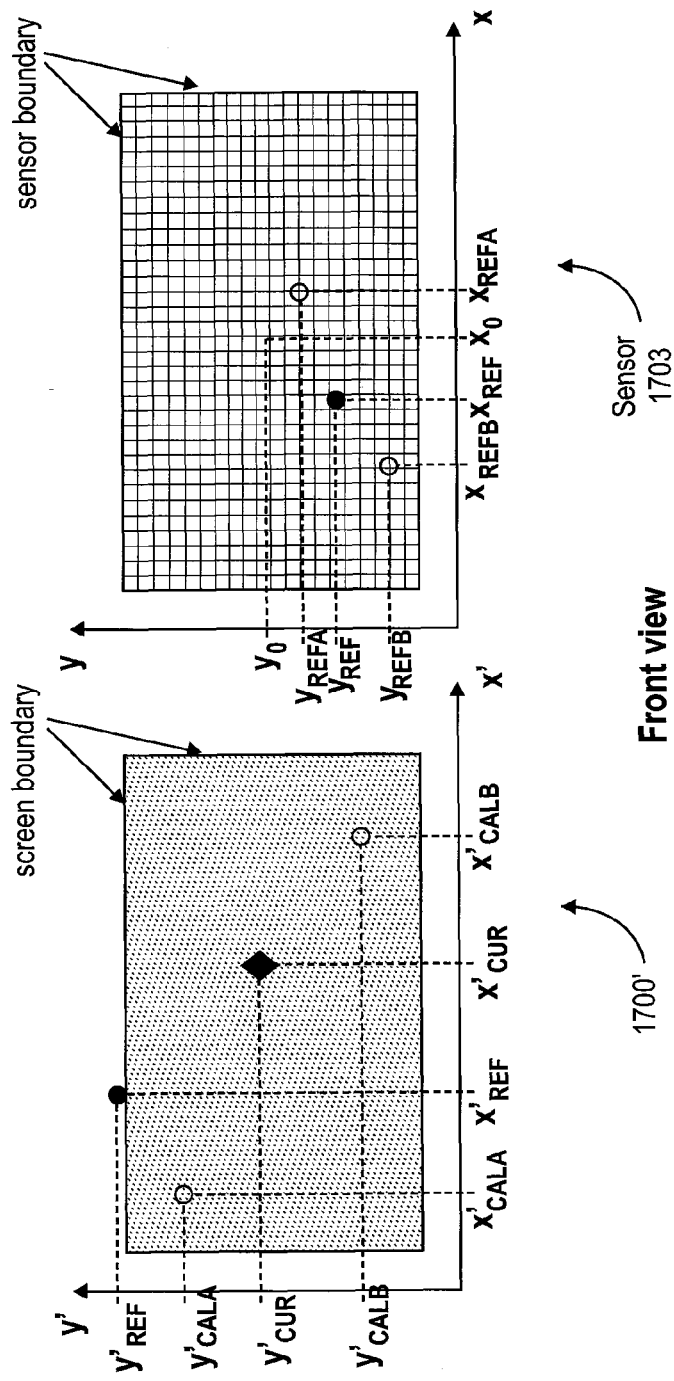
FIG. 17 shows a display and corresponding sensor image of the display for a one marker system.

FIG. 17 shows an example of the various (x and y) coordinates in the display 1700' and sensor 1703 reference frames.

Note that equation (7) is independent of $x_0$ since it cancels when substituting (6) into (1). This is based on the assumption the $x_0$ in equation (1) is the same as that in equations (2) and (3). This is generally true, though not necessarily the case. In other words, the effective $x_0$ will be determined by the pointing direction during the calibration procedure. Any offsets (intentional or not) in the pointing during calibration will result in an equal offset in the cursor position during use.

As stated earlier, the above analysis focused on the horizontal dimension. An analogous derivation can be applied to the vertical dimension and equations (1)-(7) have equivalent counterparts in the vertical coordinate. Thus, the resulting cursor position in the y and y' dimensions is determined by:

$$y'_{CUR} = M_y \cdot \left[\frac{1}{2}(y_{REFA} + y_{REFB}) - y_{REF}\right] + \frac{1}{2}(y'_{CALA} + y'_{CALB}) \quad (8)$$

It is clear from equation (4) that M (both $M_x$ and $M_y$) is a function of the user's position with respect to the display 1600' during calibration ($\Delta x_{REF}$ depends on the user's position). Therefore, if the user's position changes, then M should change accordingly. To a very good approximation and under most circumstances, M varies linearly as the user's distance from the display, L, changes from its initial value, $L_0$ $$M(L) = M_0 \cdot \frac{L}{L_0} \quad (9)$$

where $M_0$ is the calibration scale factor that corresponds to $L_0$.

Figure 18:
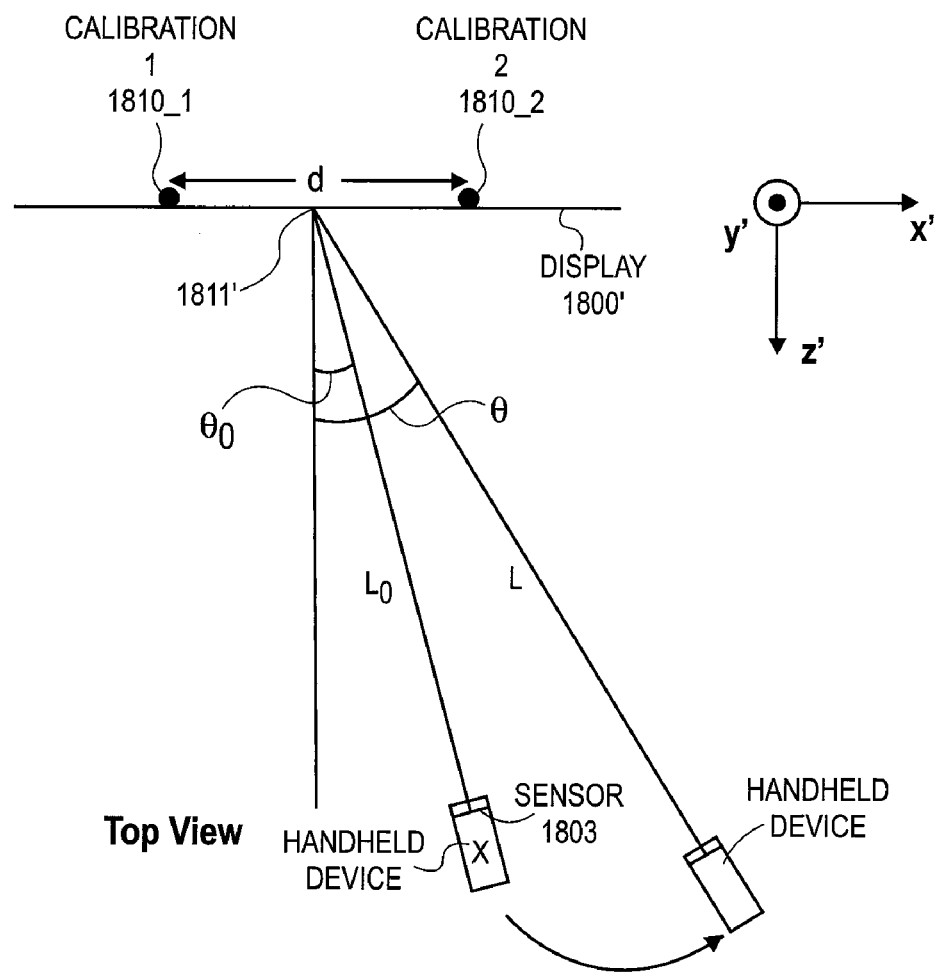
FIG. 18 shows calibration and "actual use" hand held device pointing situations.

According to this approach, referring to FIG. 18, L and $L_0$ are measured from the sensor 1803 to the midpoint 1811' of the reference points 1810'_1, 1810'_2 (e.g., the center of the display 1800'). Therefore, if the user moves twice as far from the display 1800', or reference points, from where the initial calibration was performed, then M should also double. In addition, M also depends on changes in the user's viewing angle with respect to the display 1800'. Viewing angle changes may be accounted for with the addition of a trigonometric correction factor in equation (9):

$$M(L, \theta) = M_0 \cdot \left[\frac{L \cdot \cos(\theta_0)}{L_0 \cdot \cos(\theta)}\right] \left\{\frac{1 - \left(\frac{d}{2L}\right)^2 \cdot \sin^2(\theta)}{1 - \left(\frac{d}{2L_0}\right)^2 \cdot \sin^2(\theta_0)}\right\} \quad (10)$$

where $\theta_0$ is the viewing angle (measured from the screen normal) corresponding to the initial calibration conditions, $\theta$ is the current viewing angle after the user has moved, and d is the distance (along x or y axes) between the calibration reference points 1810_1, 1810_2 on the display (measured in real units, e.g., cm or mm). Equation (10) is the exact expression for the effect of viewing angle and distance changes on the scale factor, M. However, under the majority of conditions, the last term in brackets is a small correction factor that can be dropped without introducing a substantial or noticeable error in M. Thus, an approximate and simplified expression for M may be used:

$$M(L, \theta) \approx M_0 \cdot \frac{L \cdot \cos(\theta_0)}{L_0 \cdot \cos(\theta)} \quad (11)$$

As can be seen in equation (10), the term in brackets is close to 1 and may be ignored under the following common conditions: when the viewing angle is relatively small, both during calibration ($\theta_0$) and during use ($\theta$) or when d is small compared with L and $L_0$. Under typical operating conditions, the user's viewing angle changes less than ~25° and the distance from the screen is at least twice the calibration marker separation. In this case, the error introduced by using equation (11) is less than ~1%, which is well below the user's ability to sense under normal circumstances. In extreme situations, where the user moves to the edge of the operational range of the system (typically $\theta$~45°) after calibration near $\theta_0$=0, and the user moves very close to the screen (d~L), the error is ~12%, which may be noticeable by some users.

In practice, this error may be reduced by calibrating closer to the position of operation (e.g., $\theta_0$ closer to 45°). In general, if extreme operating conditions are anticipated, very high pointing accuracy is desired, or occasional re-calibration is not possible or is undesirable, then the exact formula (equation (10)) can be used in order to minimize pointing errors. But, for most situations, equation (11) is adequate for determining the correct calibration scale factor. Also, recall that M has both x and y components that are used in equations (7) and (8). Therefore, the viewing angles that appear in equations (10) and (11) have both x and y components that determine $M_x$ and $M_y$, respectively. Also note that equations (10) and (11) assume that the motion is in one plane only, or that $\theta$ has only x or y components. The general case of arbitrary motion involves more complex equations and is covered in later sections. The geometry for equations (10) and (11) in the x' dimension shown in FIG. 18 indicates movement of the handheld device from an initial calibration position (corresponding to $\theta_0$ and $L_0$) to a final position (corresponding to $\theta$ and L) with respect to the display 1800' and reference points 1810_1, 1810_2.

As mentioned above, one approach to account for distance and viewing angle changes would be to repeat the calibration process when the user's position changes enough to produce noticeable errors in pointing accuracy. Without knowledge, either direct or indirect, of L, $L_0$, $\theta$, and $\theta_0$, re-calibration is the only option for compensating M as the user's position changes. Thus, in order to avoid the need for re-calibration, it is necessary to effectively measure L, $L_0$, $\theta$, and $\theta_0$ so that equation (10) or (11) may be used. Of course, a direct physical measurement of these factors would permit calibration correction; but, this approach is not especially feasible in practice. However, by adding one or more reference markers to the system, it is possible to incorporate both distance and viewing angle determination to the basic pointing capability. In addition to permitting automatic and dynamic calibration correction, the sensitivity to additional degrees of freedom enabled by multiple reference points, opens up new capabilities. The analysis of the 2-marker arrangement is the subject of the next section.

4.2 2-Marker Embodiment

By adding a $2^{nd}$ fixed marker to the system, the calibration correction issue described in (I) can be addressed. This can be done because marker image separation can be monitored while the user moves relative to the screen. The changes in marker image separation can be used to determine the correction factor in equation (10) or (11) without explicit knowledge of distance or viewing angle. M can then be modified in real time without the need for a re-calibration procedure. However, because changes in M depend on both L and $\theta$, it is not possible, without additional information, to separate the effects of distance and viewing angle changes on M. Although only their combined effect can be sensed and accounted for, this is sufficient for calibration correction. The addition of a third marker, described in the next section, permits the independent detection of both distance and viewing angle.

Automatic calibration correction may be performed in the 2-marker embodiment in a manner similar to that described in section 4.1. In this case, since it is not necessary to separate the effects of distance and viewing angle changes, equations (10) and (11) are not necessary. All that matters for calibration correction is the change in the separation of the images of the markers, regardless of whether it results from distance or viewing angle changes. Therefore, only equation (4) is needed to modify M as the user moves. In this case, $\Delta x_{REF}$ in equation (4) becomes the separation between the images of the two reference markers (instead of display calibration marker separation) on the sensor. As the user moves with respect to the screen, the scale factor, M, will automatically adjust as $\Delta x_{REF}$ changes. The key difference between this dynamic calibration and the initial calibration described above is the fact that two markers used for calibration are sensed at all times during operation, and thus the user does not need to perform the calibration procedure described in 4.1 in order to update the scale factor, M, after having moved.

In one embodiment, the two reference markers are placed close enough to each other and the display such that they both remain within the field of view of the sensor under all operating conditions. On the other hand, they should be separated enough that they can be spatially resolved at the furthest operating distance from the display, or at the largest view angle. There are a variety of arrangements that could be used for the reference markers as discussed above with respect to FIG. 5c (e.g., one each on opposite corners of the screen, centered on adjacent sides, next to each other on the same side, etc). Each arrangement has its potential advantages; however, in practice, the two markers are normally located on the same side of the screen and several centimeters (typically 5 to 15 cm) apart.

This arrangement is the most convenient in that it allows both markers to be placed in the same housing and wired together for powering from a single source. Although any side of the display can be used, it is usually most convenient to place the marker apparatus on top of the display and near the horizontal center. The exact location is not critical as long as the marker assembly does not move appreciably after calibration. Also note that if the two reference markers have the same x' or y' coordinate, then there is no additional spatial information about the orthogonal coordinate, and so dynamic calibration correction can only be performed along one axis in this case. However, for use as a remote control device, most of the user's movement will be along the horizontal (x') axis, and therefore, two reference markers with the same x coordinate, which permits dynamic calibration of $M_x$, is sufficient for most applications.

Fundamentally, two reference markers provide additional spatial information about the position and orientation (i.e., degrees of freedom or DOFs) of the device. In addition to dynamic calibration, this information can be used for a variety of other functions that rely on measurement and tracking of the device's DOFs. The two additional DOFs that can be tracked using the 2-marker embodiment are device roll (i.e., rotation about the sensor's z axis, or the line between the device and the screen), and distance from the screen. As stated above, angle and distance sensitivity are actually coupled in the 2-marker arrangement, as illustrated in equations (10) and (11). However, in situations where the user's viewing angle does not change much during operation, the 2-marker arrangement can be effectively used to monitor distance changes using a variation of equations (9) and (4):

$$L = \frac{\Delta r_{REF0}}{\Delta r_{REF}} \cdot L_0 \quad (12)$$

where, in this case, $\Delta r_{REF}$ is the measured separation of the images of the two reference markers on the sensor and $\Delta r_{REF0}$ is the separation of the images of the two reference markers that correspond to a known distance, $L_0$ between the sensor and the midpoint between the actual markers themselves. In general, the standard formula for the separation between the images of the markers on the sensor is $\Delta r = \sqrt{(\Delta x)^2 + (\Delta y)^2}$, where $\Delta x$ is the difference in the x coordinates of the images of the two markers on the sensor and $\Delta y$ is the difference in the y coordinates of the images of the two markers on the sensor.

A procedure for distance measurement using equation (12) is to record the separation between the marker images on the sensor, $\Delta r_{REF0}$, at a known distance between the sensor and the midpoint between the actual markers, $L_0$, which could be measured. Thereafter, equation (12) is used to track L. Also, since $\Delta r_{REF0}$ and $L_0$ are constants, they can be combined into a system constant that is empirically determined (e.g., initially) and inserted into equation (12). It is also possible to determine and track L without performing the initial measurement described above by using other known aspects of the system. For example, if the focal length of the imaging lens (or equivalently, the field of view and sensor size of the optical system) is known, as well as the actual reference marker spacing, $\Delta r'_{REF}$, then, in principle, the distance from the sensor to the screen (or the reference markers, placed near the screen) is determined by:

$$L = \frac{\Delta r'_{REF}}{\Delta r_{REF}} \cdot f = \frac{\Delta r'_{REF}}{\Delta r_{REF} \cdot 2\tan\theta_{1/2}} \cdot X_S \quad (13)$$

where f is the imaging lens focal length, $\Delta r_{REF}$ is the reference marker image spacing on the sensor, $X_S$ is the sensor size in the x dimension, and $\tan \theta_{1/2}$ is the tangent of the sensor system's half angle field of view (half of the field of view).

Either expression in equation (13) may be used to determine L, depending on which information about the system is known. For example, a typical arrangement might have a reference separation of 10 cm, a field of view of 50°, and a sensor with 640 total pixels in the x dimension. For a measured reference image separation of 40 pixels in the x dimension, equation (13) provides the distance to the screen of 1.71 m. As the user moves, $\Delta r_{REF}$ will change accordingly and the user's distance is tracked.

Equations (12) and (13) are essentially equivalent and either may be used. However, equation (12) incorporates the system parameters into the directly measured quantities, $L_0$ and $\Delta r_{REF0}$, and is a way of determining the proper scale factor without prior knowledge of the system. Also, equation (13) assumes that the user's viewing angle is 0°. Otherwise, equations similar to (10) and (11), which account for oblique viewing, can be used. Equation (12) essentially accounts for the user's viewing angle through the direct calibration measurement procedure (as long as the viewing angle does not change after calibration).

Figure 19:
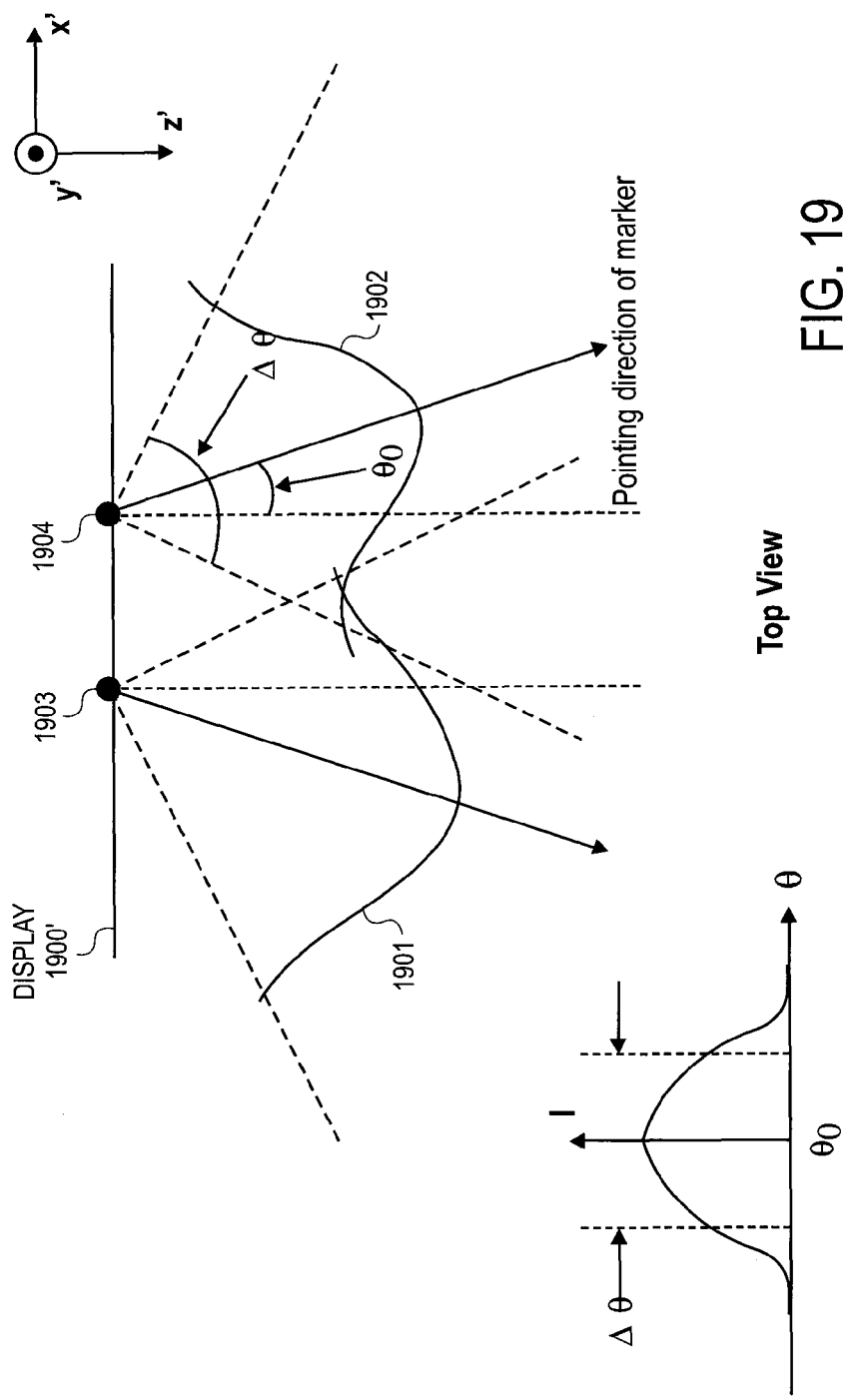
FIG. 19 shows markers radiating in two different directions.

It is possible to measure and track viewing angle as well as distance using the 2-marker embodiment. The key is the existence of one or more properties of the reference markers that uniquely depend on viewing angle (preferably both magnitude and sign) and permit the separation of angle and distance. One such property is the relative signal strength of two markers that are oriented in different directions. FIG. 19 shows one such arrangement in which the markers are pointed in different directions along the x' axis. Also shown is the intensity distribution 1901, 1902 of each marker as a function of angle relative to the screen normal. In this configuration, as the user moves to one side or the other of direct view, the relative signal strength from the two reference markers (i.e., ratio of the two measured signals) will change in proportion to the viewing angle, and the ratio will be different for each side of direct view.

In this way, since the ratio does not depend on distance, the angle may be determined and separated from the distance measurement described above. A direct method for implementing this configuration would be to calibrate the system by measuring with the sensor and recording the signal strength from each marker for a variety of known viewing angles on each side of the normal axis of the screen. The signal ratios are then computed for each angle and a function or look-up table may be generated from the data. Alternatively, if the spatial distributions of the reference signals are known, then an analytical expression for the signal ratio versus viewing angle may be generated or estimated. For example, if the angular distribution of each reference source is Gaussian (a common form for optical sources), then the signal ratio of the two sources versus viewing angle, R(θ), is a simple exponential function whose decay rate depends on the width of each distribution, $\Delta\theta$, as well as the angular separation between the sources, $2\theta_0$, both of which may be measured or determined using a calibration procedure.

$$R(\theta) = \frac{A_1 \cdot e^{-4\ln 2\left[\frac{\theta+\theta_0}{\Delta\theta}\right]^2}}{A_2 \cdot e^{-4\ln 2\left[\frac{\theta-\theta_0}{\Delta\theta}\right]^2}} = \frac{A_1}{A_2} e^{-16\ln 2\left[\frac{\theta_0 \cdot \theta}{\Delta\theta^2}\right]} \quad (14)$$

According to equation (14) above, $A_1$ is the peak signal strength of first reference marker 1903 and $A_2$ is the peak signal strength of a second reference marker 1904.

Equation (14) and FIG. 19 assume that both markers have the same distribution width and tilt angle with respect to the screen normal. The expression can be modified for the general case of arbitrary tilting and different widths, although the symmetric arrangement of FIG. 19 is the most natural. Other signal distributions for the reference markers are also possible using this approach, which results in a one-to-one relationship between the signal ratio and viewing angle. The main drawback of this approach is the necessity to offset the pointing direction of each reference marker such that the angle between them is a significant fraction of their angular distributions. The result of this is a reduced viewing angle for the system.

The viewing angle reduction is approximately equal to the angular separation between the pointing axes of the markers, and thus it is desirable to minimize this separation. However, as seen in equation (14), the angular sensitivity of R increases with angular separation, so there is an inherent tradeoff between viewing angle range and viewing angle resolution. Also note that the "angled-marker" configuration, as described above, will work in one dimension unless the markers are angled in both x and y directions, the effect of which further reduces the effective viewing angle. Finally, the method of using the marker signal ratio works well as long as any variations in the optical power ($A_1$ and $A_2$) of the two markers (e.g., LEDs) are correlated such that their ratio ($A_1/A_2$ in equation (14)) at any view angle remains constant over time (e.g., their powers both degrade by 10%).

However, if either marker's power or spatial distribution varies differently from the other's (due to unequal power degradation, for example), then an error in the viewing angle calibration is introduced, and a re-calibration should be performed. One possible solution to this potential problem would be to use a reflective (e.g., retro-reflector) marker design, where relative signal variations are much less likely. Therefore, while the angled-marker configuration permits, in principle, independent determination of both distance (from marker separation) and viewing angle (from signal ratio) in a 2-marker embodiment, the reduced viewing angle, added complexity, and potential errors introduced limit its usefulness in practice. The preferred methods for separately sensing and tracking distance and viewing angle use three or four markers. These embodiments are described in the next sections. The other DOF that can be measured using the 2-marker arrangement is "roll", which is rotation about the device's z axis (the axis perpendicular to the plane of the sensor array). Tracking of this DOF indicates the magnitude and direction in which the user has rotated the device (by twisting the wrist, for example) while pointing it at the screen. The ability to measure and track the device roll introduces the possibility of new functions and controls that can be enabled by simple wrist actions. The general expression for roll angle, $\phi$, as a function of the reference marker image coordinates of the two markers, is:

$$\tan\phi = \frac{\Delta y^0 \cdot \Delta x^1 - \Delta y^1 \cdot \Delta x^0}{\Delta y^0 \cdot \Delta y^1 + \Delta x^0 \cdot \Delta x^1} \quad (15)$$

where $\Delta x^i = x_2^i - x_1^i$ and $\Delta y^i = y_2^i - y_1^i$ and i=0 corresponds to the coordinates associated with the $\phi$=0 roll angle, and i=1 corresponds to the coordinates associated with the roll angle $\phi$. The $\phi$=0 roll angle will typically correspond to the normal operating conditions where the user is pointing at the screen with the handheld device upright and the wrist is in its neutral position. Other $\phi$=0 roll angle orientations are possible, if desired, by re-calibrating the values of $\Delta x^0$ and $\Delta y^0$ for other orientations of the device.

Figure 20:
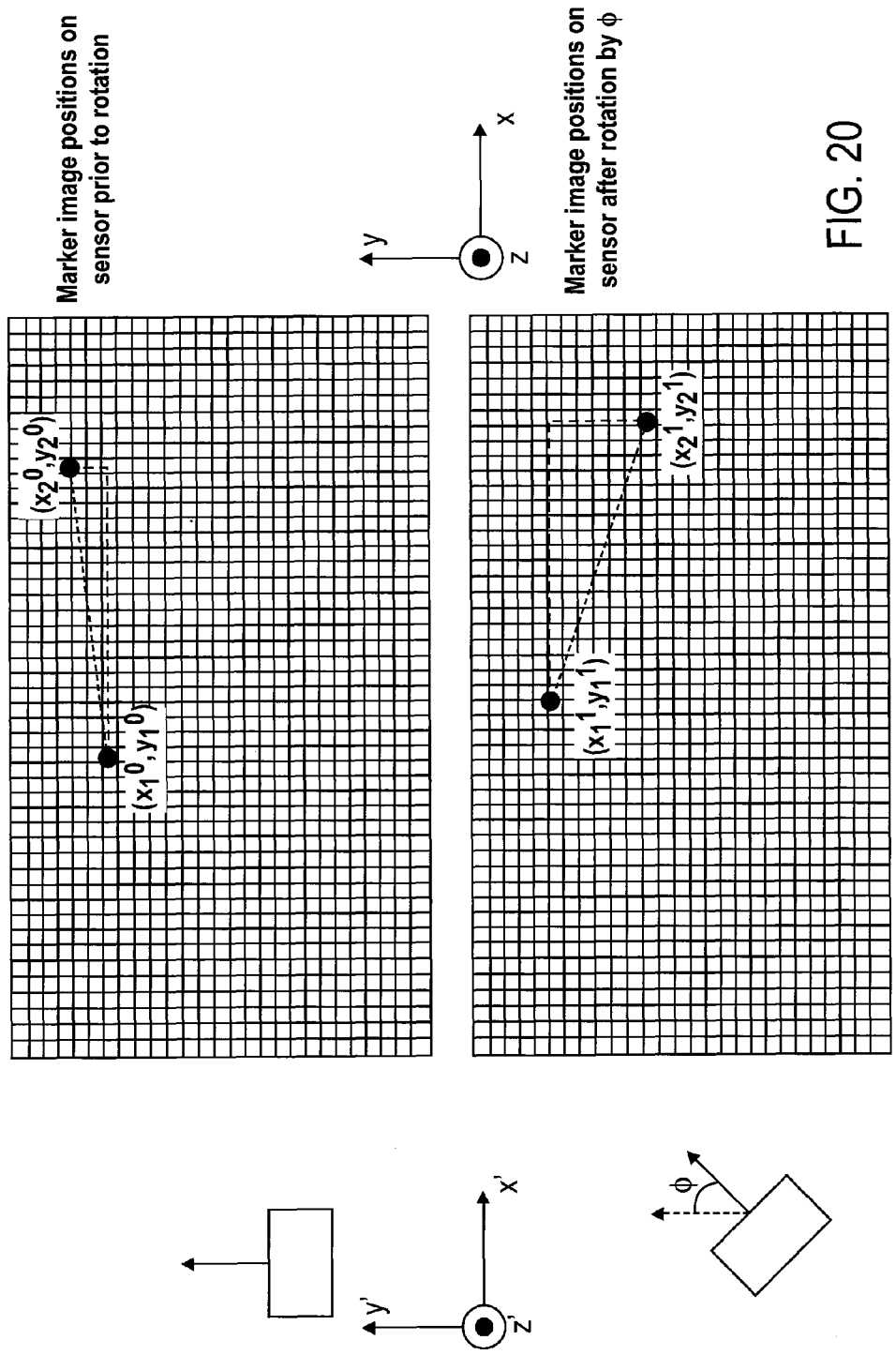
FIG. 20 shows marker images on a sensor for rolling hand held device.

Equation (15) is the general expression for arbitrary (x', y') coordinates of the reference markers with respect to the display. The sign convention for equation (15) is that clockwise rotation of the device (viewed from the back of the device while pointed at the screen) corresponds to positive roll angle. FIG. 20 illustrates the geometry involved in roll for an arbitrary 2-marker arrangement. In many arrangements of the 2-marker embodiment, the markers are situated either horizontally or vertically with respect to the screen edges. In the special case of horizontally placed reference markers, $\Delta y^0$=0, and so equation (15) reduces to:

$$\tan\phi = \frac{-\Delta y^1}{\Delta x^1} \quad (16)$$

and in the case of vertically placed reference markers $\Delta x^0$=0, and equation (15) reduces to:

$$\tan\phi = \frac{\Delta x^1}{\Delta y^1} \quad (17)$$

Therefore, the roll angle may be measured and tracked using the real-time measured reference marker image coordinates of the two markers on the sensor in conjunction with the appropriate equation (15)-(17). Note that, in general, both $\Delta x^i$ and $\Delta y^i$ may depend on the user's view angle (his/her location with respect to the screen), and thus the apparent $\phi$ may change with view angle even with no change in device roll. Therefore, when using equation (15), the values used for $\Delta x^0$ and $\Delta y^0$ must correspond to approximately the same viewing angle as those for $\Delta x^1$ and $\Delta y^1$. This can be accomplished by periodically re-calibrating to record new values for $\Delta x^0$ and $\Delta y^0$ for new user locations.

One consequence of the sensitivity to roll angle is that, as the device is rotated, its frame of reference also rotates with respect to that of the screen. This has the effect of producing an apparent rotation of the reference markers, which, depending on the device's pointing direction, can lead to an apparent translation in pointing direction. Therefore, if left uncorrected, device roll may lead to inadvertent cursor movement, even if the device's z axis (pointing direction) does not change. In addition, because of the rotation of the sensor's coordinate axes, any change in pointing direction that occurs with the device rotated will result in an error in the direction of cursor movement, the error being proportional to the roll angle. For example, if the device roll is 45 degrees and the user then changes the pointing direction in a horizontal manner, the cursor will move at 45 degrees with respect to the screen axes instead of horizontally.

In order to properly account and correct for the rotation of the sensor coordinate axes, the effect of the device roll should be removed in the tracking algorithm so that the cursor position and motion correctly correspond to the device's true pointing direction. The first step in the roll compensation procedure is to accurately sense the roll angle using equations (15)-(17), whichever is appropriate. In order to compensate for the roll and correctly maintain the cursor location, a new reference frame for the sensor is generated by rotating the original (x, y) coordinates by $\phi$ about the sensor origin ($x_0$, $y_0$). In most cases, the origin, which corresponds to the pointing direction, is the center pixel in the array. The general expression for coordinate transformation involving rotation about point ($x_0$, $y_0$) by an angle $\phi$ is:

$$x_\phi - x_0 = (x - x_0) \cdot \cos \phi + (y - y_0) \cdot \sin \phi$$

$$y_\phi - y_0 = -(x - x_0) \cdot \sin \phi + (y - y_0) \cdot \cos \phi \quad (18)$$

where (x,y) are the original coordinates (prior to rotation) and ($x_\phi$, $y_\phi$) are the transformed coordinates (after rotation). Again, the sign convention used here is that a clockwise rotation of the sensor (while it is pointed at the screen) corresponds to a positive $\phi$. Equations (18) determine the rotated coordinate system. In order to compensate for the rotation and maintain proper cursor location, equation (18) must be transformed back to the original coordinate system:

$$x - x_0 = (x_\phi - x_0) \cdot \cos \phi - (y_\phi - y_0) \cdot \sin \phi$$

$$y - y_0 = (x_\phi - x_0) \cdot \sin \phi + (y_\phi - y_0) \cdot \cos \phi \quad (19)$$

Equation (19) transforms the measured reference marker image coordinates back to the coordinate system prior to rotation. Applying this transformation has two effects: it maintains the correct screen cursor location and it generates the proper tracking direction for the screen cursor as the rotated device's pointing direction changes. The transformed (x, y) coordinates for each marker image are then used in the cursor tracking algorithm (e.g., $x_{REF}$ and $y_{REF}$ in equation (7) and (8)). Note also that the scaling factors $M_x$ and $M_y$ used for cursor tracking may require modification according to the measured roll angle. In most cases, the magnification for the optical system is the same for x and y (spherical lenses are typically used). However, since $M_x$ and $M_y$ are defined in terms of pixel numbers, the pixel dimensions of the sensor should be accounted for in the transformation. In general, $M_x$ transforms to $$M_x \cdot \left( \cos^2 \phi + \frac{p_y}{p_x} \cdot \sin^2 \phi \right)$$

and $M_y$ transforms to $$M_y \cdot \left( \cos^2 \phi + \frac{p_x}{p_y} \cdot \sin^2 \phi \right)$$

in the cursor tracking algorithm, where $p_x$ and $p_y$ are the respective sensor pixel dimensions. The procedure of using equation (19) in conjunction with equation (15) permits accurate pointing and tracking with the 2-marker embodiment while the device is rotated at any roll angle.

Note that in the 2-marker embodiment, since there are two reference marker images on the sensor, the pointing and tracking algorithm using the equations discussed above in the one marker approach may be slightly modified to account for the $2^{nd}$ marker. In principle, each of the equations (1)-(8) has two versions—one for each marker. However, since the markers are fixed with respect to each other, the two versions of each equation are simply spatially shifted with respect to each other and therefore contain redundant data for pointing and tracking. As a result, only one set of the equations can actually be used for pointing and tracking. Of course, the additional marker(s) in the multiple-marker embodiments are useable for the additional DOFs, such as view angle, distance, and roll, but basic pointing can be accomplished with only one marker.

Therefore, another method for pointing in multiple-marker embodiments uses an equivalent of the equations for the 1-marker arrangement. Several forms of these equations may be used—each with pros and cons. The simplest approach would be to use the equations corresponding to one of the markers (e.g., marker 1 in the 2-marker embodiment) for both calibration and tracking. A similar approach could be used for 3-marker and 4-marker arrangements. Alternatively, a reference image coordinate constructed from some or all of the actual reference images can be used. A simple example of this would be a "center of mass" coordinate or average coordinate of the two or more markers. Thus, for n markers, the effective reference coordinate would be:

$$x_{REF} = \frac{1}{n} \cdot \sum_{i=1}^{n} x_{REFi} \quad (20)$$

where $x_{REFi}$ is the reference marker image coordinate on the sensor for the $i^{th}$ reference marker. A similar expression would apply to the y coordinate.

The effective reference coordinate is then used in the pointing and tracking algorithm described in above in section 4.1 for the one marker embodiment. Other weighted averages of the reference coordinates could also be used as the reference point for cursor tracking. Using an average coordinate as the reference in an n-marker embodiment has the potential benefit of producing a more accurate and stable reference point since any random fluctuations in the individual marker coordinates will tend to average out. Also, since there are situations where the identity of each marker is not clear, it may be best to take a mean position as the reference. For example, the device may be tilted or upside down in which case, the correspondence of the marker images to references 1 and 2 becomes ambiguous, which could lead to offsets in the screen cursor position. The tradeoff is slightly increased complexity in the tracking algorithm, though the increased computation required is fairly small in most cases.

In cases where the two reference markers are located at different x' and y' coordinates (e.g., positioned diagonally at opposite corners of the screen), it is possible to perform the initial calibration, in addition to the dynamic calibration adjustment described above, using the two reference markers instead of the visible display calibration points described in section 4.1. This alternative procedure for calibrating the device has the potential advantage that calibration may be faster and simpler (and in one version of this procedure, a separate calibration step can be avoided completely). However, in each of these alternative approaches, the cursor tracking equations require some modifications. The basic derivation described above in section 4.1 for pointing and tracking in a 1-marker arrangement still holds for the 2-marker arrangement with the exception that there are now two sets of equations, one corresponding to each reference marker. This additional reference information results in two different, yet equivalent, expressions for the cursor position in terms of the various measurable system parameters. Each has its benefits and disadvantages. The relevant results for each are shown below. The detailed derivations, which are similar to that for 1-marker, are not shown.

In one approach, a "single step" calibration procedure is used, where, the user points the hand-held device at a known position on the screen, $(x'_0, y'_0)$. A single visible marker or icon, at which the user points, could be displayed on the display to aide in the calibration accuracy though this is not necessary, especially if an easily located position such as the screen center or corner is used. While the user is pointing at $(x'_0, y'_0)$, the corresponding sensor coordinates of the two markers, $(x_{REFA}^0, y_{REFA}^0)$ and $(x_{REFB}^0, y_{REFB}^0)$ are recorded. The screen cursor location is then determined from the measured quantities:

$$x'_{CUR} = x'_0 + M_x \cdot \left(\frac{1}{2}(x_{REFA}^0 + x_{REFB}^0) - \frac{1}{2}(x_{REFA} + x_{REFB})\right) \quad (21)$$

$$y'_{CUR} = y'_0 + M_y \cdot \left(\frac{1}{2}(y_{REFA}^0 + y_{REFB}^0) - \frac{1}{2}(y_{REFA} + y_{REFB})\right)$$

Although a calibration step is performed, the measured quantities are easily measured and do not depend on knowledge of the physical locations of the reference markers. In essence, equation (21) determines the correct cursor location relative to a known reference "point" (e.g., the center of the display) by tracking the movement of the average reference marker position on the sensor relative to the average reference point position; which, in turn, corresponds to the known display reference point.

Another approach, in which a separate calibration step is not needed, uses actual known locations of the reference markers. An equation for the cursor position in this case is:

$$x'_{CUR} = \frac{1}{2}(x'_{REFA} + x'_{REFB}) + M_x \cdot \left(x_0 - \frac{1}{2}(x_{REFA} + x_{REFB})\right) \quad (22)$$

$$y'_{CUR} = \frac{1}{2}(y'_{REFA} + y'_{REFB}) + M_y \cdot \left(y_0 - \frac{1}{2}(y_{REFA} + y_{REFB})\right)$$

where $(x'_{REFA}, y'_{REFA})$ and $(x'_{REFB}, y'_{REFB})$ are the locations of the reference markers (measured in pixels in the screen coordinate system) and $(x_0, y_0)$ is the sensor's origin corresponding to the optical axis of the hand held device. This is typically, but not necessarily, near the center pixel of the sensor. For example, if the optical axis is not parallel to the sensor normal axis, then the sensor origin could be offset from the center pixel. This could happen if the lens axis is not centered on the sensor. Using this approach, once the marker locations are known (and they remain fixed), no calibration procedure is needed. However, this method may be susceptible to errors if the reference markers are moved and the new locations are not accounted for in equation (22). Calibration-based methods would need only a simple recalibration if the reference markers move.

For each of the two cursor tracking approaches described above, the scale factor, M, is the same:

$$M_x = \frac{\Delta x'_{REF}}{\Delta x_{REF}} = \frac{\Delta x'_{REF}}{\Delta x_{REF}^0} \quad (23)$$

$$M_y = \frac{\Delta y'_{REF}}{\Delta y_{REF}} = \frac{\Delta y'_{REF}}{\Delta y_{REF}^0}$$

Equation (23) is the equivalent of equation (4) where the known separation of the two reference markers ($\Delta x'_{REF}$) is used in place of $\Delta x'_{CAL}$ and $\Delta x'_{REF}$ is the separation on the sensor of the images of the two reference markers. Note that $\Delta x_{REF} = \Delta x_{REF}^0$ since the marker image separation does not depend (to a very good approximation) on the pointing direction. Similar arguments apply to the y coordinate. Note also the sign difference between equations (4) and (23). This is a consequence of the difference in the two calibration methods—pointing sequentially at the two calibration markers (equation (4)) versus a single step recording of the two reference markers (equation (23)). Each of the three methods described above (2-step, 1-step, and calibration-free) for calibration and cursor pointing and tracking has associated advantages and disadvantages and any can be used under the proper conditions in the 2-marker embodiment. The basic 2-step method described in section 4.1, however, is required when the two reference markers are aligned along the x' or y' axis.

4.3 3-Marker Embodiment

Although there are 2-marker arrangements that, in principle, permit the detection of all six DOFs, they each have some limitations with respect to the practical implementation of detecting all six DOFs. By using 3- or 4-marker arrangements, sensing all six DOFs may be easier to implement. By adding a $3^{rd}$ reference marker, additional spatial information is available that permits separation of distance and viewing angle. Pointing and rotation (roll) tracking can be obtained in a manner similar to the 2-marker embodiment. When the $3^{rd}$ marker is added to a 2-marker arrangement and placed at the same z' coordinate (e.g., a marker location near each of three corners of the screen), there is only minimal additional information beyond some 2-marker arrangements (e.g., markers near adjacent sides of the screen). In this case, the $3^{rd}$ marker adds only incrementally valuable reference data for separating distance from viewing angle.

However, the ambiguity in viewing angle (left versus right or up versus down of the screen center) remains. By moving the $3^{rd}$ marker out of the x'-y' plane (the plane of the screen) to a different z' coordinate, it then becomes possible to perform complete pointing and orientation tracking with no ambiguities. The markers should be within the field of view of the sensor (i.e., the user is pointing somewhere in the vicinity of the screen) and the user should be within the field of view of the markers (e.g., the user cannot be standing too far to the side or behind the screen). A typical marker field of view is (+/−)30-45 degrees, which is consistent with a user's own practical screen viewing angle. This section will focus on the latter, "out-of-plane", 3-marker arrangement. Other, "in-plane", 3-marker arrangements follow by extension from the 2-marker analyses provided above in section 4.2.

Figure 21A:
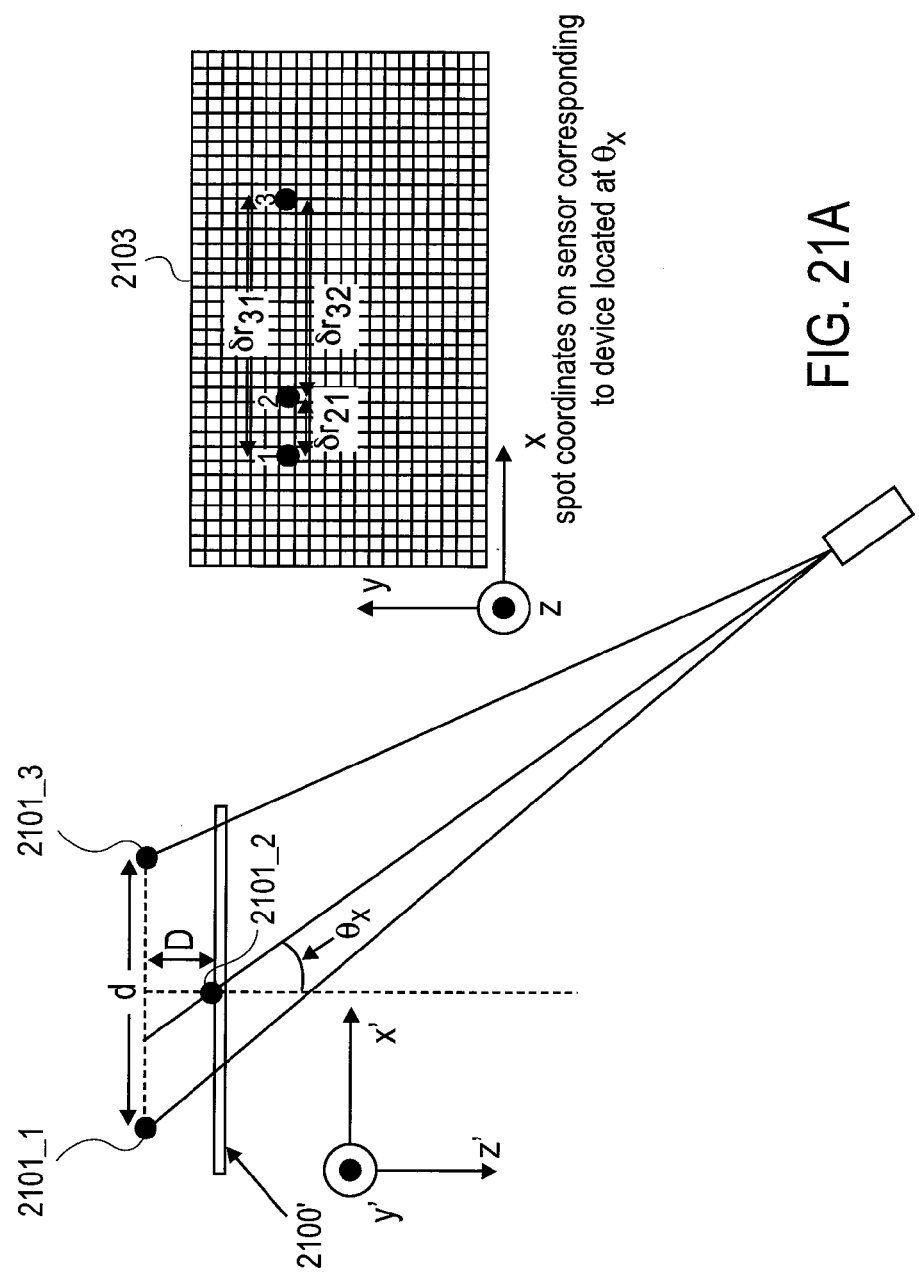
FIGS. 21a and 21b show a three marker system.
Figure 21B:
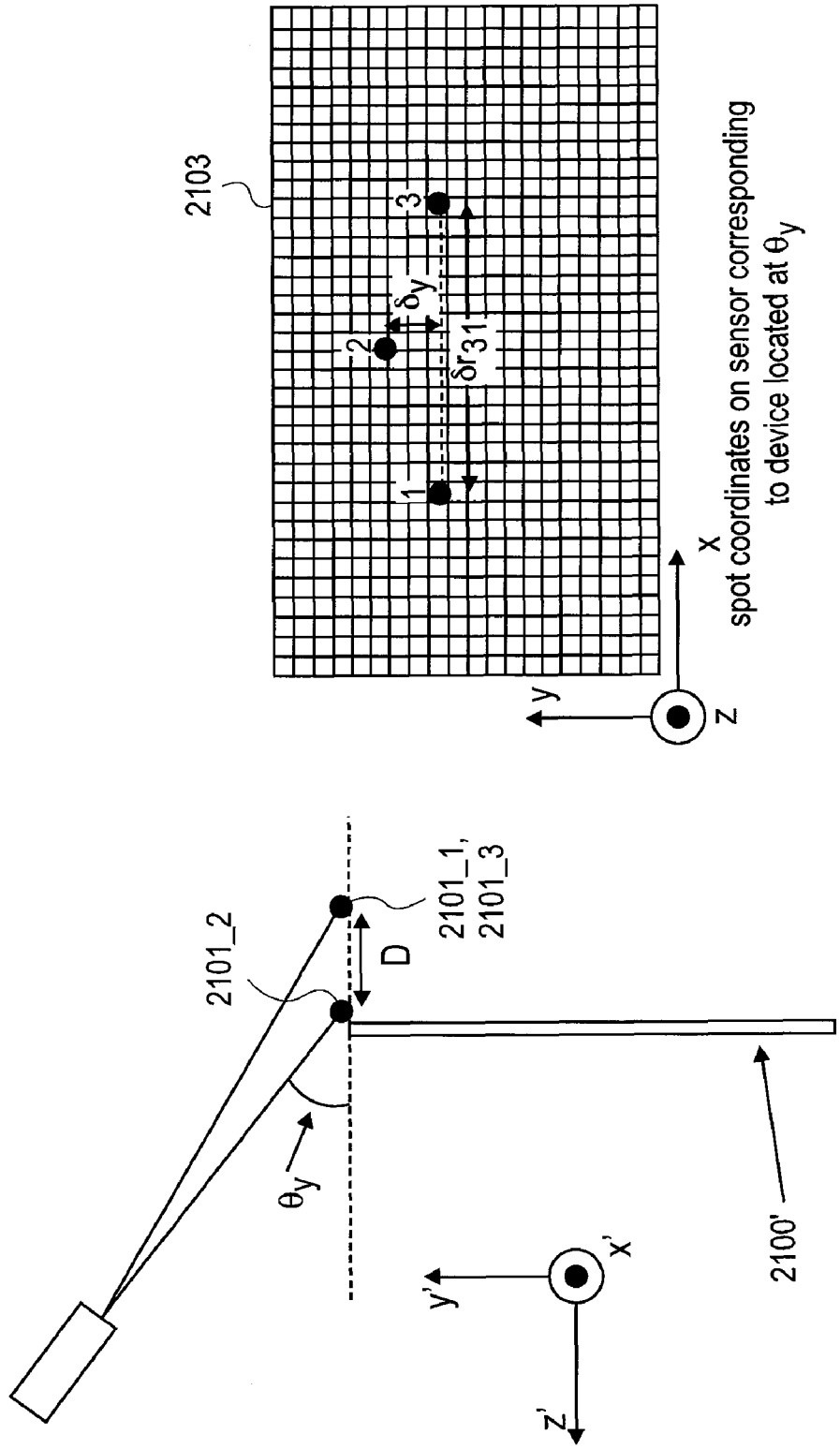

An out-of-plane arrangement is shown in FIGS. 21a and 21b. With this arrangement, the marker image locations on the sensor permit measurement of both magnitude and sign of viewing angle in both x and y dimensions (other 3-marker and 2-marker arrangements permit only viewing angle magnitude detection). One arrangement (shown in FIGS. 21a and 21b), has all three markers 2101_1, 2101_2 and 2101_3 on the same side of the display 2100' and in close proximity to each other. This has the practical advantage that the markers can be placed in a common enclosure and easily powered by a single supply. It may also reduce the required field of view of the sensor. However, any arrangement of the three markers where one is placed out of the x'-y' plane is acceptable. The following equations assume a far field condition in which the distance to the screen is much larger than the marker separations or the user's view angle is small (see equation (36)). In calculating the view angles for x' and y', two sets of equations are derived below. In the first set, simplified expressions are given that are valid in the common, yet special, case where the user is in or near either the x'-z' plane or the y'-z' plane. These conditions allow either $\theta_x$ or $\theta_y$ to be set to 0 in the fundamental equations that relate the measured marker separations to the distance and view angles, thus yielding relatively simple formulas. This situation is relevant since many practical situations may involve the user being confined to or near these planes. In these cases, it may be useful to implement simpler formulas than the more complex general solutions. In the second set, general expressions are given for arbitrary user locations, again within the far field approximation. Referring to FIG. 21a, the expression for the viewing angle in the x' dimension (assuming $\theta_y \approx 0$), in terms of system constants and measurable marker coordinates is:

$$\tan\theta_x = \frac{d}{2D} \cdot \left[ \frac{(\delta r_{32} - \delta r_{21})}{\delta r_{31}} - \frac{(\delta r_{32}^0 - \delta r_{21}^0)}{\delta r_{31}^0} \right] \quad (24)$$

where d is the actual marker separation between the two outer markers (1 and 3) along the x' dimension, D is the offset of the middle marker (2) with respect to markers 2101_1 and 2101_3 in the z' dimension, and $\delta r_{ij} = \sqrt{(x_i-x_j)^2+(y_i-y_j)^2}$ is the separation on the sensor 2103 between marker images i and j. The second term in brackets represents a potential constant offset in the case of an asymmetric arrangement of markers in which the center marker (2) is not placed equidistant to each of the outer markers (1 and 3). In this case, the offset term is determined by performing the measurement of the marker separations while positioned directly in front of the display 2100' ($\theta_x$=0). Alternatively, the offset can be accounted for by adding or subtracting a constant "offset angle" from the measurement. The offset angle, $\theta_{x0}$, can be simply determined from the geometry of the asymmetric arrangement:

$$\tan(\theta_{x0}) = \frac{\delta r_0'}{D} \quad (25)$$

where $\delta r'_0$ is the offset of the center marker from the midpoint of the outer markers. Using equation (25), the offset angle is added or subtracted from the measurement depending on which direction the offset occurs. For the geometry shown in FIGS. 21a and 21b and equation (24), the sign convention is that a positive view angle corresponds to the right hand side of screen center while facing the viewing side of the screen. Thus, the offset angle is subtracted from the measurement if the center marker is to the left the midpoint and added to the measurement if the center marker is to the right of the midpoint. Note also that if equation (25) is used to account for any offset, then the offset terms in equation (24) are dropped ($\delta r_{ij}^0$=0) since they perform the same function.

In the arrangement of FIGS. 21a and 21b, however, the markers 2101_1 through 2101_3 are placed symmetrically and the offset term vanishes or becomes negligibly small. Also, for the preferred arrangement shown in FIGS. 21a and 21b, the markers are arranged horizontally (along the x' dimension), so unless the hand held device is rotated, the y coordinates will typically be absent from the $\theta_x$ calculation in which case equation (24) reduces to a function of x coordinates only. However, if the device is rotated during the view angle measurement, the marker image coordinates may have both x and y components, in which case equation (24) is used. Note that equation (24) does not depend on the user's distance from the screen even though the marker image coordinates and separations do. This is because the formula is normalized such that distance changes affect both numerator and denominator equally.

Using the arrangement of FIGS. 21a and 21b, where the three markers are along the x' axis, it is clear that there are angles for which the center marker image 2 eclipses one of the outer marker images 1, 3, and then for larger view angles marker image 2 moves past marker image 1 or 3 resulting in an ambiguity in the marker identities and thus the view angle. This issue could be addressed by making D smaller relative to d so that the ambiguity occurs at a larger view angle—one that falls outside the normal field of view for the system. The disadvantage of this simple approach is that the angular resolution decreases by decreasing D as can be seen from equation (24). A compromise could be achieved by setting D small enough such that the eclipse occurs at the edge of the normal field of view in order to maximize resolution. Whether this approach is sufficient depends on several factors, such as the required angular resolution, field of view, distance from the display, and marker separation (d). For typical pointing applications, it is likely that D can be made small enough to avoid the eclipse and still provide sufficient angular resolution. For example, a system with d=15 cm, D=5 cm, providing a usable (non-eclipsed) field of view >50 degrees, a 400 pixel sensor with a full field of view of 45 degrees, and a resolution of 0.1 pixel, at a distance of 3 meters from the screen, would have an angular resolution of ~0.7 degrees near direct view decreasing to ~1 degree near the field edge (~45 degrees). This corresponds to lateral movement of ~3.7 cm. This resolution is sufficient for many applications.

In cases where higher resolution is desired by increasing D, a solution that avoids the compromise in resolution is to move one or more of the markers out of the x'-z' plane in order to prevent the eclipse and ambiguity at all view angles. The simplest arrangement for this approach has the center marker 2101_2 at a different height from the outer markers (i.e., offset above or below the line connecting markers 2101_1 and 2101_3). For this arrangement, the eclipse described above is avoided and there is no ambiguity in the identity of the marker images—marker image 2 will always lie above, for example, marker images 1 and 3. D can then be made as large as is desired or practical in order to improve resolution. It is important to note that $\delta r_{ij}$ can be positive or negative, depending on the relative positions of the marker images. Specifically, if $x_2$ is between $x_1$ and $x_3$, then all $\delta r_{ij}$ in equation (24) are positive. However, if $x_2<x_1$, then $\delta r_{21}<0$ and if $x_2>x_3$, then $\delta r_{32}<0$. In the typical case where the markers are arranged along the x' (markers horizontal) and x (no device roll) axes, then there is no y component to $\delta r_{ij}$ and the sign ambiguity of the square root in $\delta r_{ij}$ is absent. In the general case of a y' offset for marker 2101_2, the expressions for the coordinates of marker image 2 ($x_2,y_2$) that go into the equation for the view angle, $\theta_x$, should be modified to account for the offset. The new coordinates for marker image 2 are the coordinates of the point of intersection between two lines—one that connects marker images 1 and 3 and one that passes through marker image 2 and is orthogonal to the first line. In essence, these are the coordinates of marker image 2 in the absence of the offset. Specifically, the value of the coordinate $(x_2, y_2)$ in equation (24) is replaced by $(x_2^0, y_2^0)$, where $$x_2^0 = \frac{x_2 + m\left(y_2 - \frac{y_1 + y_3}{2}\right) + m^2\left(\frac{x_1 + x_3}{2}\right)}{1 + m^2} \quad (26)$$

$$y_2^0 = m\tilde{x}_2 + \frac{y_1 + y_3 - m(x_1 + x_3)}{2}$$

and $$m = \frac{y_3 - y_1}{x_3 - x_1}$$

is the slope of the line connecting marker images 1 and 3 and is related to the roll angle, $\phi$ (see equation (16)). In the typical situation where the hand held device is not rotated during the view angle measurement, m=0, and $(x_2^0, y_2^0)$ reduces to $$\left(x_2, \frac{y_1 + y_3}{2}\right),$$

the expected result for the coordinates of marker image 2 with no offset.

The main purpose for the offset arrangement is to permit high resolution for arbitrary view angles where the marker 2 image moves outside marker images 1 or 3. This situation presents a potential ambiguity in the marker identification when the device is rolled since the y coordinate of marker image 2 may be larger or smaller than that of marker images 1 and 3 and it is the y coordinate of marker image 2 that is used to distinguish it from the other marker images. This situation is unlikely to arise under normal use since it occurs only for simultaneously large view angles (when marker is outside marker images 1 or 3) and large roll angles. The specific values of view and roll angle where this situation could arise depend on the details of the arrangement. One solution to this potential problem is to use some property of the marker image other than its y position to distinguish it from the others. For example, marker 2101_2 could be modulated (powered on and off repeatedly) or set to a different constant power level from markers 2101_1 and 2101_3. In this way, the identity of marker image 2 is determined for any view or roll angle.

An alternative to the use of equation (26) for determining $(x_2^0, y_2^0)$ in the case of a rotated sensor is to determine the rotation or roll angle of the device as described in the 2-marker arrangement. This could be done using marker images 1 and 3 to obtain $\phi$ (related to the slope, m) and then perform the coordinate transformation described in equations (18) and (19). In this way, the simpler (m=0) expression for $(x_2^0, y_2^0)$ can be used for determining $\theta_x$.

Viewing angle in the y' dimension is also tracked using the "out-of-plane" arrangement. The geometry is illustrated in FIG. 21b. As the user moves vertically (in the y' dimension), the center marker image is displaced in the sensor's y dimension with respect to the outer marker images. This displacement, properly normalized, is used to determine $\theta_{y'}$. The simplified equation for viewing angle in the y dimension (assuming $\theta_x \approx 0$) is:

$$\sin(\theta_y) = \frac{d}{D} \cdot \frac{\delta y}{\delta r_{31}} \quad (27)$$

where $\delta y$ is the displacement in the y coordinate of the center marker image (2) from its y coordinate at direct view ($\theta_y$=0). In general, the displacement may have both x and y coordinates so that $\delta y = \sqrt{(x_2 - x_2^0)^2 + (y_2 - y_2^0)^2}$, where $(x_2, y_2)$ are the sensor coordinates of the center marker image 2 and $(x_2^0, y_2^0)$ are the marker image 2 coordinates corresponding to the intersection of the line connecting the outer points (1 and 3) with the normal to this line that passes through marker image 2 (see equation (26)).

Under normal conditions, where the markers are oriented along both the x and x' axes, the expression for displacement simplifies to $$\delta y = y_2 - \frac{(y_1 + y_3)}{2}.$$

In cases where the sensor is rotated or the markers are not placed horizontally, then the more general expression for the displacement is used in conjunction with equation (26). The sign convention is that positive view angle corresponds to the user moving vertically with respect to direct view. In the case where the center marker 2101_2 is at a different height (y') from the outer markers 2101_1, 2101_3, an angular offset to account for the y' offset can be added to equation (27). This angular offset, $\theta_{y0}$, is easily determined from the geometry:

$$\tan(\theta_{y0}) = \frac{\delta y_0'}{D} \quad (28)$$

where $\delta y_0'$ is the actual offset in y' of the center marker 2101_2 with respect to the y' coordinates of the outer markers 2101_2, 2101_3. Once the value of $\theta_y$ is determined from equation (27), the offset angle is added or subtracted to the measurement depending on the direction of the marker offset. Using the convention described for equation (27), the offset angle must be added in the case where the center marker 2101_2 is above the outer markers 2101_1, 2101_3 and subtracted in the case where the center marker 2101_2 is below the outer markers.

The angular resolution turns out to be the same for the vertical ($\theta_y$) axis as for the horizontal axis described above, under the same conditions. Note also that, for $\theta_{y'}$, there is no eclipse or ambiguity of the markers and thus no fundamental limit on how large D can be. Therefore, extremely high resolution could be obtained for $\theta_{y'}$ by increasing D. In practice, however, physical constraints will typically place an upper limit on D.

Note also that by rotating the entire geometry in FIGS. 21a and 21b by 90 degrees so that the three markers are vertically aligned (with the central marker displaced in z'), the expressions for $\theta_x$ and $\theta_y$ are reversed. Finally, note that the two basic assumptions for the out-of-plane arrangement described here are that the user is pointing at or near the display during the measurement and that the markers (markers 2101_1 and 2101_3, at least) are arranged approximately parallel or perpendicular to the screen edges. If the markers are aligned at an angle to the display edges, then the equations would have to be modified to account for this angle. Better said, the measurements of $\theta_x$ and $\theta_y$ are actually referenced to the marker axes, so if the marker axes do not coincide with the screen axes, then the angular offset between the two sets of axes must be taken into account and the equations are more complicated. For this reason, the natural and preferred arrangement has the markers aligned with the screen as in FIGS. 21a and 21b.

As noted above, the foregoing equations and discussion pertain to the situation where the user is in the $\theta_x=0$ or $\theta_y=0$ plane (FIGS. 21a and 21b). As the user moves out of these planes, the error in the location tracking using these equations grows. For small deviations in angle, the errors in angle can be tolerably small. For example, if the user moves +/−10° in the y' direction, the error introduced by using equation (24) can be 2°-3° for view angles in the 20°-45° range in the x' direction. Generally, the view angle will be underestimated using the special case solutions. This amount of error may be acceptable for many applications; however, as the user moves further out of the intended plane, the error can grow rapidly. In the general case of arbitrary user location, the $\theta_x=0$ or $\theta_y=0$ conditions are not valid and the fundamental equations that contain both $\theta_x$ and $\theta_y$ can be used. In the general case of arbitrary location, marker 2 becomes displaced both parallel and perpendicular to the line connecting markers 1 and 3. The corresponding figure for this situation is essentially a combination of FIGS. 21a and 21b. The basic equations relating the measured marker image separations, $R_{ij}$, and L, $\theta_x$, and $\theta_y$, using the far field approximation are:

$$R_{31} = \left(\frac{L_0}{L}\right) \cdot \sqrt{1 - \sin^2\theta_x \cdot \cos^2\theta_y} \quad (29)$$

$$R_{21} = \left(\frac{L_0}{L}\right) \cdot \left(\frac{1}{\cos\alpha}\right)\sqrt{1 - \sin^2(\alpha + \theta_x) \cdot \cos^2\theta_y}$$

$$R_{32} = \left(\frac{L_0}{L}\right) \cdot \left(\frac{1}{\cos\alpha}\right)\sqrt{1 - \sin^2(\alpha - \theta_x) \cdot \cos^2\theta_y}$$

where $R_{ij} = \delta r_{ij}/\delta r_{ij}^0$ are the marker image separations normalized to their calibration values, $L_0$ is a known distance from the screen where the calibration is performed, and α is a geometrical constant determined from arrangement of the markers:

$$\tan\alpha = \frac{2D}{d} \quad (30)$$

The angle, α, is essentially the angle subtended by the lines connecting markers 1 and 3 and 1 (or 3) and 2, as viewed from the top of the marker arrangement. In addition to the far field condition, three additional assumptions are used in equations (29)-(30). These equations assume that the markers are arranged symmetrically (marker 2 midway between markers 1 and 3 along the x' axis) and that marker 2 is in line with markers 1 and 3 (as viewed from the front) as shown in FIG. 21 (the preferred arrangement). While it is possible to relax these conditions, the corresponding basic equations become significantly more complex with addition of more constants. Moreover, in practice the arrangements involving asymmetric or vertically displaced markers can be handled more simply using methods similar to those described above for the $\theta_x=0$ and $\theta_y=0$ solutions. In summary, offset angles, such as those in equations (25) and (28) can be determined either initially or during the calibration procedure and then added or subtracted from the view angles calculated from the equations provided below for arbitrary user location. In the preferred arrangement, however, the offsets will be negligibly small or zero and the solutions given below can be used directly. In addition, equations (29)-(30) assume that the markers 1 and 3 are aligned along the x' axis, which is the preferred arrangement. For markers 1 and 3 aligned along y', a corresponding set of equations can be used that essentially have $\theta_x$ and $\theta_y$ interchanged. Other arrangements, with the markers aligned along an arbitrary axis are possible, and the associated basic equations can be derived but are more complex and involve additional factors.

Equations (29) constitute a set of three independent equations and three unknowns that can be solved for L, $\theta_x$, and $\theta_y$. The solutions are:

$$\tan(2\theta_x) = \frac{\Delta \cdot \kappa}{4R_{31}^2 - 2\Sigma \cdot \cos^2\alpha} \quad (31)$$

$$\cos^2\theta_y = \frac{\Delta}{\Delta \cdot \sin^2\theta_x + 4R_{31}^2 \cdot \tan\alpha \cdot \sin\theta_x \cdot \cos\theta_x} \quad (32)$$

$$\frac{L}{L_0} = \frac{\sqrt{1 - \sin^2\theta_x \cdot \cos^2\theta_y}}{R_{31}} \quad (33)$$

where $$\Delta \equiv R_{32}^2 - R_{21}^2 \quad (34)$$
$$\Sigma \equiv R_{32}^2 - R_{21}^2$$

and $\kappa = 2 \sin\alpha \cos\alpha$. As can be seen from these equations, $\theta_x$ is determined from directly measured quantities and system constants. Once $\theta_x$ is determined from equation (31), equation (32) is used to determine $\theta_y$, and then equation (33) is used to determine L. The set of equations (31)-(34) determine the location of the user for any arbitrary point provided that the markers are detectable by the sensor. However, several special cases exist and are addressed below.

Because of the repeating nature of the tangent function in equation (31), there is the possibility of an ambiguity in both the magnitude and sign of $\theta_x$ for $|\theta_x|>45°$. These ambiguities are resolved by comparing the result from equation (31) with sign of Δ. The correct sign of $\theta_x$ is determined directly from the sign of Δ. Therefore, if the sign of the $\theta_x$ calculated from equation (31) differs from that of Δ, then 90° must be added or subtracted from the calculated value of $\theta_x$ in order to determine the correct $\theta_x$. For example, if the value of $\theta_x$ calculated from equation (31) is −40° but Δ>0 (indicating that $\theta_x>0$), then 90° is added to the calculated value resulting in a corrected $\theta_x$ of 50°. This situation may be rare in practice since it occurs only for large view angles; however, it is a simple matter to include this step in the algorithm for determining $\theta_x$. Also, the sign of $\theta_y$ is not directly determined from equation (32). In this case, the relative position of marker #2 is used to determine the sign of $\theta_y$. In a manner similar to that used in equation (27), the sign of δy can be used to determine the sign of $\theta_y$ once its magnitude is calculated from equation (32).

In the special case of $\theta_y=0$, it can be shown (using trigonometric and algebraic identities) that equation (31) reduces to an expression identical to equation (24) (without the offset terms). Similarly, in the case of $\theta_x=0$, equations (31) and (32) reduce to:

$$\cos^2\theta_y = \frac{1}{\sin^2\alpha} - \left(\frac{d}{D}\right)^2 \cdot \left[\frac{\delta r_{21}^2 + \delta r_{32}^2}{2\delta r_{31}^2}\right] \quad (35)$$

which also can be shown to be equivalent to equation (27). Finally, in the special case of $\theta_x+/-90°$, where the user is essentially in the plane of the screen (z'=0), equation (32) breaks down and cannot be used. In practice, this situation will virtually never occur since it is beyond the view of the screen and the markers. However, in the unlikely event that location information is needed while the user is in or near the plane of the screen (and the markers are detectable), then a separate expression for $\theta_y$ can be easily derived from the basic equations (29)-(30).

The 3-marker out-of-plane arrangement, as described here, is capable of determining all of the relevant DOFs for the device—pointing location on the screen, distance from the screen, roll angle, and view angle with respect to the screen. The combination of these parameters defines completely the hand held device's location and orientation. The general procedure for determining these parameters is essentially an integration of those described in the previous sections. The pointing direction of the device (specifically, the intersection of the device's pointing vector and the screen) is determined using the procedure described in section 4.1. As noted earlier, in the case of multiple markers, any one of them can be used as the display cursor reference. However, in the 3-marker arrangement, since marker 2101_2 is typically located in the center and centered on the display, it would be natural to use it as the cursor reference point. Alternatively, the center, or mean, position of the three reference markers could be used (similar to the 2-marker arrangement). Note that there is a slight offset in the reference position as the user's view angle changes due to the out-of-plane geometry, but this offset is typically quite small and unlikely to be noticed in a typical pointing application. If necessary, a small view angle-dependent correction factor could be used to reduce any offset in the pointing. The view angle is then determined using the procedures described in this section.

The determination of roll angle is done following the procedure described in section 4.2 for the 2-marker arrangement. Typically, markers 2101_1 and 2101_3 are used as the two reference markers for determining $\phi$ though any pair of markers could be used provided their locations are known and fixed. As discussed in section 4.2, the apparent roll angle can depend on the view angle in the case where the markers are not aligned along the x' or x axes. As described in section 4.2, this situation can be avoided by a re-calibration of the hand held device under $\phi=0$ conditions once the view angle has changed. It is also possible to automatically calibrate or remove the view angle effect from roll by recalling that $\Delta x^0$ and $\Delta y^0$ in equation (15) have known dependences on $\theta_x$ and $\theta_y$. Therefore, since $\theta_x$ and $\theta_y$ can be measured independently of roll angle (since only the magnitude of the marker separations are used and not their orientations), their effects can be removed from the roll measurement. Since the roll angle depends on the x and y coordinates of the marker images and not just their separations, the effect of the view angles on x and y must be determined. This can be done using equation (29) which assumes that $\Delta y^0=0$ (marker images aligned horizontally, along x axis, under calibration conditions of $\theta_x=\theta_y=\phi=0$). Specifically, under the typical far field condition, the measured $\Delta x^0$ varies as $\cos(\theta_x)$ and $\Delta y^0$ varies as $\sin(\theta_x)\sin(\theta_y)$. Thus, the values of $\Delta x^0$ and $\Delta y^0$ that appear in the roll equations would be modified by replacing them with $\Delta x^0 \cos(\theta_x)$ and $\Delta x^0 \sin(\theta_x) \sin(\theta_y)$, respectively, to account for the view angle. In cases where the far field approximation is not valid or higher accuracy is desired, a more exact expression similar to equation (10) would be needed. Note also that it is possible to determine roll simultaneously with the view angle using the formulation in equation (26) since m in that equation is related to the roll angle and is essentially equivalent to equation (16). However, this applies to the case of horizontally aligned markers only; for arbitrarily aligned markers, the expression for m would have to be modified accordingly (see equation (15)).

Since the distance measurement depends sensitively on view angle (but the view angle measurement, if properly done, does not depend on distance), distance should be determined after the view angle has been measured. Also, since the roll angle measurement may depend on view angle, view angle should be determined prior to roll angle. However, since distance and roll angle are essentially independent of each other, they may be determined in either order. marker Distance may be determined using the same expressions used in the 2-marker arrangement (equations (12) and (13)) for direct view or equation (33) for the general case. marker-Again, any pair of markers may be used, but the preferred method would typically use markers 2101_1 and 2101_3 to determine distance, L.

4.4 4-Marker Embodiment

As described in section 4.3, the 3-marker embodiment has the capability of detecting all of the relevant DOFs and thus it should be sufficient for most, if not all, applications that require both device pointing and location tracking. However, there may be situations in which the preferred (out-of-plane) arrangement of the 3-marker embodiment is not possible, not practical, or undesirable. For example, the main drawback to the preferred 3-marker geometry is that one of the markers must be set back or forward with respect to the other two, and the resolution of the view angle measurement is enhanced by increasing this offset. This can result in an arrangement where one of the markers is offset by an inconveniently large distance that may not be possible due to space constraints.

The possibility of the eclipsing effect at large view angles, described in section 4.3, may also be a disadvantage. While vertically displacing the eclipsing marker can address this issue, it does add somewhat to the complexity and requires slightly more space for the marker assembly. Also, in a typical arrangement where the markers are placed on top (or perhaps below) a display screen and set back slightly from the screen plane, one of the vertical view angles may be partially or completely obscured for large enough angles. A solution to this potential problem would be to extend the markers beyond the plane of the screen, but this could be inconvenient or impractical. Therefore, while none of these potential drawbacks is significant in many situations, and the preferred 3-marker embodiment works well in most cases, there are possible situations where an "in-plane" geometry may be necessary or desirable. In these cases, certain 4-marker arrangements can provide the required DOF sensitivity using a simple geometry that avoids some, or all, of the drawbacks of the 3-marker embodiment. Finally, the 4-marker embodiment may have some additional advantages in some situations.

Since the 1-marker, 2-marker, and 3-marker embodiments described above are capable of tracking pointing, roll angle, and, in many cases, screen distance, the main focus for the 4-marker embodiment discussion will be on the measurement of the magnitude and sign of the view angle. However, since the measured marker image coordinates are functions of both distance and view angle, both will be determined from the analysis. The other DOFs are generally straightforward variations on the approaches described previously. Though there are a variety of possible 4-marker geometries (see FIG. 5e), this section will focus on the preferred arrangement shown in FIG. 5e(ii) as well as in FIG. 22. In this geometry, a reference marker is placed at, or near, each of the four corners of the screen. An equivalent rectangular arrangement, with the markers closer together and on one side of the screen (as in the preferred 2-marker and 3-marker embodiments), could be employed; however, there are some technical, as well as, practical advantages to the preferred 4-corner arrangement. These will be described below.

The main benefit of the 4-marker arrangement is that it permits separation of the distance and view angle measurements in both x and y as well as determination of the angle sign (e.g., left or right of the screen). Recall that these variables are inherently coupled and cannot be separated based on marker image coordinates alone in the basic 2-marker embodiment described in section 4.2. As in the other embodiments, the basic measurement involves determination of the four marker image coordinates and, from those, their separations. The various image separations are used to calculate the distance and view angle. For the 4-marker arrangement, there are two fundamental modes or regimes of operation. One is referred to here as the "far field" and the other as the "near field". The solutions for the two regimes are complementary and rely on different measurements of the image separations. The far field is defined as the region where the user's distance to each of the markers is approximately the same and may be considered equal. This occurs when either the marker separation is much smaller than the user's distance to the screen (i.e., markers) or when the user is located at a small view angle (i.e., near screen center). Mathematically, the far field can be defined as when the following condition holds:

$$\left(\frac{d}{2}\right) \cdot \sin(\theta) \ll L \tag{36}$$

Note that this condition is related to the last term in brackets in equation (10) and the conditions under which it can be ignored, leading to equation (11), correspond to the far field. How small equation (36) must be depends on the error in distance or angle one is willing to tolerate. If we assume that up to a 1% error in either distance or angle is acceptable, then a specific far field condition can be estimated. In order to estimate a "worst case" for the far field, we assume a large view angle of +/−45 degrees. In this case, a user may be as close as L~3.5d from the screen and maintain less than 1% error in the view angle measurement.

Under most circumstances, the view angle is smaller and the far field condition is satisfied at even smaller distances. For example, for a typical view angle of +/−12 degrees, the far field, as defined above, begins at L~d, meaning that the user can be as close as the marker separation to the screen and still be in the far field. And since in the preferred 4-marker embodiment, the marker separation, d, is close to a screen dimension, the user could be about one screen width away and remain in the far field. As discussed in section 4.1, the significance of the far field is that it permits useful approximations in the calculation of the distance and view angles. These far field approximations greatly simplify the analysis and permit closed-form solutions for the DOFs. In addition, since the far field distance is proportional to the marker separation, and d is typically much smaller for the 2- and 3-marker embodiments, these embodiments will almost always satisfy the far field condition under normal operation. The analyses used in the previous sections thus all assumed a far field condition.

In contrast, the near field regime exists in regions where the far field condition in equation (36) is invalid, or equivalently, when the distance from the user to each of the markers cannot be assumed to be equal. In this regime, the error in the far field solution may exceed acceptable limits and the near field solution, which relies on the variation in distance to each of the markers, may be used. As the user moves further from the markers, the near field solution becomes less sensitive and the far field solution can be used. In most situations, the far field solution will be adequate for determining the distance and view angle. However, inherent in the far field solution is insensitivity to the view angle sign. While the near field solution (which is essentially exact within some assumptions) is fairly insensitive to view angle changes, it is sensitive to the sign of the angle. In many cases, therefore, the more sensitive far field solution is used to determine the magnitude of the view angle and the near field solution is used to determine the sign, or direction, of the angle.

Figure 22:
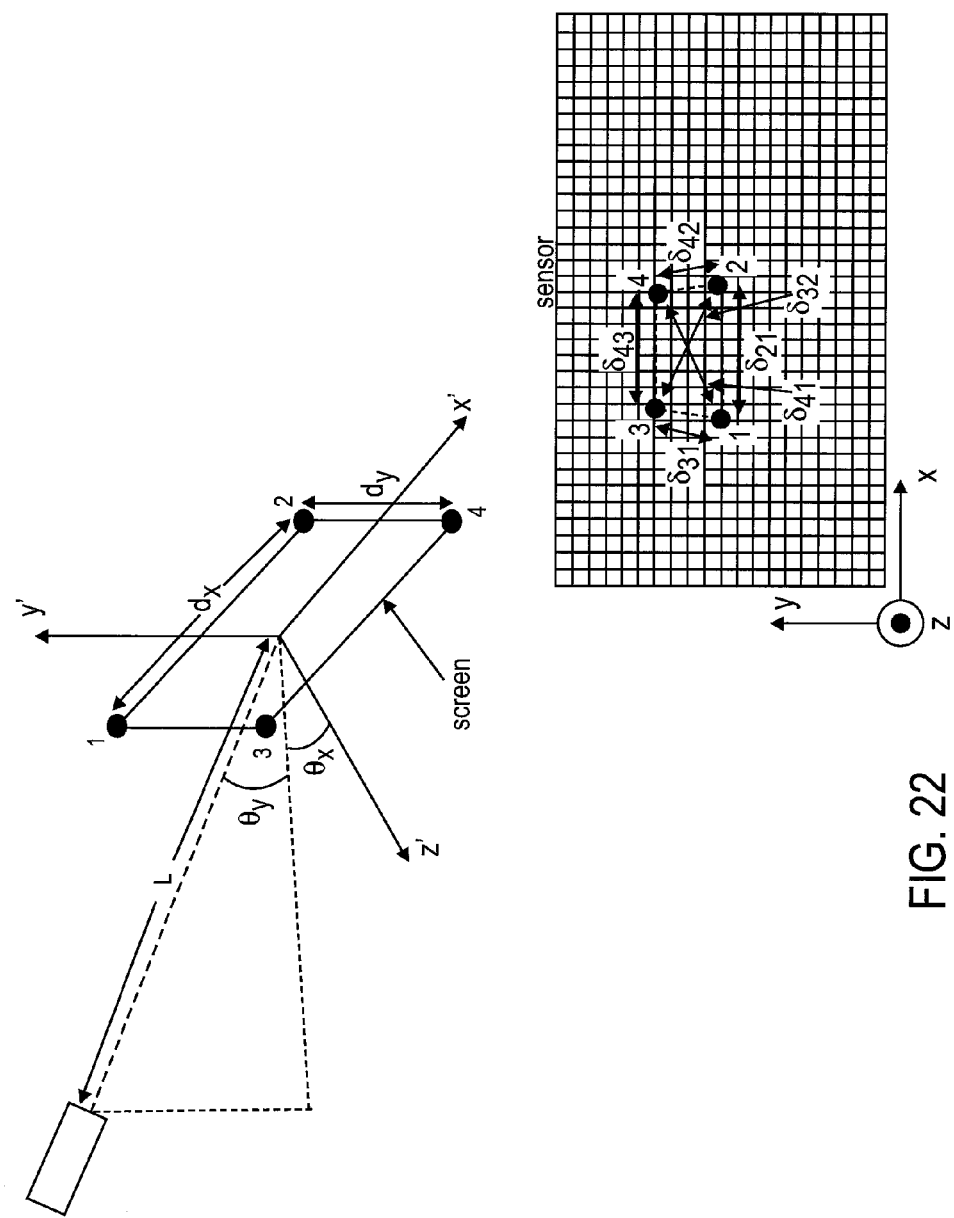
FIG. 22 shows a four marker system.

The basic geometry of the 4-marker embodiment is shown in FIG. 22. Conventional spherical coordinates are used to define the view angles, $\theta_x$ and $\theta_y$, and distance, L, to the marker origin. The origin is taken as the center point of the markers, which is typically the screen center and the distance is measured to the origin. Referring to FIG. 22, the primary measurable quantities are the various separations of the marker images on the sensor, $\delta r_{ij} = \sqrt{(x_i-x_j)^2+(y_i-y_j)^2}$, where i, j=1, 2, 3, 4 corresponding to each marker. Each image separation has a corresponding calibration value, $\delta r_{ij}^o$, which is determined at a predefined and known position. For the preferred embodiment, this position is taken to be at a known distance, $L_0$, from the screen (or markers) and at screen center ($\theta_x=\theta_y=0$). For the analyses below, the image separations will be normalized to their calibration values and the formulas are expressed in terms of these normalized quantities, $R_{ij}=\delta r_{ij}/\delta r_{ij}^o$. The basic difference between the far field and near field approaches is that the far field uses combinations of adjacent sides (e.g., $R_{21}$ and $R_{31}$) and diagonals ($R_{41}$ and $R_{32}$), whereas the near field uses combinations of opposite sides (e.g., $R_{31}$ and $R_{42}$) to determine distance and view angles. The basic equations relating the measured marker image separations, $R_{ij}$, and L, $\theta_x$, and $\theta_y$, using the far field approximation are:

$$R_{21} = R_{43} = \left(\frac{L_0}{L}\right) \cdot \sqrt{1 - \sin^2\theta_x \cdot \cos^2\theta_y} \tag{37}$$

$$R_{31} = R_{42} = \left(\frac{L_0}{L}\right) \cdot \cos\theta_y$$

$$R_{41} = \left(\frac{L_0}{L}\right) \cdot \sqrt{1 - (\sin\theta_x \cdot \cos\theta_y \cdot \cos\alpha - \sin\theta_y \cdot \sin\alpha)^2}$$

$$R_{32} = \left(\frac{L_0}{L}\right) \cdot \sqrt{1 - (\sin\theta_x \cdot \cos\theta_y \cdot \cos\alpha + \sin\theta_y \cdot \sin\alpha)^2}$$

where $\alpha$ is a geometrical constant determined by the angle formed by the horizontal line connecting markers 1 and 2 and the diagonal line between markers 1 and 4 (see FIG. 22). For a rectangular arrangement of the markers, the geometrical angle is defined as:

$$\tan\alpha = \frac{\delta r_{31}^0}{\delta r_{21}^0} = \frac{d_y}{d_x} \quad (38)$$

where $d_x$ and $d_y$ are the actual marker separations in the x' and y' directions, respectively. With markers placed in the screen corners, typical marker arrangements are square ($\alpha=45°$), 4:3 aspect ratio ($\alpha=36.9°$), and 16:9 aspect ratio ($\alpha=29.4°$). Note that the formulas for the two opposite sides are the same in equations (37) and that the values of L, $\theta_x$, and $\theta_y$ are the same in each expression. This is due to the assumption that the arrangement is rectangular and that the distances and angles are essentially the same with respect to all markers (i.e., the far field approximation). In general, even in the far field, the distances to each side are different (unless the user is exactly at screen center), and since L is taken to be in the center of the screen/markers, the accuracy of the measurement can be improved if all sides are used in the calculations. Therefore, a combination of opposite sides is used instead of just one side. The simplest combination is an average of the two sides. Thus, $$R_x = \frac{R_{21} + R_{43}}{2}$$

and $$R_y = \frac{R_{31} + R_{42}}{2}$$

can replace the first two expressions, respectively, in equation (37). Other, more sophisticated combinations may be used if higher accuracy is needed, but simple averages provide very good approximations in most cases. The two diagonal equations may be combined into a single expression:

$$\Delta \equiv R_{41}^2 - R_{32}^2 = \left(\frac{L_0}{L}\right)^2 \cdot k \cdot \sin\theta_x \cdot \sin\theta_y \cdot \cos\theta_y \quad (39)$$

where $\kappa=4 \sin\alpha \cos\alpha$ is a system constant. Equation (39) in conjunction with the formulas for adjacent sides ($R_{21}$ and $R_{31}$) in equations (37) form a set of three equations and three unknowns that can now be solved for L, $\theta_x$, and $\theta_y$. The resulting formulas are:

$$\left(\frac{L}{L_0}\right)^2 = \frac{k^2 \cdot (R_x^2 + R_y^2) - k \cdot \sqrt{k^2 \cdot (R_x^2 - R_y^2)^2 + 4\Delta^2}}{2(k^2 R_x^2 R_y^2 - \Delta^2)} \quad (40)$$

$$\sin^2\theta_x = \frac{\left(\frac{L_0}{L}\right)^2 - R_x^2}{R_y^2} \quad (41)$$

-continued $$\cos^2\theta_y = \left(\frac{L}{L_0}\right)^2 \cdot R_y^2 \quad (42)$$

The measured quantities, $R_x$, $R_y$, and $\Delta$ are used in equation (40) to determine L, which is then used to determine $\theta_x$ and $\theta_y$ using equations (41) and (42), respectively. $L_0$ corresponds to a known distance from the markers/screen center where the calibration marker coordinates are determined, stored as reference coordinates, and subsequently used for location and pointing calculations. Equations (37)-(42) also assume that the calibration is performed at $\theta_x=\theta_y=0$ (directly in front of the screen). Although $\Delta$ can be positive or negative, indicating view angle sign (equation (39)), only $\Delta^2$ appears in equations (41) and (42) and so the view angle sign is not resolved. This is consistent with the far field condition—in the far field the marker arrangement looks approximately the same from either side of the screen center.

In order to determine the sign of the angles (left or right, up or down), the difference between opposite sides must be detected. When the user is in the far field, this difference is small by definition. However, if only the sign of the view angle is required from this aspect, then the near field effect can be used to differentiate one side from the other. Thus, when the user is in the far field, equations (40)-(42) are used to determine distance and the magnitudes of the view angles, and the following conditions can be used to determine the signs of the view angles: $\theta_x>0$ for $R_{42}-R_{31}>0$, $\theta_x<0$ for $R_{42}-R_{31}<0$ and $\theta_y>0$ for $R_{21}-R_{42}>0$, $\theta_y<0$ for $R_{21}-R_{42}<0$. Note, however, that these inequalities become inherently uncertain for positions near screen center, or far from the screen, i.e., the far field where the inequalities become approximate equalities. In these cases, where the user is well into the far field regime, the sign of the view angle may become ambiguous. This limitation is characteristic of the in-plane geometry, whereas the out-of-plane geometry using 3 markers described in section 4.3 provides potentially higher sensitivity and less ambiguity to the angle sign.

Aside from the far field condition requirement, there is one situation where equations (40)-(42) become invalid: $\theta_x=+/-90°$ or $\theta_y=+/-90°$. In this case, where the user is essentially in the plane of the screen (z'=0), equation (40) becomes undefined and distance can not be determined. However, in practice, this situation will virtually never occur since it is outside of the typical range of operation of the system—the user cannot see the screen and the markers are generally not detectable by the sensor in this region. Therefore, this special case is almost never a problem. If there are particular circumstances where the location of the handheld device is desired while the user is in or near the screen plane (and the markers are detectable), then a separate set of equations that apply to that situation can be derived. However, since this case is not relevant to the primary application of pointing while viewing a screen, it is not described further here.

It is possible to construct a set of equations analogous to (37) that are essentially exact and that do not rely on the far field approximation. However, this set of coupled equations, which have forms similar to equation (10), are complex and virtually intractable for determining an arbitrary location in space. This is the reason for using the far field approximation, leading to equation (37), which will suffice in providing accurate location determination in the majority of situations encountered. However, when the user is in the near field, the determination of location using equations (40)-(42) becomes less accurate. In extreme cases, where the user is close to the markers/screen and not near the screen center, i.e., where equation (36) is invalid, it is possible to derive a separate set of equations for user location that applies in specific regions. In the near field regime, an approach different from that used for the far field solution is needed since the distances to each marker cannot be considered effectively equal. Although closed-form solutions cannot be obtained for the exact equations, fairly simple solutions can be derived under certain, potentially common, situations. Referring to equation (37), if one restricts the user's position on or near the x'-z' plane ($\theta_y=0$), and the actual distance to each side of the rectangle formed by the markers is included, then the following simplified equations for two of the sides results:

$$R_{31} = \frac{L_{31}^0}{L_{31}} \quad (43)$$

$$R_{42} = \frac{L_{42}^0}{L_{42}}$$

where $L_{ij}$ is the distance from the user to the center of the line joining markers i and j and $L_{ij}^0$ is the corresponding distance during calibration. Similarly, if the user's position is restricted to the y'-z' plane ($\theta_x \approx 0$):

$$R_{21} = \frac{L_{21}^0}{L_{21}} \quad (44)$$

$$R_{43} = \frac{L_{43}^0}{L_{43}}$$

The two important differences between equation (43) and (37) are the absence of the trigonometric terms that vanish under the $\theta_x \approx 0$ or $\theta_y \approx 0$ assumptions and the inclusion of the dependence of the measured image separations ($R_{ij}$) on the actual distance ($L_{ij}$) to the user in contrast to the approximation that the user's distance to the markers is the same. Under these conditions, the view angle dependence is contained in the distance factors, $L_{ij}$. Using standard trigonometric techniques that relate $L_{ij}$ to distance and view angle, the following expressions are obtained for $\theta_y \approx 0$:

$$L = \sqrt{\frac{(L_{31}^0)^2}{2} \cdot \sum_x - \left(\frac{d_x}{2}\right)^2} \quad \text{where} \quad (45)$$

$$\sum_x = \frac{1}{R_{31}^2} + \frac{1}{R_{42}^2} \quad \text{and} \quad (46)$$

$$\sin\theta_x = \frac{(L_{31}^0)^2 \cdot \Delta_x}{2d_x L} \quad \text{where} \quad (47)$$

$$\Delta_x = \frac{1}{R_{31}^2} + \frac{1}{R_{42}^2} \quad (48)$$

Note that $L_{ij}^0$ are, by definition, equal for (ij)=(3,1) and (4,2) and so either value can be used in equations (45) and (47). A similar set of equations can be derived for $\theta_x \approx 0$:

$$L = \sqrt{\frac{(L_{21}^0)^2}{2} \cdot \sum_y - \left(\frac{d_y}{2}\right)^2} \quad (49)$$

$$\sum_y = \frac{1}{R_{21}^2} + \frac{1}{R_{43}^2} \quad (50)$$

$$\sin\theta_y = \frac{(L_{21}^0)^2 \cdot \Delta_y}{2d_y L} \quad (51)$$

$$\Delta_y = \frac{1}{R_{43}^2} + \frac{1}{R_{21}^2} \quad (52)$$

The important differences between these sets of equations and those corresponding to the far field (equations (39)-(42)) are that opposite sides of the marker rectangle are used here versus adjacent sides and, because $\Delta_x$ and $\Delta_y$ can be positive or negative, the sign of the view angle is determined in equations (47) and (51). Thus, using the near-field equations, both magnitude and sign of the view angle may be determined. Unfortunately, these closed-form solutions are strictly valid only when the user is in either the y'=0 or x'=0 planes. If the user's position is close to these planes, they can still be used with a small error that grows as the user moves away from these planes. In addition, as noted earlier, the sensitivity of the near field solutions decreases as the user moves away from the markers.

Therefore, in practice, since most user positions will be well into the far field, the far field equations can be used in general to determine, with high sensitivity, the user's distance and view angle magnitude. To determine the view angle sign, the conditions described earlier for the far field can be used (comparing the magnitudes of $R_{ij}$), or the sign of $\Delta_x$ and $\Delta_y$ can be used. In special cases where the user is in the near field and is known to be near the y'=0 or x'=0 planes (e.g., the motion is restricted to either of these planes), then the near field equations (equations (45)-(52)) can be used. Also, since these equations are exact, if the user is known to be near the y'=0 or x'=0 planes, the near field equations can be used even in the far field. However, since the far field equations are generally much more sensitive to view angle changes, the preferred method uses the far field equations whenever they are applicable.

As described in section 4.2, pointing and tracking can be performed using one or more of the markers. The preferred embodiment uses equation (20) to determine an "average" coordinate for the marker images and tracks changes in this coordinate, as described in section 4.2. The remaining DOF that needs to be tracked is roll. A variation on the approach taken in equations (15)-(17) for the 2-marker embodiment can be used for the 4-marker embodiment as well. In principle, any two markers can be used as the reference for roll motion as long as their initial coordinates are known. The procedures for both roll detection and rotation compensation for the 4-marker embodiment are essentially the same as those for the 2- and 3-marker embodiments described in the previous sections.

A potential issue for any embodiment that involves multiple markers is the correct identification of each marker, i.e., which is marker #1, #2, etc. For the vast majority of situations (user position, pointing direction, and roll angle), the marker identity will be clear. For example, in the 4-marker embodiment, marker image #1 will nearly always be in the upper left hand corner of the four marker arrangement on the image sensor, and the other markers will have image positions relative to marker #1 as shown in FIG. 22. The primary situation where there may be ambiguity in the marker identity is when the device is rotated by a large amount and the marker arrangement is square ($\alpha=45°$). In these cases, marker #1 may be in a position normally occupied by marker #2, for example, which could lead to errors in the position and orientation measurements, though pointing accuracy should not be significantly affected by any marker misidentification.

In cases where marker identity could be a problem, there are several methods for addressing any associated measurement problems. One method is to require that the handheld device is initially calibrated at a known roll angle, and then subsequent motions are tracked relative to this initial orientation. In this way, the identity of each marker is always known after an initial calibration. A more robust method would be to uniquely identify at least one of the markers using a physical distinction. For example, marker #1 in the 4-marker embodiment, or the center marker in the 3-marker embodiment, may be temporally modulated (e.g., repeatedly turned on and off). The tracking algorithm could then be programmed to identify the modulated marker as #1, for example. The other markers would maintain their relative positions with respect to #1. The advantage of this approach is that no calibration is required to establish the identity of the markers. The disadvantage is that a more complex marker set up is required.

5.0 Electronic Equipment Embodiments

As discussed at length above, absolute pointing involves a working system in which signals sent from a handheld device are processed, and, in response, certain effects are made to appear on a display and/or are triggered with electronic equipment. Examples of such electronic equipment include electronic equipment containing the following types of circuitry: a) standard television circuitry such as the circuitry within a television used to process the signals received from the television's remote control; b) a satellite TV receiver circuitry; c) a cable TV receiver circuitry; d) VCR circuitry; e) DVD player circuitry; f) a computer's circuitry; g) music player circuitry (e.g., CD player circuitry, stereo receiver circuitry, etc.); h) gaming circuitry; i) an IPTV receiver and/or television circuitry; j) receiver circuitry for a "receiver" that receives signals from one or more of items of electronic equipment such as those listed in a) through i) above; k) home and/or office automation equipment (e.g., equipment including circuitry for turning household switches "on" and "off").

Each of these types of circuitry typically include some kind of processor or controller that executes program code that: 1) implements a user interface for the particular type of equipment at issue (e.g., a menu driven user interface in the case of a television, a TV receiver, a DVD player, a VCR player, etc; or, a windows based interface in the case of a computer); and/or, 2) implements a cursor or icon (which may be associated with a user interface) or a highlighting mechanism for a menu based user interface in which specific menu options are highlighted.

It is on these processors that program code for implementing absolute pointing (e.g., execution of mathematical calculations to translate marker image location to pointed to display location and/or identification of marker image positioning, as well as the program code functions described above in the immediately preceding paragraph) are expected to be executed. FIGS. 23a through 23e show different architectures that includes these processors for various types of electronic equipment such as those outlined above. Of course, other types of architectures are possible. For simplicity, none of FIGS. 23a through 23e show a non-volatile memory device typically used for storing program code (e.g., a Read Only Memory such as an EPROM, EEPROM, etc). It should be understood that the architectures of FIGS. 23a through 23e are assumed to include them.

Figure 23A:
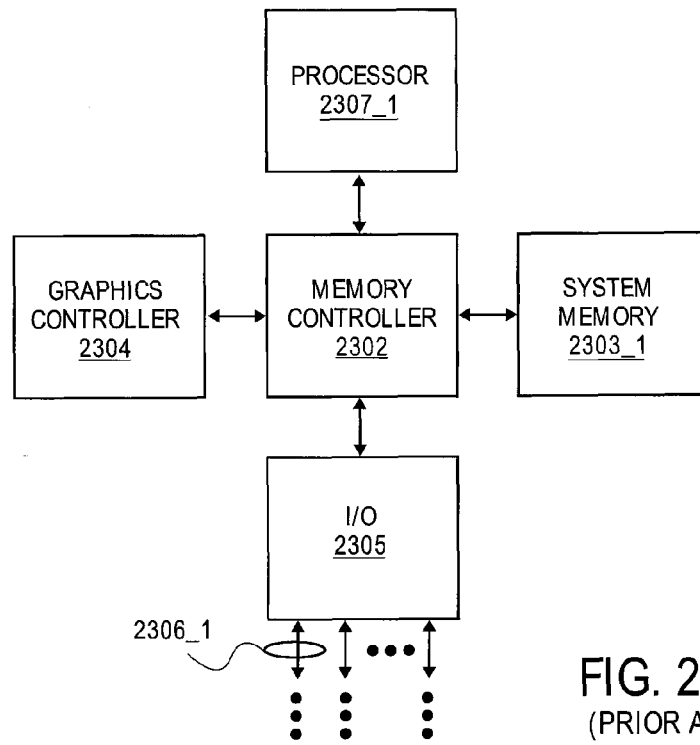
FIGS. 23a through 23e show different architectures that contain a processor.

FIG. 23a shows an architecture that is often found in personal computer (PC) systems. According to the architecture of FIG. 23a, a memory controller 2302 controls requests for access to a memory 2303_1 by a processor 2307_1 (single core or multi-core), a graphics controller 2304 and an I/O control hub 2305. The memory 2303_1 typically contains instructions that can be executed by the processor 2307_1 and data upon which these instructions operate. The display may be provided with content information prepared by the graphics controller 2304; or, if the display is further downstream in the processing chain, information for rendering content on the display may be sent from the computing system through an input/output (I/O) (such I/O 2301_1). An I/O is any kind of channel through which information processed by the processor 2307_1 is sent and/or received by the system to which the processor 2307_1 pertains. For instance, information sent by the handheld device would arrive through an I/O (e.g., this includes wireless transceiver circuitry).

Figure 23B:
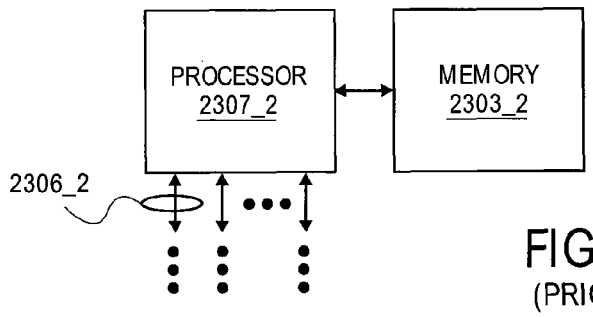
Figure 23C:
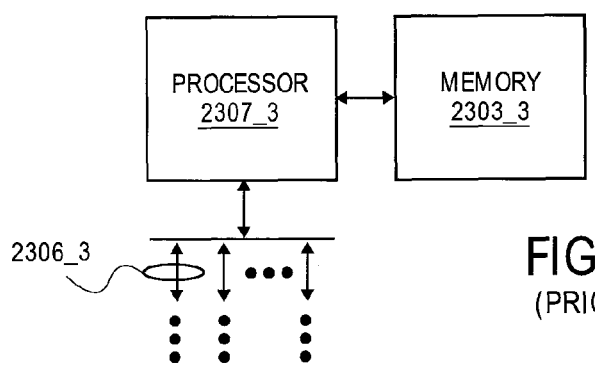
Figure 23D:
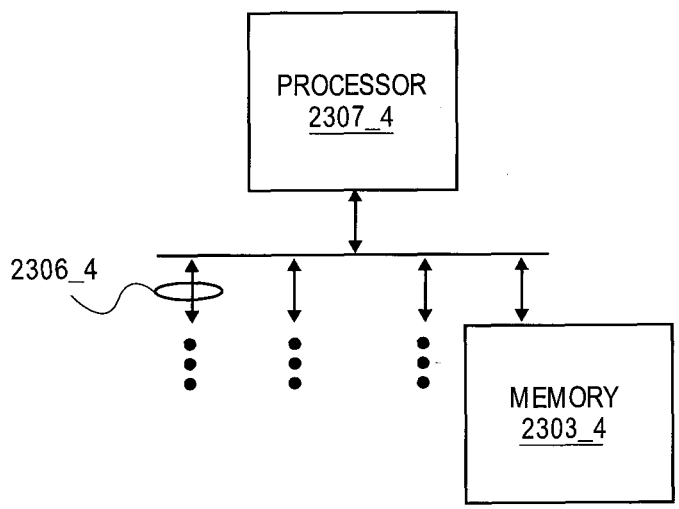
Figure 23E:
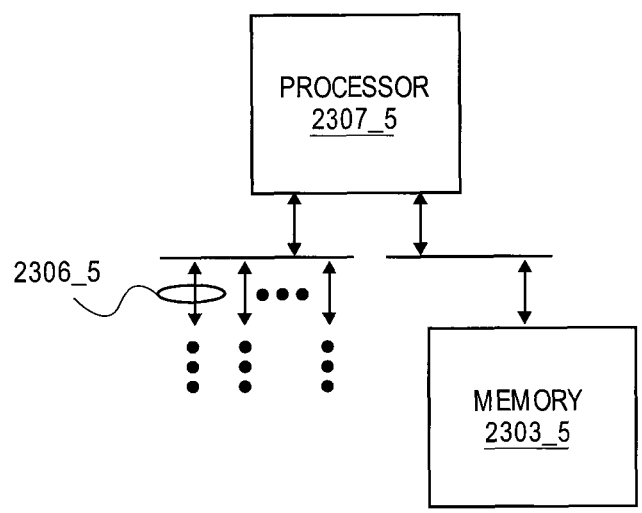

FIG. 23b shows an architecture where the processor 2307_2 is directly coupled to the memory 2303_2, and where, the processor 2307_2 receives/provides its own I/O 2303_2. FIG. 23c shows an architecture similar to that of FIG. 23b except that a bus is used for the I/O 2306_3. FIG. 23d shows an architecture where the memory 2303_4 shares the same bus as the I/O 2306_4. FIG. 23e shows an architecture where the memory 2303_5 is accessed through a different bus than that of the I/O 2306_5.

6.0 Multiple User Embodiments

Other applications include the ability to support multiple users simultaneously (i.e., in parallel) or, in some cases, sequentially (i.e., serially), particularly in situations where it is desirable to have cursor/menu selection control shared among more than one user or to have multiple active cursors. In the case of a single shared cursor or single shared menu, independent users, each with a remote pointing device, may possess control of the screen cursor (and thus function commands) and/or make menu selections using a prescribed protocol. There are a variety of methods that may be used to establish the sharing protocol.

One approach may be "centralized" wherein one of the remote devices may be designated as the master controller that may relinquish cursor control to any of the other users by sending appropriate commands to the control unit. In other approaches control of the cursor may be "distributed" such as a token passing scheme (e.g., where a token is passed around by the handheld devices and the device having the token assumes control of the cursor). In either centralized or distributed schemes, control priority may be determined based on a set of rules that account for activity level (e.g., an inactive remote control loses priority or an active one gains priority), a prescribed sequence (priority is rotated among the group of users), or a predetermined hierarchy of control (e.g., user #1 has control while active, user #2 has control while active and #1 is inactive, etc.). Many other sharing protocols that are encompassed by the spirit of this description may be readily implemented by those skilled in the art.

Multiple users with multiple simultaneously active cursors and/or menu selection (e.g., one cursor for each user) represents a more advanced form of a multiple-user environment.

In this case, the control unit would display and move screen cursors corresponding to each user's pointing device based on the coordinate data for each device. Different cursor icons may be used to aid in distinguishing each user's actions (e.g., color, shape, etc.). Although multiple cursors may be displayed and controlled simultaneously, priority of function commands has to be determined at least for situations where a single display feature is pointed to by multiple cursors and/or in systems capable of only executing one command at a time. The simplest form of priority determination could be based on which user is first to select a command. Other procedures for determining command priority will be apparent to someone skilled in the art. Multiple users with simultaneously active cursors may be particularly useful for gaming functions.

7.0 Applications Stemming from Handheld Device Activity

Recalling the discussion above pertaining to FIGS. 10a,b and the "virtual dial", specific pointing actions or motions may be interpreted as preprogrammed functions. For example, a quick upward motion or jerk of the visual remote while pointed at the screen may be interpreted as a "move up" command, while a quick motion to the right may be interpreted as a "move right" command, etc. The basic select function may also be programmed into the handheld device, as a simple click of a button while the screen cursor is pointed at the desired function tab, similar to a computer mouse. Alternatively, a predefined action, such as a move away from and back to the function tab with the cursor, could enable the select function. This gesturing capability allows for the programming of virtual buttons and actions and could obviate the need for hard-coded buttons on the pointing device.

In addition to distance and location determination or estimation, another aspect of the multiple-reference or multiple-sensor form of the invention is the ability to sense rotational motion of the pointing device, as described in sections 1 and 4. For example, with two reference markers, relative rotation between the screen and the pointing device, along an axis approximately parallel to the line connecting the pointing device and screen, is detectable. This type of motion is not generally detectable with the single reference/single sensor preferred embodiment since it does not represent a change in pointing direction. This type of motion is typically referred to as roll, and, while it does not represent a pointing action, may be used to enable other commands and functions through simple and intuitive gestures. One example of the use of this rotational or twisting motion is the "virtual dial" discussed above for controlling various attributes of an appliance, e.g., volume, channel, song track, etc. Other basic motions or actions detectable by the present invention and described previously may be used for specific commands or functions. Another aspect of the operation of the handheld device is that it does not require the user to point within the screen boundary in order to be recognized by the overall system. This results from the location and orientation sensing capability of the system so that executable actions are not confined to the location of a screen cursor, as in conventional mouse-type pointing devices. Here, the pointing range is determined by the device sensor's field of view and the user's distance from the screen instead of the screen size. Typically, the usable pointing range is larger than the screen size. Therefore, pointing actions beyond the screen boundary can be used for a variety of functions or commands. For example, screen menus can be activated or displayed upon the user directing the pointer beyond a specified boundary (e.g., the screen edge). Or motion up or down outside the screen boundaries may activate a scrolling function on a displayed screen menu. Many other "outside-the-screen" actions may be enabled using this property of the absolute pointing device.

8.0 Gaming Applications

In addition to the basic remote control functions described thus far, a related application of the absolute pointing device is its use as a video game interaction mechanism, or game controller. Conventional game controllers are based on mouse-type or joystick-type input devices and buttons, in which the game functions (e.g., scene navigation, weapon firing, etc.) are controlled by standard mouse or joystick movements (which are relative in nature) and button pressing. In particular, the navigation and motion control aspects of video games may be enhanced significantly by the absolute pointing and location sensing capabilities of the device. In addition to the direct screen pointing capability, the sensitivity to screen distance, screen viewing angle, device roll angle, pitch, and yaw permit degrees of freedom for the player that are not found in conventional game controllers. These properties can be employed to control a variety of actions such as intuitive three dimensional motion (e.g., games using flight simulation) and location-sensitive interactions (e.g., scene perspective moving as player moves, or speed control using in-out motion). Here, the term "user interface" should be construed to be broad enough to cover a displayed gaming interface.

9.0 Closing Comments

Some of the processes taught by the discussion above may be performed with program code such as machine-executable instructions which cause a machine (such as a processor disposed on a semiconductor chip, or an "interpreter" (e.g., a Java virtual machine) that converts abstract program code into processor-specific program code) to perform certain functions. Alternatively, these functions may be performed by specific hardware components that contain hardwired logic circuitry for performing the functions (e.g., a logic state machine), or by any combination of programmed computer components and hardwired logic components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   emitting non-visible radiation having a predetermined frequency band from two or more markers adapted for placing in spaced-apart fixed locations on or proximate to a display,;
   filtering at a handheld device radiation so as to pass the radiation in the predetermined frequency band and to substantially exclude other radiation;
   passing the radiation in the predetermined frequency band through an imaging element to a pixelated sensor;
   producing separate images of at least two of the spaced-apart markers when radiation therefrom is incident on the pixelated sensor within the handheld device;
   generating image data for each of the at least two separate images;
   processing the image data in the handheld device to provide coordinate data of the images appearing on the pixelated sensor, the coordinate data comprising less data than the image data, wherein processing the image data further comprises:
   determining an intensity value for each of a plurality of pixels of the pixelated sensor, the intensity value attaining one of three or more quantized intensity values;
   identifying a set of pixels which have an intensity value above a specified threshold;
   and generating the coordinate data based on the intensity value and the location of each of the pixels in the set of pixels;
   sending from said handheld device the coordinate data derived from the processing of the image data; and,
   triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display.

2. The method of claim 1 wherein said electronic equipment circuitry is selected from the group consisting of:
   a) television circuitry;
   b) satellite TV receiver circuitry;
   c) cable TV receiver circuitry;
   d) VCR circuitry;
   e) DVD player circuitry;
   f) computer circuitry;
   g) CD player circuitry;
   h) music receiver circuitry;
   i) IPTV television and/or receiver circuitry
   j) gaming circuitry;
   k) home automation circuitry;
   l) receiver circuitry.

3. The method of claim 1 wherein said electronic equipment comprises a processor.

4. The method of claim 1 wherein said electronic equipment comprises a controller.

5. The method of claim 1 further comprising triggering action taken by the electronic equipment circuitry in response to the coordinate data causing the cursor to move within an icon on the display.

6. The method of claim 5 further comprising triggering action taken by electronic equipment circuitry in response to the coordinate data causing the cursor to move within the icon in combination with one or more additional control signals received from handheld device.

7. The method of claim 1 wherein the coordinate data includes signal strength of each of the two or more markers.

8. The method of claim 1 wherein the coordinate data comprises locations of the two or more marker images captured on said pixelated sensor.

9. The method of claim 1 wherein the coordinate data comprises data that identifies the particular handheld device sending the coordinate data.

10. The method of claim 1 wherein said method further comprises:
    detecting a roll motion of the handheld device using the coordinate data provided by the handheld device, the roll motion comprising a rotation about an axis of the handheld device's pointing vector.

11. The method of claim 10 wherein, if a change in roll is determined, a graphical image shown on the display is rotated.

12. The method as in claim 10 wherein the graphical element being rotated comprises the cursor.

13. The method of claim 1 further comprising triggering action taken by electronic equipment circuitry in response to the coordinate data residing at a menu option presented on the display.

14. The method of claim 1 further comprising triggering action taken by electronic equipment circuitry in response to the coordinate data residing at a cursor on the display.

15. The method of claim 1 wherein said method further comprises at least one of the following:
    determining that the handheld device is pointing to a location above a predetermined location upward and interpreting the pointing as a "move-up" command;
    determining that the handheld device's pointing is rightward of a predetermined location and interpreting pointing as a "move-right" command; and
    determining the handheld device's distance from the display.

16. The method of claim 1 wherein said determining further comprises
    using data taken from said sensor from within a region of pixels that surround one of said images, said data containing intensity value information on each of said pixels;
    summing across said data in a first direction and in a second direction;
    fitting a first curve to a first profile that results from said summing in said first direction;
    fitting a second curve to a second profile that results from said summing in a second direction;
    identifying as a first coordinate of said one image's coordinates a center of said first curve; and
    identifying as a second coordinate of said image's coordinates a center of said second curve.

17. A system comprising:
    (i) a handheld device comprising a pixelated sensor, an optical filter for passing a predetermined frequency band of radiation to the sensor, and a transmitter;
    (ii) electronic equipment adapted for coupling to a display and configured to generate video images of a graphical user interface on the display;
    (iii) at least two markers adapted for placing in spaced-apart fixed locations on or proximate to the display, the markers providing radiation at a frequency band passed by the optical filter, and the pixelated sensor adapted to form separate images of at least two of said spaced-apart markers when radiation therefrom is incident on the sensor; and (iv) the handheld device further including:
a processor coupled to receive and process image data of each of the at least two separate images of the markers on the sensor, the processor adapted to compute coordinate data of the images on the sensor from the image data, the coordinate data comprising less data than the image data, wherein computing coordinate data of the images comprises:
determining an intensity value for each of a plurality of pixels of the pixelated sensor, the intensity value attaining one of three or more quantized intensity values;
identifying a set of pixels which have an intensity value above a specified threshold; and
generating the coordinate data based on the intensity value and the location of each of the pixels in the set of pixels;
the processor being coupled to the transmitter to transmit the coordinate data to the electronic equipment, the electronic equipment adapted for receiving the coordinate data and responsively performing a plurality of actions, wherein at least one of the actions includes actively controlling movement of a cursor displayed on the display, the cursor comprising a graphical element usable for selecting one or more other graphical elements from within the graphical user interface generated by the electronic equipment on the display.

18. The system of claim 17 wherein the transmitter is a wireless transmitter.

19. The system as in claim 17 wherein the electronic equipment detects a roll motion of the handheld device using the coordinate data provided by the handheld device, the roll motion comprising a rotation about an axis of the handheld device's pointing vector.

20. The system as in claim 19 wherein, if a change in roll is determined, a graphical image shown on the display is rotated.

21. The system of claim 17 wherein said determining further comprises
using data taken from said sensor from within a region of pixels that surround one of said images, said data containing intensity value information on each of said pixels;
summing across said data in a first direction and in a second direction;
fitting a first curve to a first profile that results from said summing in said first direction;
fitting a second curve to a second profile that results from said summing in a second direction;
identifying as a first coordinate of said one image's coordinates a center of said first curve; and
identifying as a second coordinate of said image's coordinates a center of said second curve.

22. The system of claim 17 further comprising determining a distance and/or viewing angle based on the separation between two or more coordinates of said images of said markers.

23. A method for controlling movement of a cursor on a display screen, the method comprising:
emitting infrared radiation having a predetermined frequency band from two or more markers adapted for being placed in spaced-apart locations on or proximate to the display screen;
receiving the emitted radiation at the handheld device, the emitted radiation passing through a filter disposed on the handheld device that substantially excludes other radiation;
passing the filtered radiation through an imaging element to a pixelated sensor disposed within the handheld device;
generating a separate image for each of at least two spaced-apart markers based on the filtered radiation that reaches the pixelated sensor;
generating image data for each of the separate images;
processing the image data in the handheld device to generate coordinate data for each separate image, by:
determining an intensity value for each of a plurality of pixels of the pixelated sensor, the intensity value attaining one of three or more quantized intensity values;
identifying a set of pixels having intensity values above a specified threshold; and
generating the coordinate data based on the intensity values and the location of each of the pixels in the set of pixels;
transmitting the generated coordinate data from said handheld device to electronic equipment circuitry that controls the movement of the cursor on the display screen.

24. The method of claim 23 wherein said method further comprises:
detecting a roll motion of the handheld device using the coordinate data provided by the handheld device, the roll motion comprising a rotation about an axis of the handheld device's pointing vector.

25. The method of claim 23 further comprising determining a distance and/or viewing angle based on the separation between two or more coordinates of said images of said markers.

26. A system for controlling a cursor on a display screen, the system comprising:
two or more markers substantially aligned in an x-direction of a coordinate system of a display screen;
a handheld device having:
a pixelated image sensor that detects infrared radiation and produces an intensity value for each of a plurality of pixels of the pixelated image sensor, the produced intensity values each attaining one of three or more quantized intensity values;
an image processor that identifies a set of pixels that have intensity values above a specified threshold and from which the processor detects two or more marker images based on the intensity values and also determines characteristics of the detected marker images based on the intensity value and location of each of the pixels in the set, the characteristics including the x, y coordinates of each of the detected images of the markers in the coordinate system of the pixelated image sensor; and
a transmission unit for sending the x, y coordinates of the two or more marker images in the coordinate system of the pixelated image sensor;
and a graphical user interface device having at least one processor that:
receives the x, y coordinates of the two or more marker images in the coordinate system of the pixelated image sensor;
computes a composite position of the received x, y coordinates in the coordinate system of the pixelated image sensor;
converts the computed composite position into a converted position of the coordinate system of the display screen that is used to determine a position on the display screen at which the cursor appears.

27. The system of claim 26 wherein the at least one processor of the graphical user interface device determines the rotation of the handheld device in the coordinate system of the display screen.

28. The system of claim 26 wherein the at least one processor of the graphical user interface device rotates the displayed cursor based on the determined rotation of the handheld device.

29. The system of claim 26 wherein the at least one processor of the graphical user interface device determines a distance and/or viewing angle based on the separation between two or more coordinates of said images of said markers.

* * * * *

INTER PARTES REEXAMINATION CERTIFICATE (1147th)

United States Patent
Sweetser et al.

(10) Number: US 7,864,159 C1
(45) Certificate Issued: Jul. 23, 2015

(54) HANDHELD VISION BASED ABSOLUTE POINTING SYSTEM

(75) Inventors: John Sweetser, San Jose, CA (US); Anders Grunnet-Jepsen, San Jose, CA (US); Kenneth Salsman, Pleasanton, CA (US)

(73) Assignee: THINKOPTICS INC., San Jose, CA (US)

Reexamination Request:
No. 95/002,118, Aug. 31, 2012

Reexamination Certificate for:
Patent No.: 7,864,159
Issued: Jan. 4, 2011
Appl. No.: 11/187,435
Filed: Jul. 21, 2005

Related U.S. Application Data

(60) Provisional application No. 60/593,413, filed on Jan. 12, 2005.

(51) Int. Cl.
*G09G 5/08* (2006.01)
*G06F 3/03* (2006.01)
*G06F 3/0346* (2013.01)

(52) U.S. Cl.
CPC ............ *G06F 3/0325* (2013.01); *G06F 3/0346* (2013.01)

(58) Field of Classification Search
None
See application file for complete search history.

(56) References Cited

To view the complete listing of prior art documents cited during the proceeding for Reexamination Control Number 95/002,118, please refer to the USPTO's public Patent Application Information Retrieval (PAIR) system under the Display References tab.

*Primary Examiner* — Jason Proctor

(57) ABSTRACT

A method is described that involves identifying one or more images of respective one or more fixed markers. Each marker is positioned on or proximate to a display. The images appear on a pixilated sensor within a handheld device. The method also involves determining a location on, or proximate to, the display where the handheld device was pointed during the identifying. The method also involves sending from the handheld device information derived from the identifying of the one or more images of respective one or more fixed markers. The method also involves triggering action taken by electronic equipment circuitry in response to the handheld device's sending of a signal to indicate the action is desired.

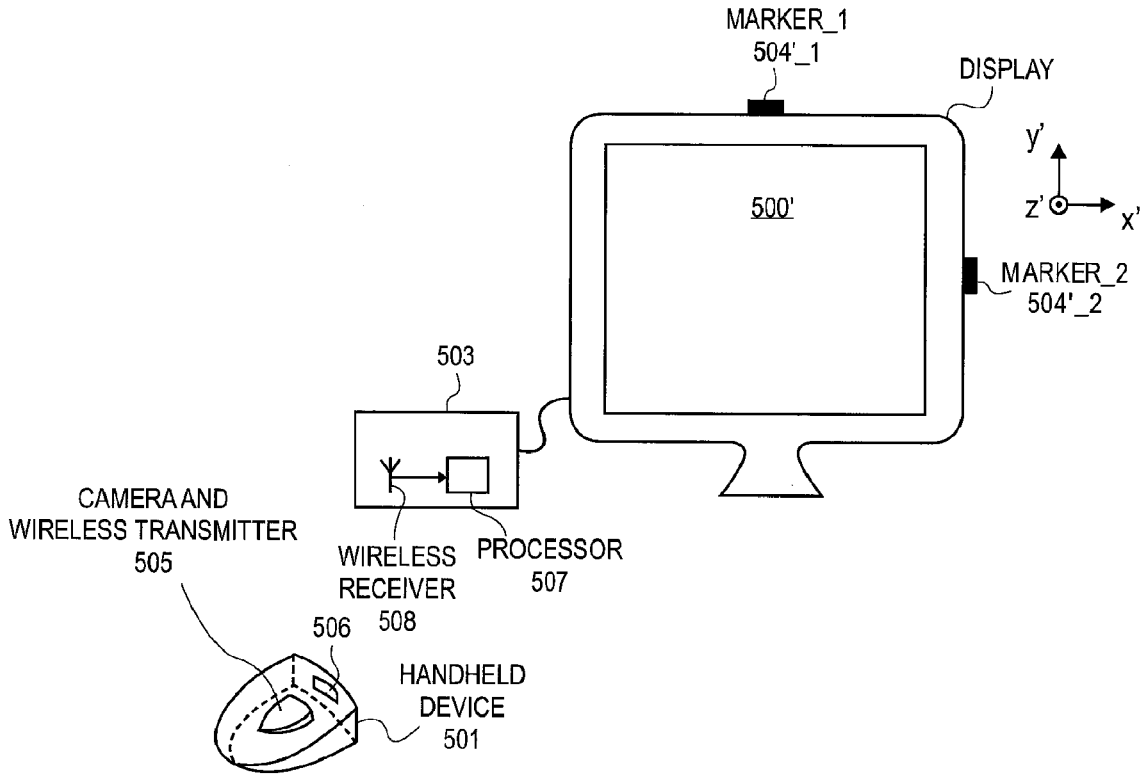

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 21 is confirmed.

Claims 1-15, 17-20 and 22-29 are cancelled.

Claim 16 is determined to be patentable as amended.

New claims 30-67 are added and determined to be patentable.

16. [The method of claim 1] *A method, comprising:*
  *emitting non-visible radiation having a predetermined frequency band from two or more markers adapted for placing in spaced-apart fixed locations on or proximate to a display;*
  *filtering at a handheld device radiation so as to pass the radiation in the predetermined frequency band and to substantially exclude other radiation;*
  *passing the radiation in the predetermined frequency band through an imaging element to a pixelated sensor;*
  *producing separate images of at least two of the spaced-apart markers when radiation therefrom is incident on the pixelated sensor within the handheld device;*
  *generating image data for each of the at least two separate images;*
  processing the image data in the handheld device to provide coordinate data of the images appearing on the pixelated sensor, the coordinate data comprising less data than the image data, wherein processing the image data further comprises:
    determining an intensity value for each of a plurality of pixels of the pixelated sensor, the intensity value attaining one of three or more quantized intensity values;
    identifying a set of pixels which have an intensity value above a specified threshold; and
    generating the coordinate data based on the intensity value and the location of each of the pixels in the set of pixels;
  sending from said handheld device the coordinate data derived from the processing of the image data; and
  triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display, wherein said determining further comprises
  using data taken from said sensor from within a region of pixels that surround one of said images, said data containing intensity value information on each of said pixels;
  summing across said data in a first direction and in a second direction;
  fitting a first curve to a first profile that results from said summing in said first direction;
  fitting a second curve to a second profile that results from said summing in a second direction;
  identifying as a first coordinate of said one image's coordinates a center of said first curve; and
  identifying as a second coordinate of said image's coordinates a center of said second curve.

*30. The method of claim 16, further comprising:*
  *determining the center of the first curve; and*
  *determining the center of the second curve.*

*31. The method of claim 30, wherein:*
  *determining the center of the first curve comprises determining a first center position between full-width half-maximum points of the first curve; and*
  *determining the center of the second curve comprises determining a second center position between full-width half-maximum points of the second curve.*

*32. The system of claim 17, wherein:*
  *a first marker of the at least two markers is disposed outside of an x-y plane defined by a screen of the display; and*
  *a second marker and a third marker of the at least two markers are substantially disposed in the x-y plane defined by the screen of the display.*

*33. The system of claim 17, wherein only one of the at least two markers are temporally modulated.*

*34. The system of claim 17, wherein all of the at least two markers are horizontally disposed above the display.*

*35. The system of claim 18, wherein the wireless transmitter comprises a Bluetooth transmitter.*

*36. The system of claim 26, wherein:*
  *the transmission unit comprises a wireless transmitter; and*
  *the wireless transmitter is a Bluetooth transmitter.*

*37. The system of claim 26, wherein all of the two or more markers are horizontally disposed above the display.*

*38. A method, comprising:*
  *emitting non-visible radiation having a predetermined frequency band from two or more markers adapted for placing in spaced-apart fixed locations on or proximate to a display;*
  *filtering at a handheld device radiation so as to pass the radiation in the predetermined frequency band and to substantially exclude other radiation;*
  *passing the radiation in the predetermined frequency band through an imaging element to a pixelated sensor;*
  *producing separate images of at least two of the spaced-apart markers when radiation therefrom is incident on the pixelated sensor within the handheld device;*
  *generating image data for each of the at least two separate images;*
  *processing the image data in the handheld device to provide coordinate data of the images appearing on the pixelated sensor, the coordinate data comprising less data than the image data, wherein processing the image data further comprises:*
    *determining an intensity value for each of a plurality of pixels of the pixelated sensor, the intensity value attaining one of three or more quantized intensity values;*
    *identifying a set of pixels which have an intensity value above a specified threshold; and*
    *generating the coordinate data based on the intensity value and the location of each of the pixels in the set of pixels;*
  *sending from said handheld device the coordinate data derived from the processing of the image data;* triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display;

determining a pointed to location on the display based on the coordinate data; and determining whether the pointed to location is beyond a specified boundary.

39. The method of claim 38, wherein the specified boundary comprises a screen edge of the display.

40. The method of claim 39, further comprising activating a scrolling function on the display when the pointed to location is beyond the screen edge of the display.

41. A method, comprising:

emitting non-visible radiation having a predetermined frequency band from two or more markers adapted for placing in spaced-apart fixed locations on or proximate to a display;

filtering at a handheld device radiation so as to pass the radiation in the predetermined frequency band and to substantially exclude other radiation;

passing the radiation in the predetermined frequency band through an imaging element to a pixelated sensor;

producing separate images of at least two of the spaced-apart markers when radiation therefrom is incident on the pixelated sensor within the handheld device;

generating image data for each of the at least two separate images;

processing the image data in the handheld device to provide coordinate data of the images appearing on the pixelated sensor, the coordinate data comprising less data than the image data, wherein processing the image data further comprises:

determining an intensity value for each of a plurality of pixels of the pixelated sensor, the intensity value attaining one of three or more quantized intensity values;

identifying a set of pixels which have an intensity value above a specified threshold; and generating the coordinate data based on the intensity value and the location of each of the pixels in the set of pixels;

sending from said handheld device the coordinate data derived from the processing of the image data;

triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display; and detecting a roll motion of the handheld device using the coordinate data provided by the handheld device, the roll motion comprising a rotation about an axis of the handheld device's pointing vector, wherein if a change in roll is determined, a graphical image shown on the display is rotated, and wherein the graphical image being rotated comprises a virtual dial.

42. The method of claim 41, wherein triggering the action on the display comprises turning the virtual dial.

43. A method, comprising:

emitting non-visible radiation having a predetermined frequency band from two or more markers adapted for placing in spaced-apart fixed locations on or proximate to a display;

filtering at a handheld device radiation so as to pass the radiation in the predetermined frequency band and to substantially exclude other radiation;

passing the radiation in the predetermined frequency band through an imaging element to a pixelated sensor;

producing separate images of at least two of the spaced-apart markers when radiation therefrom is incident on the pixelated sensor within the handheld device;

generating image data for each of the at least two separate images;

processing the image data in the handheld device to provide coordinate data of the images appearing on the pixelated sensor, the coordinate data comprising less data than the image data, wherein processing the image data further comprises:

determining an intensity value for each of a plurality of pixels of the pixelated sensor, the intensity value attaining one of three or more quantized intensity values;

identifying a set of pixels which have an intensity value above a specified threshold; and generating the coordinate data based on the intensity value and the location of each of the pixels in the set of pixels;

sending from said handheld device the coordinate data derived from the processing of the image data; and triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display, wherein triggering the action further comprises triggering an action depicted on the display in response to motion of the handheld device.

44. The method of claim 43, wherein the motion of the handheld device comprises a gesture.

45. The method of claim 44, wherein the gesture comprises a quick motion in a first direction, and the action on the display comprises a movement on the display towards the first direction.

46. The method of claim 43, wherein triggering the action further comprises providing input to a video game application.

47. The method of claim 46, wherein the input to the video game application affects a change in visual perspective in response to a change in the coordinate data.

48. A method, comprising:

emitting non-visible radiation having a predetermined frequency band from two or more markers adapted for placing in spaced-apart fixed locations on or proximate to a display;

filtering at a handheld device radiation so as to pass the radiation in the predetermined frequency band and to substantially exclude other radiation;

passing the radiation in the predetermined frequency band through an imaging element to a pixelated sensor;

producing separate images of at least two of the spaced-apart markers when radiation therefrom is incident on the pixelated sensor within the handheld device;

generating image data for each of the at least two separate images;

processing the image data in the handheld device to provide coordinate data of the images appearing on the pixelated sensor, the coordinate data comprising less data than the image data, wherein processing the image data further comprises:

determining an intensity value for each of a plurality of pixels of the pixelated sensor, the intensity value attaining one of three or more quantized intensity values;

identifying a set of pixels which have an intensity value above a specified threshold; and generating the coordinate data based on the intensity value and the location of each of the pixels in the set of pixels;

sending from said handheld device the coordinate data derived from the processing of the image data; and triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display, further comprising repeatedly generating coordinate data to quasi-fluidly track said location on said display.

49. A system comprising:

(i) a handheld device comprising a pixelated sensor, an optical filter for passing a predetermined frequency band of radiation to the sensor, a lens for focusing the predetermined frequency band of radiation on the sensor, and a transmitter;

(ii) electronic equipment adapted for coupling to a display and configured to generate video images of a graphical user interface on the display;

(iii) at least two markers adapted for placing in spaced-apart fixed locations on or proximate to the display, the markers providing radiation at a frequency band passed by the optical filter, and the pixelated sensor adapted to form separate images of at least two of said spaced-apart markers when radiation therefrom is incident on the sensor; and (iv) the handheld device further including:

a processor coupled to receive and process image data of each of the at least two separate images of the markers on the sensor, the processor adapted to compute coordinate data of the images on the sensor from the image data, the coordinate data comprising less data than the image data, wherein computing coordinate data of the images comprises:

determining an intensity value for each of a plurality of pixels of the pixelated sensor, the intensity value attaining one of three or more quantized intensity values;

identifying a set of pixels which have an intensity value above a specified threshold; and using only those pixels which have an intensity value above the specified threshold, generating the coordinate data based on the intensity value and a location of each of the pixels in the set of pixels; and the processor being coupled to the transmitter to transmit the coordinate data to the electronic equipment, the electronic equipment adapted for receiving the coordinate data and responsively performing a plurality of actions, wherein at least one of the actions includes actively controlling movement of a cursor displayed on the display, the cursor comprising a graphical element usable for selecting one or more other graphical elements from within the graphical user interface generated by the electronic equipment on the display, wherein all of the at least two markers are horizontally disposed above the display.

50. A system for controlling a cursor on a display screen, the system comprising:

two or more markers substantially aligned in an x-direction of a coordinate system of a display screen;

a handheld device having:

a pixelated image sensor that detects infrared radiation and produces an intensity value for each of a plurality of pixels of the pixelated image sensor, the produced intensity values each attaining one of three or more quantized intensity values;

a lens disposed in front of the pixelated image sensor;

an image processor that identifies a set of pixels that have intensity values above a specified threshold and from which the processor detects two or more marker images based on the intensity values and also determines characteristics of the detected marker images based only on the intensity value and location of each of the pixels in the set, the characteristics including the x, y coordinates of each of the detected images of the markers in the coordinate system of the pixelated image sensor; and a transmission unit for sending the x, y coordinates of the two or more marker images in the coordinate system of the pixelated image sensor; and a graphical user interface device having at least one processor that:

receives the x, y coordinates of the two or more marker images in the coordinate system of the pixelated image sensor;

computes a composite position of the received x, y coordinates in the coordinate system of the pixelated image sensor; and converts the computed composite position into a converted position of the coordinate system of the display screen that is used to determine a position on the display screen at which the cursor appears.

51. The system of claim 50, wherein all of the two or more markers are horizontally disposed above the display.

52. The system of claim 50, wherein the at least one processor of the graphical user interface is configured to convert the computed composite image into the converted position using calibration points.

53. The system of claim 50, wherein the at least one processor of the graphical user interface is configured to detect a roll motion of the handheld device using the x, y coordinates provided by the handheld device, the roll motion comprising a rotation about an axis of the handheld device's pointing vector.

54. The system of claim 53, wherein the at least one processor of the graphical user interface is configured to detect the roll motion by determining a collective rotation of the two or more marker images.

55. The system of claim 53, wherein if a change in roll is determined, a graphical image shown on the display is rotated.

56. The system of claim 55, wherein the graphical image being rotated comprises the cursor.

57. The system of claim 55, wherein the graphical image being rotated comprises a virtual dial.

58. The system of claim 57, wherein the at least one processor of the graphical user interface is configured to trigger an action on the display screen when the virtual dial is rotated.

59. The system of claim 50, wherein the graphical user interface device is a video game box.

60. The system of claim 50, wherein sending the x, y coordinates from the transmission unit comprises providing input to a video game application.

61. The system of claim 60, wherein the input to the video game application affects a change in visual perspective in response to a change in the x, y coordinates.

62. A method, comprising:
emitting non-visible radiation having a predetermined frequency band from two or more markers adapted for placing in spaced-apart fixed locations on or proximate to a display;
filtering at a handheld device radiation so as to pass the radiation in the predetermined frequency band and to substantially exclude other radiation;
passing the radiation in the predetermined frequency band through an imaging element to a pixelated sensor;
producing separate images of at least two of the spaced-apart markers when radiation therefrom is incident on the pixelated sensor within the handheld device;
generating image data for each of the at least two separate images;
processing the image data in the handheld device to provide coordinate data of the images appearing on the pixelated sensor, the coordinate data comprising less data than the image data, wherein processing the image data further comprises:
determining an intensity value for each of a plurality of pixels of the pixelated sensor, the intensity value attaining one of three or more quantized intensity values;
identifying a set of pixels which have an intensity value above a specified threshold; and
generating the coordinate data based on the intensity value and the location of each of the pixels in the set of pixels;
sending from said handheld device the coordinate data derived from the processing of the image data; and
triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display, wherein all of the two or more markers are horizontally disposed above the display.

63. A method, comprising:
emitting non-visible radiation having a predetermined frequency band from two or more markers adapted for placing in spaced-apart fixed locations on or proximate to a display;
filtering at a handheld device radiation so as to pass the radiation in the predetermined frequency band and to substantially exclude other radiation;
passing the radiation in the predetermined frequency band through an imaging element to a pixelated sensor;
producing separate images of at least two of the spaced-apart markers when radiation therefrom is incident on the pixelated sensor within the handheld device;
generating image data for each of the at least two separate images;
processing the image data in the handheld device to provide coordinate data of the images appearing on the pixelated sensor, the coordinate data comprising less data than the image data, wherein processing the image data further comprises:
determining an intensity value for each of a plurality of pixels of the pixelated sensor, the intensity value attaining one of three or more quantized intensity values;
identifying a set of pixels which have an intensity value above a specified threshold; and
generating the coordinate data based on the intensity value and the location of each of the pixels in the set of pixels;
sending from said handheld device the coordinate data derived from the processing of the image data; and
triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display; and
detecting a roll motion of the handheld device using the coordinate data provided by the handheld device, the roll motion comprising a rotation about an axis of the handheld device's pointing vector, wherein triggering the action comprises interpreting a roll motion as a button press.

64. A method, comprising:
emitting non-visible radiation having a predetermined frequency band from two or more markers adapted for placing in spaced-apart fixed locations on or proximate to a display;
filtering at a handheld device radiation so as to pass the radiation in the predetermined frequency band and to substantially exclude other radiation;
passing the radiation in the predetermined frequency band through an imaging element to a pixelated sensor;
producing separate images of at least two of the spaced-apart markers when radiation therefrom is incident on the pixelated sensor within the handheld device;
generating image data for each of the at least two separate images;
processing the image data in the handheld device to provide coordinate data of the images appearing on the pixelated sensor, the coordinate data comprising less data than the image data, wherein processing the image data further comprises:
determining an intensity value for each of a plurality of pixels of the pixelated sensor, the intensity value attaining one of three or more quantized intensity values;
identifying a set of pixels which have an intensity value above a specified threshold; and
generating the coordinate data based on the intensity value and the location of each of the pixels in the set of pixels;

sending from said handheld device the coordinate data derived from the processing of the image data; and triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display, wherein all of the two or more markers are:

located above the display within several centimeters of a boundary of the display and approximately centered along a horizontal dimension, and arranged horizontally and separated from each other by approximately 5 to 15 centimeters.

65. A method for controlling movement of a cursor on a display screen, the method comprising:

emitting infrared radiation having a predetermined frequency band from two or more markers adapted for being placed in spaced-apart locations on or proximate to the display screen;

receiving the emitted radiation at a handheld device, the emitted radiation passing through a filter disposed on the handheld device that substantially excludes other radiation;

passing the filtered radiation through an imaging element to a pixelated sensor disposed within the handheld device;

generating a separate image for each of at least two spaced-apart markers based on the filtered radiation that reaches the pixelated sensor;

generating image data for each of the separate images;

processing the image data in the handheld device to generate coordinate data for each separate image, by:

determining an intensity value for each of a plurality of pixels of the pixelated sensor, the intensity value attaining one of three or more quantized intensity values;

identifying a set of pixels having intensity values above a specified threshold; and generating the coordinate data based on the intensity values and the location of each of the pixels in the set of pixels; and transmitting the generated coordinate data from said handheld device to electronic equipment circuitry that controls the movement of the cursor on the display screen, wherein all of the two or more markers are horizontally disposed above the display screen.

66. A method comprising:

emitting non-visible radiation having a predetermined frequency band from two or more markers adapted for placing in spaced-apart fixed locations on or proximate to a display;

filtering at a handheld device radiation so as to pass the radiation in the predetermined frequency band and to substantially exclude other radiation;

passing the radiation in the predetermined frequency band through a lens to a pixelated sensor:

producing separate images of at least two of the spaced-apart markers when radiation therefrom is incident on the pixelated sensor within the handheld device;

generating image data for each of the at least two separate images;

processing the image data in the handheld device to provide coordinate data of the images appearing on the pixelated sensor, the coordinate data comprising less data than the image data, wherein processing the image data further comprises:

determining an intensity value for each of a plurality of pixels of the pixelated sensor, the intensity value attaining one of three or more quantized intensity values;

identifying a set of pixels which have an intensity value above a specified threshold; and using only those pixels which have an intensity value above the specified threshold, generating the coordinate data based on the intensity value and a location of each of the pixels in the set of pixels;

sending from said handheld device the coordinate data derived from the processing of the image data; and triggering an action to be taken by electronic equipment circuitry in response to the coordinate data and the handheld device's sending of a signal to indicate that the action is desired, wherein the action includes actively controlling movement of a cursor displayed on the display, the cursor comprising a graphical element usable for selecting one or more other graphical elements from within a graphical user interface generated by the electronic equipment on the display, wherein all of the two or more markers are horizontally disposed above the display.

67. A method for controlling movement of a cursor on a display screen, the method comprising:

emitting infrared radiation having a predetermined frequency band from two or more markers adapted for being placed in spaced-apart locations on or proximate to the display screen;

receiving the emitted radiation at a handheld device, the emitted radiation passing through a filter disposed on the handheld device that substantially excludes other radiation;

passing the filtered radiation through a lens to a pixelated sensor disposed within the handheld device;

simultaneously generating a separate image for each of at least two of the spaced-apart markers based on the filtered radiation that reaches the pixelated sensor;

generating image data for each of the separate images;

processing the image data in the handheld device to generate coordinate data for each separate image, by:

determining an intensity value for each of a plurality of pixels of the pixelated sensor, the intensity value attaining one of three or more quantized intensity values;

identifying a set of pixels having intensity values above a specified threshold; and using only those pixels which have an intensity value above the specified threshold, generating the coordinate data based on the intensity values and the location of each of the pixels in the set of pixels; and transmitting the generated coordinate data from said handheld device to electronic equipment circuitry that controls the movement of the cursor on the display screen, wherein all of the two or more markers are horizontally disposed above the display screen.

* * * * *